United States Patent [19]

Matsuo et al.

[11] Patent Number: 5,115,077
[45] Date of Patent: May 19, 1992

[54] POLYETHERIC COPOLYMERS, PROCESS FOR PREPARING THE SAME COMPOSITIONS CONTAINING THE SAME, THEIR MOLDED PRODUCTS, AND THEIR USE

[75] Inventors: Shigeru Matsuo; Shigeru Murakami; Shinji Chino; Naoto Yako, all of Sodegaura, Japan

[73] Assignee: Idemitsu Kosan Company Limited, Tokyo, Japan

[21] Appl. No.: 449,192

[22] Filed: Dec. 13, 1989

[30] Foreign Application Priority Data

| Dec. 14, 1988 | [JP] | Japan | 63-315679 |
|---|---|---|---|
| Feb. 21, 1989 | [JP] | Japan | 1-40559 |
| Feb. 21, 1989 | [JP] | Japan | 1-40560 |
| Apr. 18, 1989 | [JP] | Japan | 1-98397 |
| Jun. 15, 1989 | [JP] | Japan | 1-152520 |
| Jul. 15, 1989 | [JP] | Japan | 1-183186 |
| Aug. 7, 1989 | [JP] | Japan | 1-204325 |
| Aug. 9, 1989 | [JP] | Japan | 1-206328 |
| Sep. 19, 1989 | [JP] | Japan | 1-243066 |
| Oct. 4, 1989 | [JP] | Japan | 1-259090 |
| Oct. 9, 1989 | [JP] | Japan | 1-263751 |
| Oct. 9, 1989 | [JP] | Japan | 1-263752 |
| Oct. 11, 1989 | [JP] | Japan | 1-264726 |
| Oct. 20, 1989 | [JP] | Japan | 1-273416 |

[51] Int. Cl.⁵ .................. C08G 8/02; C08G 65/40; C08G 2/00; C08G 12/00
[52] U.S. Cl. .................. 528/125; 528/128; 528/211; 528/220; 528/228
[58] Field of Search ............. 528/125, 128, 211, 220, 528/228

[56] References Cited

U.S. PATENT DOCUMENTS 3,730,946 5/1973 Heath ........................ 260/47
4,891,167 1/1990 Clendinning et al. ........... 528/125

FOREIGN PATENT DOCUMENTS 50-105738 8/1975 Japan .
52-36525 9/1977 Japan .

(List continued on next page.)

Primary Examiner—John Kight, III
Assistant Examiner—T. Mosley
Attorney, Agent, or Firm—Armstrong, Nikaido, Marmelstein, Kubovcik & Murray

[57] ABSTRACT

A polyetheric copolymer, a polyetheric block copolymer, and compositions of these copolymers containing: a benzonitrile recurring unit as represented by the following general formula (I):

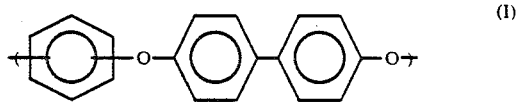

and a benzophenone recurring unit as represented by the following general formula (II):

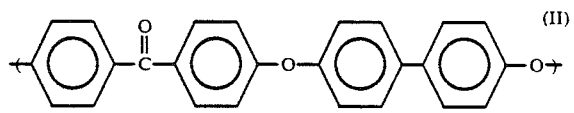

which copolymer has a molar ratio of the recurring unit (I) to a sum of the recurring units (I) and (II), i.e., (I)/[(I)+(II)], in the range from 0.15:1 to 0.40:1, as well as a melt viscosity (zero shear viscosity) at 400° C. in the range from 500 to 100,000 poise.

The polyetheric copolymer is crystalline and is a macromolecular compound having excellent heat resistance and mechanical strength.

Disclosed herein are methods for the preparation of the polyetheric copolymer, the polyetheric block copolymer and the compositions containing the same.

The polyetheric copolymers, the polyetheric block copolymers and their compositions are useful in various fields.

33 Claims, 1 Drawing Sheet

FOREIGN PATENT DOCUMENTS

| | | |
|---|---|---|
| 52-37007 | 9/1977 | Japan . |
| 57-36154 | 2/1982 | Japan . |
| 57-191322 | 11/1982 | Japan . |
| 58-78499 | 5/1983 | Japan . |
| 58-109554 | 6/1983 | Japan . |
| 57-160346 | 9/1983 | Japan . |
| 58-160347 | 9/1983 | Japan . |
| 58-176242 | 10/1983 | Japan . |
| 58-179262 | 10/1983 | Japan . |
| 60-235835 | 11/1985 | Japan . |
| 61-106663 | 5/1986 | Japan . |
| 61-215186 | 9/1987 | Japan . |
| 1-132898 | 5/1989 | Japan . |
| 1-152520 | 6/1989 | Japan . |
| 1152520 | 6/1989 | Japan . |

POLYETHERIC COPOLYMERS, PROCESS FOR PREPARING THE SAME COMPOSITIONS CONTAINING THE SAME, THEIR MOLDED PRODUCTS, AND THEIR USE

BACKGROUND OF THE INVENTION

1. Field of the Invention

The present invention relates to polyetheric copolymers, processes for preparing the same, compositions containing the same, molded products prepared from the same, and their uses.

More particularly, the present invention relates to polyetheric copolymers useful as materials in electronic and electric equipment fields and in mechanical field on account of their crystallizability, their high resistance to heat, chemicals and solvents, as well as their excellent electric properties and mechanical strength, to processes for preparing the polyetheric copolymers with a high efficiency, to compositions containing the polyetheric copolymers with their further improved resistance to heat and mechanical strength, their molded or formed products, and their uses.

2. Description of Related Art

Recently, engineering plastics having a variety of chemical structures have been developed and they lend themselves to a wide field ranging, for example, from the automobile field, the electric and the electronic fields, and precision machinery field, to the office automation instrument and the optical communication instrument fields. They are said to be still insufficient in various respects and they do not sufficiently satisfy various demands for requirements which are getting severer, so that development of a new and improved material is still required.

Polyetheric copolymers as one of the engineering plastics are particularly excellent in their resistance to heat and various polyetheric copolymers have been proposed.

Japanese Patent Publication (Kokai) No. 14,270/1972 proposes a process for preparing an aromatic polyetheric copolymer by reacting a dinitrobenzonitrile and a dihalogeno benzophenone with a divalent phenol in the presence of an alkali metal compound.

By this process, the resultant polyether copolymers, however, are low molecular weight polymers having a melt viscosity of not more than 200 poise. Therefore, they are not sufficient in a resistance to heat and mechanical strength.

Japanese Patent Publication (kokai) No. 235,835/1985 proposes a process for preparing a polyetheric copolymer by reacting a dihalogeno benzonitrile and a 4,4'-dihalogeno benzophenone simultaneously with an alkali metal salt of a divalent phenol, the polyetheric copolymer having recurring units as represented by the following general formula (a):

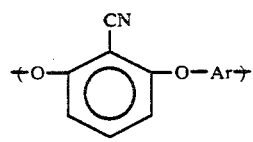

and as represented by the following general formula (b):

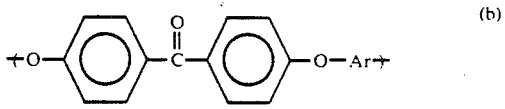

(wherein Ar is a divalent aromatic residue) and having a molar ratio of the recurring unit (a) to a sum of the recurring units (a) and (b) of 0.5 to 1 or higher.

It is to be noted, however, that the polyetheric copolymer having a molar ratio of the recurring unit (a) to the total of the recurring units (a) and (b) of 0.5 to 1 or higher is so amorphous that it cannot maintain its mechanical strength in a temperature range beyond its glass transition temperature. Thus it cannot be said to be sufficiently resistant to heat.

The Japanese Patent Publication (kokai) No. 235,835/1985 further discloses that a polyetheric copolymer having a high molecular weight cannot be prepared by simultaneously copolymerizing the raw materials corresponding to the polyetheric copolymer having a molar ratio of the recurring unit (a) to the sum of the recurring units (a) and (b) of less than 0.5.

The present invention has been completed on the basis of the above circumstances.

SUMMARY OF THE INVENTION

Therefore, the present invention has as its objects to provide a polyetheric copolymer having crystallizability, excellent properties, such as resistance to heat and chemicals and so on, a sufficiently high molecular weight, and a high mechanical strength; to provide a process for preparing the polyetheric copolymer with a high efficiency; to provide a composition containing the copolymer having further improved resistance to heat and mechanical strength; to provide molded and formed products prepared by molding the copolymer and forming molded products; and to provide uses for these materials.

In order to achieve these objects, the present invention consists of a number of features as will be described hereinafter.

(1) Polyetheric copolymers

A first feature (1) of the present invention is directed to polyetheric copolymers as a novel polyether resin which has crystallizability and an extremely excellent resistance to heat, as well as which has a sufficiently high molecular weight has superior mechanical strength, and so on.

(2) Process for the preparation of the polyetheric copolymers

A second feature (2) of the present invention is directed to a novel process for preparing the polyetheric copolymer.

The polyetheric copolymer according to the first feature (1) is characterized by recurring units as represented by the following general formula (I):

as well as recurring units represented by the following general formula (II):

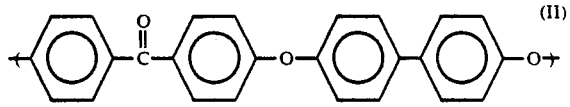

$$(II)$$

with a molar ratio of the recurring unit (I) to a sum of the recurring units (I) and (II), i.e., (I)/[(I)+(II)], in the range from 0.15:1 to 0.40:1. This copolymer has a melt viscosity (zero shear viscosity) measured at 400° C. in the range from 500 to 100,000 poise.

(2-1) Process (A) for the preparation of the polyetheric copolymers

The novel process for preparing the polyetheric copolymers according to the second feature (2) of the present invention is characterized by a sub-feature (2-1) directed to a process in which a dihalogeno derivative of the benzonitrile (I), in an amount corresponding to the molar ratio thereof to a sum of the dihalogeno derivative of the benzonitrile (II) and a 4,4'-dihalogeno benzophenone in the range from 0.15:1 to 0.40:1, is reacted with 4.4'-biphenol in an amount substantially equimolar to the sum, in the presence of an alkali metal compound in an aprotic polar solvent; and the resulting reaction product is then copolymerized with the 4,4'-dihalogeno benzophenone in an amount corresponding to its molar ratio to the above sum ranging from 0.60:1 to 0.85:1.

(2-2) Process (B) for the preparation of the polyetheric copolymers

The novel process for preparing the polyetheric copolymers according to the second feature (2) of the present invention is further characterized by a sub-feature (2-2) directed to a process in which a dihalogeno benzonitrile, in an amount corresponding to a molar ratio thereof to the sum of the dihalogeno benzonitrile, a 4,4'-dichlorobenzophenone, and a 4,4'-difluorobenzophenone in the range from 0.15:1 to 0.40:1, and the 4,4'-dichlorobenzophenone are reacted with 4,4'-biphenol in an amount substantially equimolar to the total sum, in the presence of an alkali metal compound, in an aprotic polar solvent; and the resulting reaction product is then copolymerized with the 4,4'-difluorobenzophenone.

(2-3) Process (C) for the preparation of the polyetheric copolymers

The novel process for preparing the polyetheric copolymers according to the third feature(3) of the present invention is further characterized by a sub-feature(2-3) directed to a process in which a dihalogeno benzonitrile, in an amount corresponding to a molar ratio thereof to the sum of the dihalogeno benzonitrile 4,4'-dihalogeno benozophenone in the range from 0.15:1 to 0.40:1, is reacted with 4,4'-dihalogeno benzophenone in an amount corresponding to a molar ratio thereof to the sum in the range form 0.85:1 to 0.6:1, and 4.4'-biphenol in an amount substantially equimolar to the sum, in the presence of an alkali metal compound in a diphenylsulfone.

(3) Polyetheric block copolymers, and
(4) Process for the preparation of the polyetheric block copolymers The present invention further provides a feature (3) directed to the polyetheric resin having a unique chemical structure, as a novel material, which comprises a polyetheric block copolymer and a feature (4) directed to a process for preparing the polyetheric block copolymer.

The polyetheric block copolymer according to the feature (3) of the present invention may be characterized by recurring unit blocks as represented by the following general formula (III):

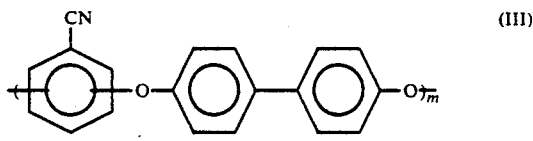

$$(III)$$

(wherein m is an integer from 10 to 100) and is made up of 10 to 100 units of the benzonitrile of the formula (I) and as represented by the following general formula (IV):

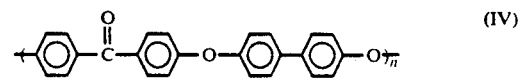

$$(IV)$$

(wherein n is an integer of 80 or smaller), and is made up of up to 80 units of the benzophenone of the formula (II) where the molar ratio of the recurring unit [I], which is defined in the above (1), to a sum of the recurring unit [I] and [II], which is defined in the above (1), i.e., [I]/([I]+[II]), in the range from 0.15:1 to 0.4:1, and wherein the copolymer is characterized by a melt viscosity, at 400° C., in the range from 500 to 100,000 poise.

The process for the preparation of the polyetheric block copolymer according to the feature (4) of the present invention is characterized in that a dihalogeno benzonitrile, in an amount corresponding to a molar ratio thereof to a sum of the dihalogeno benzonitrile and a 4,4'-dihalogeno benzophenone in the range from 0.15:1 to 0.40:1, is reacted with 4,4'-biphenol, in an amount corresponding to a molar ratio thereof to the dihalogeno benzonitrile in the range from 0.90:1 to 0.98:1 or from 1.01:1 to 1.10:1, in the presence of an alkali metal compound in an aprotic polar solvent, and the resulting reaction product is then copolymerized with an amount of 4,4'-biphenol and the 4,4'-dihalogeno benzophenone, the 4,4'-biphenol being in an amount obtained by subtracting the molar amount of the 4,4'-biphenol used in the benzonitrile reaction from an amount substantially equimolar to the above sum.

(5) Terminal-stabilized polyetheric copolymers, and
(6) Process for the preparation of the terminal-stabilized polyetheric copolymers A feature (5) of the present invention provides a terminal-stabilized polyetheric copolymer, as a novel material, which does not cause cross-linking during heat molding or forming of the novel polyetheric copolymer or polyetheric block copolymer as have been described hereinabove. A feature (6) of the present invention provides a process for the preparation of the terminal-stabilized polyetheric copolymer.

The terminal-stablized polyetheric copolymer according to the feature (5) of the present invention is characterized in that its polymer chain has a terminal group is represented by the following general formula (V):

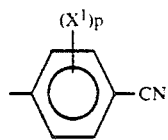 (V)

(wherein $X^1$ is a hydrogen atom or a halogen atom provided however that $X^1$ may be identical to or different from each other when $X^1$ is present plurally; and p is an integer from 1 to 4); or by the following general formula (VI):

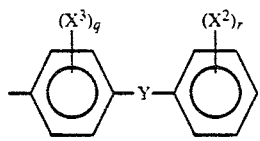 (VI)

(wherein $X^2$ is a hydrogen atom or a halogen atom; Y is a carbonyl group or sulfone group; $X^3$ is a hydrogen atom or a halogen atom; q is an integer from 1 to 4; and r is an integer from 1 to 5; provided however that $X^2$ and $X^3$ may be identical to or different from each other when each of $X^2$ and $X^3$ is present plurally), and in that it has a melt viscosity, at 400° C., in the range from 500 to 100,000 poise.

The process for the preparation of the terminal-stabilized polyetheric copolymer according to the feature (6) of the present invention is characterized in that a dihalogeno benzonitrile and a 4,4'-dihalogeno benzophenone are reacted with 4,4'-biphenol in the presence of an alkali metal compound in an aprotic polar solvent, and the resulting reaction product is then reacted with a compound having at least one active halogen atom as represented by the following general formula (VII):

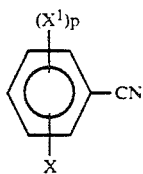 (VII)

(wherein X is a halogen atom and $X^1$ and p have the same meanings as above) or with a compound having an active halogen atom as represented by the following general formula (VIII):

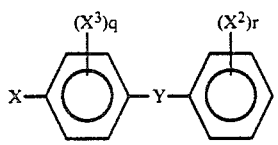 (VIII)

(wherein X, $X^2$, $X^3$, y, q and r have the same meanings as above).

(7) Process for the preparation of powdery polyetheric copolymers having a high bulk density The process for the preparation of the polyetheric copolymers contains a process for the preparation of powdery polyetheric copolymers having a high bulk density as a feature (7) according to the present invention.

The process for the preparation of the powdery polyetheric copolymer having a high bulk density according to the feature (7) is characterized by distilling the aprotic polar solvent off directly from the aprotic polar solvent containing the polyetheric copolymer resulting from the processes according to the features (2), (4) or (6).

The polyetheric copolymers prepared according to the features (1), (3) and (5) of the present invention (hereinafter sometimes referred to merely as polyetheric copolymer or copolymers) have excellent properties in themselves, and they may be converted to molded products and molding materials to be used in various usage as will be described hereinafter, with attention paid to those properties.

(8) Polyetheric copolymer fibers

A feature (8) of the present invention is directed to polyetheric copolymer fibers.

The polyetheric copolymer fibers according to the feature (8) of the present invention are characterized by orienting or stretching the polyetheric copolymer fibers by 1.5 times or larger.

A process for the preparation of the polyetheric copolymer fibers is characterized by spinning the polyetheric copolymer and orienting or stretching the spun copolymer by 1.5 times or larger at a temperature higher, by 10° to 30° C., than its glass transition temperature.

(9) Heat-resistant and fire-retardant paper

Another feature (9) of the present invention is directed to heat-resistant and fire-retardant paper.

The heat-resistant and fire-retardant paper according to the feature (9) of the present invention is characterized by papermaking using the polyetheric copolymer fibers.

(10) Polyetheric copolymer films

A further feature (10) of the present invention is directed to polyetheric copolymer films.

The polyetheric copolymer films according to the feature (10) of the present invention is characterized in that the polyetheric copolymer is molded into films at a temperature which is higher than its melting point by 10° C. to 100° C.

(11) Polyetheric copolymer pipes

A still further feature (11) of the present invention is directed to polyetheric copolymer pipes.

The polyetheric copolymer pipes according to the feature (11) of the present invention are characterized by molding the polyetheric copolymer into pipes.

(12) Electrical insulating materials

A still further feature (12) of the present invention is directed to electrical insulating materials.

The electrical insulating materials according to the feature (12) of the present invention is characterized by using the polyetheric copolymer as a material or a stock.

(13) Flexible printed circuit boards

A feature (13) of the present invention for the polyetheric copolymer is directed to flexible printed circuit boards.

The flexible printed circuit boards to the feature (13) of the present invention is characterized by forming a conductive path on a surface of insulating sheet prepared using the polyetheric copolymer.

(14) Radiation-resistant materials

A still further feature (14) of the present invention is also directed to radiation-resistant materials.

The radiation-resistant materials according to the feature (14) of the present invention is characterized by using the polyetheric copolymer as a material or a stock.

(15) Powder paints and coatings

A feature (15) of the present invention is further directed to powder paints or coatings.

The powder paints or coatings according to the feature (15) of the present invention are characterized by using powders of the polyetheric copolymer as a material.

(16) Inorganic compounds covered with the polyetheric copolymer

A feature (16) of the present invention is still further directed to inorganic compounds covered with the polyetheric copolymer.

The inorganic compounds covered with the polyetheric copolymer according to the still further feature (16) of the present invention are characterized in that the inorganic compounds are covered with the polyetheric copolymer.

The polyetheric copolymers having excellent properties according to the present invention may be prepared into resin compositions having a variety of properties by combining the polyetheric copolymers with a variety of other materials.

More specifically, the polyetheric copolymers according to the present invention can provide novel resin compositions with further improved resistance to heat and mechanical strength.

(17) Polyetheric copolymer compositions (A)

A feature (17) of the present invention for the polyether copolymer composition is characterized in that the polyetheric copolymer is blended in the amount ranging from 97% to 30% by weight with an inorganic filler in the amount ranging from 3% to 70% by weight.

(18) Polyetheric copolymer compositions (B)

Another feature (18) of the present invention is characterized in containing the polyetheric copolymer and an inorganic nucleating agent in the amount ranging from 0.001 to 3 parts by weight with respect to 100 parts by weight of the polyetheric copolymer.

(19) Polyetheric copolymer compositions (C)

A further feature (19) of the present invention for the polyetheric copolymer composition is characterized in blending from 90% to 10% by weight of the polyetheric copolymer and 10% to 90% by weight of a thermoplastic resin, as desired, with 1% to 50% by weight of an inorganic filler with respect to 99% to 50% by weight of a sum of the polyetheric copolymer and the thermoplastic resin.

The polyetheric copolymer compositions according to the present invention can be applied to various usage by appropriately selecting the kinds of the fillers and the thermoplastic resins or amounts thereof to be blended.

(20) Printed circuit boards

A feature (20) of the present invention for the polyetheric copolymer compositions is directed to printed circuit boards.

The printed circuit boards according to the feature (20) of the present invention are characterized by molding a composite material comprising from 15% to 85% by weight of the polyetheric copolymer and from 85% to 15% by weight of glass fibers into plates.

(21) Positive-temperature coefficient polymer compositions

Another feature (21) of the present invention for the polyetheric copolymer compositions is directed to positive-temperature coefficient polymer compositions.

The positive-temperature coefficient polymer compositions according to the feature (21) are characterized by blending the polyetheric copolymer with an electrically conductive substance in the amount ranging from 20 to 90% by weight of the polyetheric copolymer with respect to 100% by weight of a sum of the polyetheric copolymer and the electrically conductive substance.

Another feature of the present invention for the positive-temperature coefficient polymer compositions is characterized in which the polyetheric copolymer is blended with an electrically conductive substance and a semiconducting substance in amounts of the polyetheric copolymer ranging from 20% to 90% by weight with respect to 100% by weight of a sum of the polyetheric copolymer and the electrically conductive substance and the semiconducting substance ranging from 10 parts to 300 parts by weight with respect to 100 parts by weight of a sum of the polyetheric copolymer and the electrically conductive substance.

The polyetheric copolymer according to the present invention may be prepared into various compositions as follows:

(22) Polyetheric copolymer compositions for electrically conductive materials The polyetheric copolymer compositions for electrically conductive materials according to feature (22) of the present invention are characterized by blending 100 parts by weight of the polyetheric copolymer with from 20 parts to 300 parts by weight of metal powders and/or metal fibers.

(23) Polyetheric copolymer compositions for a sliding member

The polyetheric copolymer compositions for a sliding member according to feature (23) of the present invention are characterized in that 20% to 95% by weight of the polyetheric copolymer is blended with 3 to 70% by weight of a fibrous filler having a Mohs hardness of 6 or lower and 2% to 40% by weight of a non-tackifier.

(24) Radiation-resistant polyetheric copolymer compositions

The radiation-resistant polyetheric copolymer compositions according to feature (24) of the present invention are characterized by containing the polyetheric copolymer and 10 to 50% by weight of a inorganic filler.

(25) Radiation-shielding polyetheric copolymer compositions

The radiation-shielding polyetheric copolymer compositions according to feature (25) of the present invention are characterized by containing the polyetheric copolymer and 5% to 80% by weight of lead and/or a lead compound.

(26) Heat-resistant laminates

The heat-resistant laminates according to feature (26) of the present invention are characterized by laminating a layer of the polyetheric copolymer with a layer of a fibrous reinforcing material.

Other objects, features and advantages of the present invention will become apparent in the course of the detailed description of the preferred embodiments which follow.

BRIEF DESCRIPTION OF THE DRAWING

The drawing is a graph showing the relationship of temperatures with resistance of one example of positive-temperature coefficient polymer compositions and a comparative example.

DETAILED DESCRIPTION OF THE PREFERRED EMBODIMENTS

Figure 1:
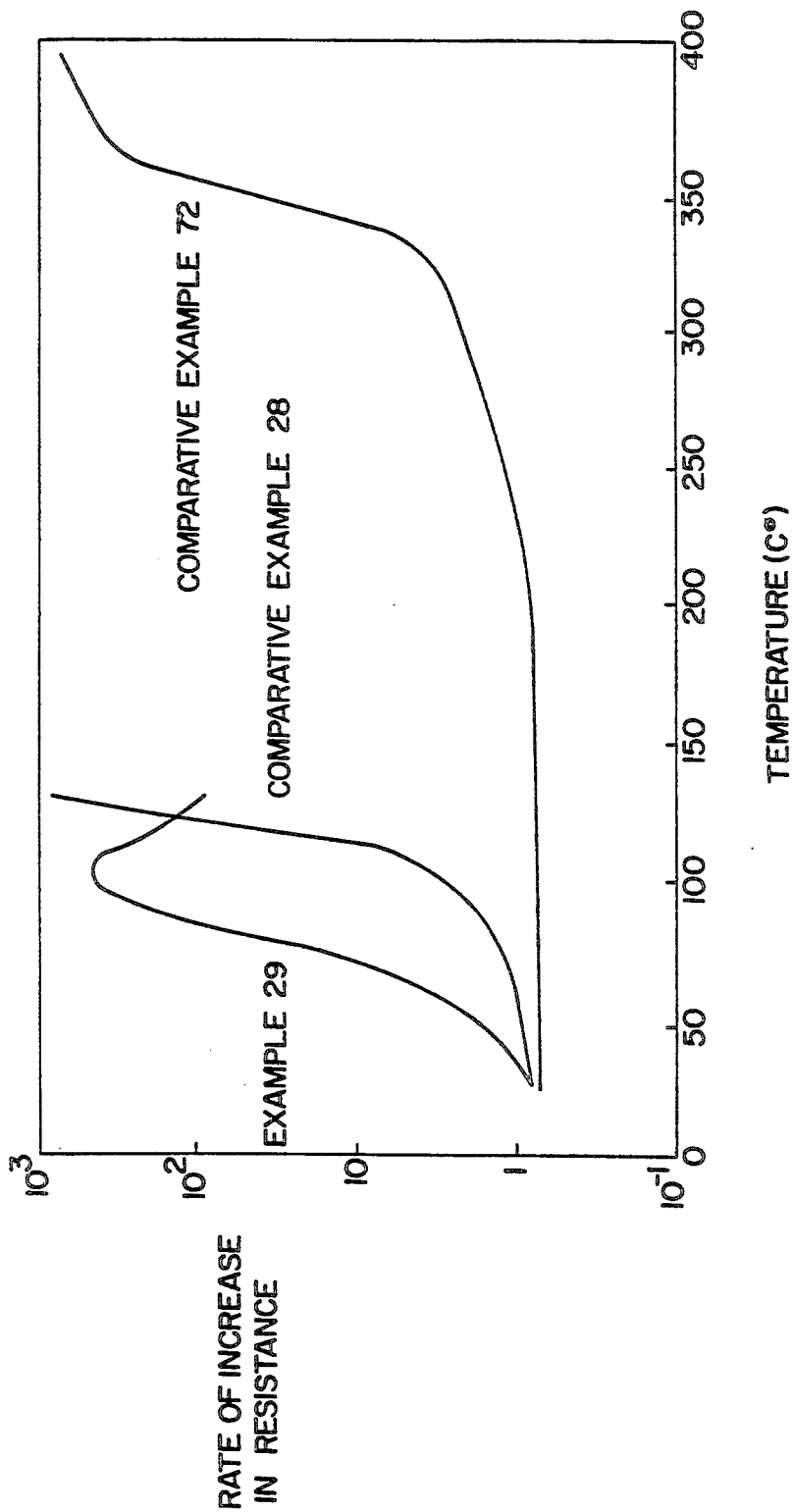

The present invention will be described more in detail by way of examples.

(1) Polyetheric copolymers

The polyetheric copolymers according to the feature (1) of the present invention as a preferred embodiment of the polyetheric resins is characterized by a recurring benzonitrile unit as represented by the following general formula (I):

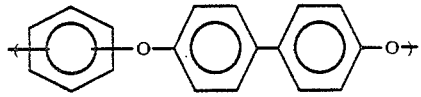

and a recurring benzophenone unit as represented by the following general formula (II):

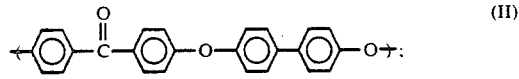

by a molar ratio of the recurring unit (I) to a sum of the recurring units (I) and (II), i.e., (I)/[(I)+(II)], ranging from 0.15:1 to 0.40:1; and by a melt viscosity (zero shear viscosity) at 400° C. in the range from 500 to 100,000 poise.

One of the significant compositional features of the polyetheric copolymers according to the present invention resides in the fact that they are constituted by the recurring units as represented by the general formulas (I) and (II) and that the molar ratio of the recurring unit (I) to the sum of the recurring units (I) and (II) is in the range from 0.15:1 to 0.40:1.

If the molar ratio of the recurring unit (I) is below the lower limit, on the one hand, the glass transition temperature of the resulting polyetheric copolymer becomes too low and its resistance to heat is reduced and, furthermore, its melting point becomes too high, thus impairing its moldability. If the molar ratio of the recurring unit (I) exceeds its upper limit, crystallizability of the resulting polyetheric copolymer may be lost.

It is also of significance that the polyetheric copolymer according to the present invention has a melt viscosity (zero shear viscosity), at a temperature of 400° C., in the range from 500 to 100,000 poise.

The polyetheric copolymers consisting of recurring units as represented by the general formulas (I) and (II), as well as having the molar ratio of the recurring unit (I) to the sum of the recurring units (I) and (II) in the range from 0.15:1 to 0.40:1, and the melt viscosity at 400° C. in the range from 500 to 100,000 poise, are crystallizable even if their crystalline melting points would be in the range from approximately 330° to 400° C., have a sufficiently high molecular weight, and have a sufficient resistance to heat. Further, they are excellent in their resistance to solvents and in mechanical strength so that they may be appropriately used as novel materials, for example, in electronic, electrical and mechanical fields and so on.

(2-1) Process (A) for the Preparation of the Polyetheric Copolymers

One feature of the novel processes for the preparation of the polyetheric copolymers involves reacting a dihalogeno benzonitrile in an amount corresponding to a molar ratio of the dihalogeno benzonitrile to the sum of the dihalogeno benzonitrile and a 4,4′-dihalogeno benzophenone ranging from 0.15:1 to 0.40:1, with 4,4′-biphenol in an amount substantially equimolar to the said sum, in the presence of an alkali metal compound in an aprotic polar solvent, and then copolymerizing the resulting reaction product with the 4,4′-dihalogenobenzophenone in an amount corresponding to a molar ratio of the 4,4′-dihalogeno benzophenone to the said sum ranging from 0.60:1 to 0.85:1.

The dihalogeno benzonitrile may include, for example, a 2,6-dihalogeno benzonitrile as represented by the following general formula:

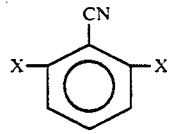

(wherein X is a halogen atom) or a 2,4-dihalogeno benzonitrile as represented by the following general formula:

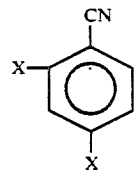

(wherein X has the same meaning as above).

Preferred are 2,6-dichlorobenzonitrile, 2,6-difluorobenzonitrile, 2,4-dichlorobenzonitrile and 2,4-difluorobenzonitrile. More preferred is 2,6-dichlorobenzonitrile.

In the process according to the present invention, the dihalogeno benzonitrile is reacted with 4,4′-biphenol as represented by the following formula:

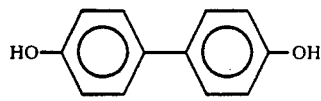 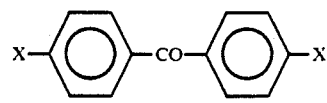

in the presence of the alkali metal compound in the aprotic polar solvent.

The alkali metal compound to be used may be any one that can convert the 4,4'-biphenol into the corresponding alkali metal salt and may include, for example, an alkali metal carbonate and an alkali metal hydrogen carbonate.

The alkali metal carbonate may include, for example, lithium carbonate, sodium carbonate, potassium carbonate, rubidium carbonate, cesium carbonate and so on. Sodium carbonate and potassium carbonate are preferred.

The alkali metal hydrogen carbonate may include, for example, lithium hydrogen carbonate, sodium hydrogen carbonate, potassium hydrogen carbonate, rubidium hydrogen carbonate, cesium hydrogen carbonate and so on. Sodium hydrogen carbonate and potassium hydrogen carbonate are preferred.

In accordance with the process of the present invention, there may be conveniently used sodium carbonate and potassium carbonate among the alkali metal compounds as have been enumerated hereinabove.

The aprotic polar solvents to be used for the present invention may include, for example, N,N-dimethylformamide, N,N-diethylformamide, N,N-dimethylacetamide, N,N-diethylacetamide, N,N-dipropylacetamide, N,N-dimethylbenzoic amide, N-methyl-2-pyrrolidone, N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-3-methyl-2-piperidone, N-methyl-3-ethyl-2-piperidone, dimethylsulfoxide, diethylsulfoxide, 1-methyl-1-oxosulphorane, 1-ethyl-1-oxosulphorane, 1-phenyl-1-oxosulphorane, N,N'-dimethylimidazolidinone, diphenylsufone, and so on.

The dihalogeno benzonitrile may be used in a molar ratio thereof to a sum of the dihalogeno benzonitrile and the 4,4'-dihalogeno benzophenone ranging from 0.15:1 to 0.40:1. The alkali metal compound may be used in an amount ranging usually from 1.01 to 2.50 equivalents, preferably from 1.02 to 1.20 equivalents, with respect to one hydroxy group of the 4,4'-biphenol.

The amount of the aprotic polar solvent is not restricted to any particular range, however, the aprotic polar solvent may be used in an amount ranging from 200 parts to 2,000 parts by weight per 100 parts by weight of a sum of the dihalogeno benzonitrile, the 4,4'-biphenol and the alkali metal compound.

In accordance with the process of the present invention, the reaction product obtained by reacting the dihalogeno benzonitrile with the 4,4'-biphenol in the presence of the alkali metal compound in the aprotic polar solvent is then reacted with the 4,4'-dihalogeno benzophenone.

The 4,4'-dihalogeno benzophenone to be used may be represented by the following general formula:

(wherein X has the same meaning as above). The 4,4'-dihalogeno benzophenone as represented by the general formula above may appropriately include, for example, 4,4'-difluorobenzophenone and 4,4'-dichlorobenzophenone.

In accordance with the process of the present invention, the 4,4'-dihalogeno benzophenone may be used in a molar ratio of a sum of the 4,4'-dihalogeno benzophenone and the dihalogeno benzonitrile to the 4,4'-biphenol ranging usually from 0.98:1 to 1.02:1, preferably from 1.00:1 to 1.01:1.

The polyetheric copolymers may be prepared by the process according to the present invention, for example, by simultaneously adding the dihalogeno benzonitrile, the 4,4'-biphenol, and the alkali metal compound to the aprotic polar solvent and allowing the dihalogeno benzonitrile to react with the 4,4'-biphenol at a temperature ranging usually from 150° to 250° C., preferably from 180° to 220° C. (first step) and then by adding the 4,4'-dihalogeno benzophenone to the resulting reaction mixture and carrying out a series of reactions at a temperature ranging usually from 150° to 380° C., preferably from 180° to 330° C. (second step). If the reaction temperatures in the first step and in the second step would be lower than their lower limits, then the reaction velocities become too slow to be practical, on the one hand, and if the temperatures to be used in the first and second steps would be higher than their upper limits, on the other, side reactions may be caused to occur.

Reaction times required for such a series of the reactions as have been described hereinabove may range usually from 0.1 to 10 hours, preferably from 1 to 5 hours. More specifically, the reaction time required for the first step may be in the range usually from 0.1 to 2 hours, preferably from 0.3 to 1 hour, while the reaction time required for the second step may range usually from 0.1 to 8 hours, preferably from 0.8 to 5 hours.

By adjusting the reaction times, the reaction temperatures and so on, a melt viscosity of the resulting polyetheric copolymer can be adjusted. In other words, in order to provide the polyetheric copolymer having a high melt viscosity, the reaction may be preferably carried out at a higher temperature for a longer reaction period of time.

After completion of the reaction, the aprotic polar solvent containing the resulting polyetheric copolymer is subjected to per se known separation and purification operations in conventional manner, thereby yielding the polyetheric copolymer.

The polyetheric copolymer prepared in the manner as have been described hereinabove is found to have a structure in which the recurring unit as represented by the general formula (I) and the recurring unit as represented by the general formula (II) are connected to each other in a random fashion, and the process according to the present invention can provide the polyetheric copolymer in simplified steps and with a high efficiency.

(2-2) Process (B) for the Preparation of the Polyetheric Copolymers

Another feature of the novel processes for the preparation of the polyetheric copolymers involves reacting the dihalogeno benzonitrile in an amount corresponding to a molar ratio thereof to a sum of the dihalogeno benzonitrile, 4,4'-dichlorobenzophenone and 4,4'-difluorobenzophenone ranging from 0.15:1 to 0.40:1 with 4,4'-biphenol and 4,4'-dichlorobenzophenone in an amount substantially equimolar to the sum thereof in the presence of the alkali metal compound in the aprotic polar solvent (first step) and then copolymerizing the reaction product resulting from the first step with 4,4'-difluorobenzophenone (second step).

The kinds and amounts of the dihalogeno benzonitrile, the 4,4'-dichlorobenzophenone, the 4,4'-difluorobenzophenone, the alkali metal compound and the aprotic polar solvent may be the same as those described above in the feature (2-1) for the process (A) for the preparation of the polyetheric copolymers.

It is desired that a molar ratio of the 4,4'-dichlorobenzophenone to be used for the reaction in the first step to the 4,4'-difluorobenzophenone to be used for the final copolymerization in the second step be in the range from 60-95 to 5-40.

The reaction temperatures and the reaction times to be required for the process (B) for the preparation of the polyetheric copolymers are substantially the same as those described above in the feature (2-1) for the process (A) for the preparation of the polyetheric copolymers.

(2-3) Process (C) for the Preparation of the Polyetheric Copolymer

Further another feature of the novel process for the preparation of the polyetheric copolymers involves reacting a dihalogenobenzonitrile in an amount corresponding to a molar ratio thereof to a sum of the dihalogenobenzonitrile and 4.4'-dihalogeno benzophenone in the range from 0.15:1 to 0.40:1 with 4,4'-dihalogeno benzophenone in an amount corresponding to a molar ratio thereof to the sum in the range from 0.85:1 to 0.6:1 and 4,4'-biphenol in an amount substantially equimolar to the sum in the presence of an alkali metal compound in a diphenylsulfone.

In this process, the kinds and amounts of the reactants and the alkali metal compound and reaction time may be the same as those described above in the feature (2-1) for the process (A) for the preparation of the polyetheric copolymers. In this process it is characteristic to use the diphenylsulfone as a solvent, to raise the raction temperature gradually and to proceed a copolymerization at a high temperature of 300°-350° C. in a second step of this process.

(3) Polyetheric block copolymers

The polyetheric block copolymers according to the feature (3) of the present invention as a preferred embodiment of the polyetheric copolymers are characterized by a recurring unit block as represented by the following general formula (III):

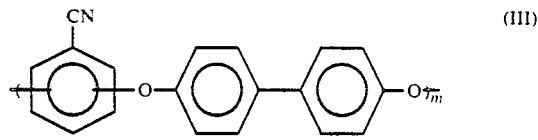

and by a recurring unit block as represented by the following general formula (IV):

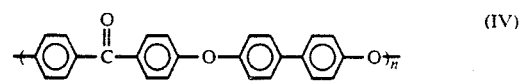

(wherein m is an integer from 10 to 100; and n is an integer from 80 or smaller) by a molar ratio of the recurring unit [I], which is defined in page 4, to a sum of the recurring unit [I] and [II], which is defined in page 5, i.e., (I)/[(II)+(III)], ranging from 0.15:1 to 0.4:1 and by a melt viscosity at 400° C. in the range from 500 to 100,000 poise.

One of the significant points for the polyetheric block copolymers according to the present invention resides in the fact that they are constituted by the recurring unit blocks as represented by the general formulas (III) and (IV) and that the molar ratio of the recurring unit (I) to the sum of the recurring unit blocks (I) and (II) is in the range from 0.15:1 to 0.40:1.

If the molar ratio of the recurring unit block (I) is below the lower limit, on the one hand, a glass transition temperature of the resulting polyetheric block copolymer becomes too low and its resistance to heat is reduced or its melting point becomes too high, thereby impairing its moldability. If the molar ratio of the recurring unit block (I) exceeds its upper limit, a crystallizability of the resulting polyetheric block copolymer may be lost, thereby decreasing a resistance to heat and solvents.

It is also of significance that the polyetheric block copolymer according to the present invention has a melt viscosity at the temperature of 400° C. in the range from 500 to 100,000 poise. If its melt viscosity is below the lower limit, the polyetheric block copolymer having such a low molecular weight cannot maintain its sufficient resistance to heat and mechanical strength.

The polyetheric block copolymers according to the present invention has characteristics, for instance, that the polyetheric block copolymers as described in the feature (3) of the present invention have their glass transition temperature ranging from 180° C. to 190° C. and their crystalline melting points ranging from 360° C. to 410° C., which are somewhat higher than those of the polyetheric copolymers as have been described in the feature (1) of the present invention.

(4) Process for the preparation of the polyetheric block copolymers

The feature (4) of the present invention for the novel process for the preparation of the polyetheric block copolymers involves reacting the dihalogeno benzonitrile in an amount corresponding to a molar ratio of the dihalogeno benzonitrile to the sum of the dihalogeno benzonitrile and the 4,4'-dihalogeno benzophenone ranging from 0.15:1 to 0.40:1 with 4,4'-biphenol in an amount corresponding to a molar ratio thereof to the dihalogeno benzonitrile ranging from 0.90:1 to 0.98:1 or from 1.01:1 to 1.10:1 in the presence of the alkali metal compound in the aprotic polar solvent (first step) and then reacting the resulting reaction product with the 4,4'-biphenol and the 4,4'-dihalogeno benzophenone, the 4,4'-biphenol being used in an amount obtained by subtracting the molar amount of the 4,4'-biphenol used in the first step from an amount substantially equimolar to the above sum (second step).

In accordance of the process of the present invention, the kinds and amounts of the dihalogeno benzophenones, the 4,4'-biphenol, the alkali metal compound and the aprotic polar solvent are the same as those described hereinabove in the feature (2–1) of the process (A) for the preparation of the polyetheric copolymers.

It is the same reason as that being described under the heading of (1) Polyetheric copolymers to limit the molar ratio of the recurring units in this polyetheric copolymer.

The 4,4'-biphenol may be used in a molar ratio thereof to the dihalogeno benzonitrile in the range from 0.90:1 to 0.98:1 or from 1.01:1 to 1.10:1.

In accordance with the present invention, as have been described hereinabove, the amount of the 4,4'-biphenol is adjusted in such a molar ratio within the above range as being somewhat short or somewhat excessive with respect to the dihalogeno benzonitrile so that the polyetheric block copolymers having the properties can be prepared.

If the molar ratios of the 4,4'-biphenol would be below 0.90 to 1 or above 1.10 to 1, on the one hand, such polyetheric block copolymers cannot be provided. If the molar ratios thereof would be from higher than 0.98 to 1 to lower than 1.01 to 1, on the other, it is undesirable because a homopolymer consists of the unit blocks (III) only.

The amounts of the alkali metal compound and the aprotic polar solvent may be substantially the same as those used in the feature (2–1) for process for the preparation of the polyetheric copolymers.

The reaction temperature to be used in the first step may be in the range usually from 150° C. to 250° C., preferably from 180° C. to 210° C., and the reaction time may range usually from 30 minutes to 3 hours, preferably from 40 minutes to 2 hours.

In the process for the preparation of the polyetheric block copolymers, the second step involves reacting the reaction product resulting from the first step with the 4,4'-biphenol and the 4,4'-dihalogeno benzophenone.

The 4,4'-dihalogeno benzophenones may be the same as those used in the feature (2–1) for process for the preparation of the polyetheric copolymers.

It is to be noted that the amount of the 4,4'-biphenol to be used in the second step is an amount obtained by subtracting the molar amount thereof consumed in the first step from the amount thereof substantially equimolar to the sum of the dihalogeno benzonitrile and the 4,4'-dihalogeno benzophenone.

In the second step, it is preferred that the 4,4'-biphenol is charged first and then the 4,4'-dihalogeno benzophenone is charged or the 4,4'-biphenol is charged simultaneously with the 4,4'-dihalogeno benzophenone.

In the former case, the reaction temperature for the reaction of the reaction product obtained in the first step with the 4,4'-biphenol may be in the range usually from 150° C. to 350° C., preferably from 180° C. to 320° C. and the reaction time may be in the range usually from 30 minutes to 3 hours, preferably from 30 minutes to 1 hour. The reaction time when the 4,4'-dihalogeno benzophenone is later charged may range usually from 30 minutes to 5 hours, preferably from 30 minutes to 2 hours, although the reaction temperature may be the same as has been described immediately hereinabove.

In the latter case when the 4,4'-biphenol and the 4,4'-dihalogeno benzophenone are charged together, the reaction time may be in the range usually from 10 minutes to 5 hours, preferably from 30 minutes to 2 hours, although the reaction temperature may be the same as the temperature which is used for the reaction of the reaction product obtained in the first step.

In either case, if the reaction temperature is below 150° C., the reaction velocity becomes too slow to be practical, and the reaction temperature above 350° C. may cause side reactions.

After completion of the reaction in the second step, the resulting objective polyetheric block copolymer is recovered from the aprotic polar solvent by means of per se known separation and purification in conventional manner.

The resulting polyetheric block copolymers according to the present invention can be prepared in simplified steps and with a high efficiency.

(5) Terminal-stabilized polyetheric copolymers

In preparing the polyetheric copolymers as the feature (1) and the polyetheric block copolymers as the feature (3) of the present invention, a sum of the dihalogeno benzonitrile and the dihalogeno benzophenone is reacted usually in a somewhat excessive amount with the 4,4'-biphenol. It is to be noted that, if an amount of the 4,4'-biphenol to be charged gets larger, there may be prepared a copolymer having a hydroxy group at a terminal of its polymer chain. Such a copolymer, however, may suffer gellation due to a crosslinking reaction upon heat molding or forming, thereby impairing its moldability or formability. In order to improve a thermal stability of such a copolymer during its heat molding or forming, it is desired to stabilize the terminal of the copolymer.

As the polyetheric copolymers and the polyetheric block copolymers, each being stabilized at its polymer chain terminal, there may be mentioned, for example, terminal-stabilized copolymers in which a group at the terminal of the polymer chain of the polyetheric copolymer as have been described hereinabove in the feature (1) and the polyetheric block copolymer as have been described hereinabove in the feature (3) according to the present invention may be represented by the following general formula (V):

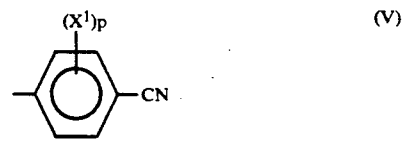

(V)

(wherein $X^1$ is a hydrogen atom or a halogen atom provided however that $X^1$ may be identical to or different from each other when $X^1$ is present plurally; and p is an integer from 1 to 4); or by the following general formula (VI):

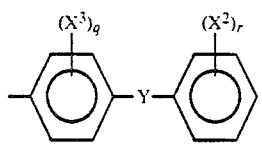

(wherein $X^2$ is a hydrogen atom or a halogen atom; Y is a carbonyl group or sulfone group; $X^3$ is a hydrogen atom or a halogen atom; q is an integer from 1 to 4; and r is an integer from 1 to 5; provided however that $X^2$ and $X^3$ may be identical to or different from each other when each of $X^2$ and $X^3$ is present plurally), which has a melt viscosity at 400° C. in the range from 500° C. to 100,000 poise.

As the terminal-stabilized polyetheric copolymer according to the feature (5) of the present invention is characterized in that the terminal of the polymer chain is blocked by the group as represented by the general formula (V) or (VI) above, the copolymer has a more improved stability without any crosslinking caused upon heat melting or forming, as compared with the copolymers without such terminal group.

Preferred examples of the terminal group as represented by the general formula (V) above may include, for example:

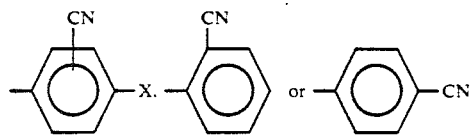

(wherein X is a halogen atom).

Preferred examples of the terminal group as represented by the general formula (VI) above may include, for example,

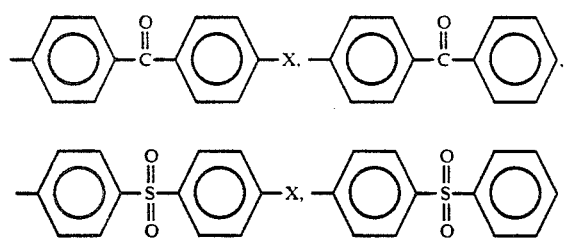

(wherein X has the same meaning as above).

(6) Process for the preparation of the terminal-stabilized polyetheric copolymers The terminal-stabilized polyetheric copolymers according to the feature (5) of the present invention may be prepared by copolymerizing the dihalogeno benzonitrile and the 4,4'-dihalogeno benzophenone with the 4,4'-biphenol in the presence of the alkali metal compound in the aprotic polar solvent and then reacting the resulting reaction product with an active-halogen containing compound as represented by the following general formula (VII):

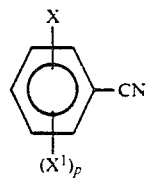

(wherein X, $X^1$ and p have the same meanings as above) or as represented by the following general formula (VIII):

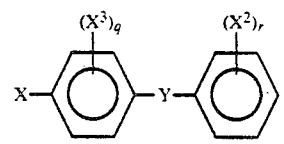

(wherein X, $X^2$, $X^3$, y, q and r have the same meanings as above).

The halogeno benzonitriles as represented by the general formula (VII) above may include, for example, 2-chlorobenzonitrile, 4-chlorobenzonitrile, 2,4-dichlorobenzophenone, 2,6-dichlorobenzonitrile, 2-fluorobenzonitrile, 4-fluorobenzonitrile, 2,4-difluorobenzonitrile and 2,6-difluorobenzonitrile.

The halogeno benzophenones as represented by the general formula (VIII) above may include, for example, 2-chlorobenzophenone, 2-fluorobenzophenone, 4-chlorobenzophenone, 4-fluorobenzophenone, 4,4'-dichlorobenzophenone and 4,4'-difluorobenzophenone.

The halogeno diphenyl sulfones as represented by the general formula (VIII) above may include, for example, 2-chlorodiphenyl sulfone, 2-fluorodiphenyl sulfone, 4-chlorodiphenyl sulfone, 4-fluorodiphenyl sulfone, 4,4'-dichlorodiphenyl sulfone and 4,4'-difluorobenzophenone.

In accordance with the process of the present invention, a particular active-halogen containing compound such as 2-fluorobenzonitrile and 4,4'-difluorobenzophenone may be conveniently used.

In the process according to the feature (6) of the present invention, the active-halogen containing compound may be used in a molar percentage ranging from 0.01 to 5 mol % with respect to the amount of the 4,4'-biphenol used.

If the molar amount of the active-halogen containing compound is smaller than the lower limit, the resulting polyetheric copolymers cannot be provided with the expected effects resulting from addition thereof. If the molar amount thereof exceeds its upper limit, no effects commensurate with an addition thereof can be achieved and an addition of such a large amount thereof is economically disadvantageous.

In the reaction of the reaction products resulting from the second step of the process as have been described in the features (2-1), (2—2), (2-3) and (4) above of the present invention with the particular active-halogen containing compound as represented by the general formula (VII) or (VIII) above, the reaction temperature may be in the range usually from 150° C. to 380° C., preferably from 180° C. to 330° C.

The reaction time required for a series of the reactions may range usually from 1 minute to 1 hour, preferably from 1 minute to 30 minutes.

After completion of the reaction, the resulting terminal-stabilized polyetheric copolymers can be recovered from the aprotic polar solvent containing the terminal-stabilized polyetheric copolymers in per se known separation and purification procedures in conventional manner.

(7) Process for the preparation of powdery polyetheric copolymers havng a high bulk density The polyetheric copolymers may be subjected to various operations such as transportation, storage and metering before molding and processing after conventional separation, purification operations and so on. At this end, the powdery polyetheric copolymers having a high bulk density are advantageous in operations such as transportation, storage and metering operations.

The polyetheric copolymers prepared by the processes as have been described hereinabove may be converted into the copolymer in a bulky and powdery form by steps as will be described hereinafter.

The powdery copolymers having a high bulk density may be prepared by distilling off the solvent directly from the aprotic polar solvent containing the polyetheric copolymers obtained by polymerizing the dihalogeno benzonitrile and the 4,4'-dihalogeno benzophenone with the 4,4'-biphenol in the presence of the alkali metal compound in the aprotic polar solvent in the manner as have been described hereinabove.

The aprotic polar solvent is the same as those obtained in the second step in the processes as have been described hereinabove in the features (2-1), (2—2), (2-3) and (4) of the present invention.

The temperature at which the solvent is distilled off may vary with the kind of the aprotic polar solvent and may be in the range usually from 50° C. to 250° C. preferably from 150° C. to 200° C. The pressure at which the solvent is distilled off may range usually from 5 to 760 mmHg, preferably from 10 to 200 mmHg.

Direct distillation of the aprotic polar solvent leaves powders of the polyetheric copolymers as a residue which may, in turn, be subjected to conventional purification operation.

A bulk density of the powdery polyetheric copolymer obtained may be in the range usually from 0.3 to 0.6 g/cm³.

When the polyetheric copolymers have its bulk density in the range as have been defined hereinabove, its purification operation becomes easier and its productivity is improved.

It is further to be noted that this process recovers the aprotic polar solvent at a efficiency ranging from 96% to 99.5%. This can be said to be advantageous in terms of recovery of the aprotic polar solvent.

The following is a detailed description of examples of the features (1) to (7) of the present invention and comparative examples.

Examples 1 to 11 are directed to examples of the features (1), (2-1), (2—2), (2-3) and (7).

EXAMPLE 1

A 5-liter reactor equipped with a Dean & Stark trap filled with toluene, a stirrer, and a tube for blowing argon gas was charged with 32.34 grams (0.188 moles) of 2,4-dichlorobenzonitrile, 139.66 grams (0.75 mole) of 4,4'-biphenol, 124.39 grams (0.9 mole) of potassium carbonate, and 1.5 liters of N-methyl-2-pyrrolidone and the temperature of the mixture was elevated from room temperature to 195° C. over the period of 1 hour while argon gas was blown thereinto.

After the temperature was raised, then a small amount of toluene was added to the mixture and water produced was azeotropically distilled off.

Then the mixture was reacted at 195° C. over the period of 30 minutes, a solution of 122.85 grams (0.563 mole) of 4,4'-difluorobenzophenone in 1.5 liters of N-methyl-2-pyrrolidone was added and the reaction was further continued for another 1 hour.

After completion of the reaction, the reaction product was precipitated by pouring the reaction mixture into purified water and then crushed with a blender (Warning, Inc.), then washed in order with acetone, methanol, water, and acetone, and dried yielding 259.36 grams (98%) of a copolymer in a powdery form, having a bulk density of 0.12 g/cm³.

The resulting copolymer has been measured for its properties and found to have a melt viscosity (zero sheare viscosity) of 13,000 poise, a glass transition temperature of 182° C., a crystalline melting point of 379° C., a thermal decomposition temperature of 562° C. (in air, weight loss of 5%). It is to be noted that, in the following examples, the thermal decomposition temperature is measured with a weight loss of 5% in air in the same manner as measured herein.

A scattering intensity of the resulting polyetheric copolymer measured by wide angle X-rays revealed that the copolymer has a crystallinity of 44%. The copolymer could not be measured for its solution viscosity because it could not be dissolved in any solvent due to its high resistance to solvents.

The IR measurement of the resulting copolymer confirmed absorption peaks at 2,220 cm⁻¹ on the basis of the nitrile group, at 1,650 cm⁻¹ on the basis of the carbonyl group, and at 1,240 cm⁻¹ on the basis of the ether linkage.

As a result and as its elemental analysis result, the resulting polyetheric polymer has been confirmed to be a polymer with recurring units as represented by the following formulas:

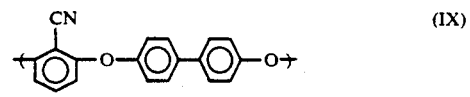

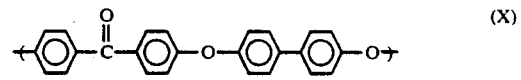

Molar ratio of unit (IX)=0.25

The polyetheric copolymer was injection-molded to test pieces and they were measured for their mechanical strength.

The test results are shown in Table 1 below.

Test items have been measured as follows:

Tensile strength, modulus in tension, and elongation: ASTM D-638
Bending strength and bending modulus: ASTM D-790
Izod impact strength: ASTM D-256
Heat distortion temperature: ASTM D-648

The test pieces were measured for their solubility in solvents and found that they were insoluble in acetone, chloroform, carbon tetrachloride, methylene chloride, ethanol, toluene, xylene and an acid other than concentrated sulfuric acid. As a result of immersion in concentrated sulfuric acid for one month, the test piece was found to be swelled to some extent.

EXAMPLES 2-5

The procedures of Example 1 were followed in substantially the same manner with the exception that amounts of 2,6-dichlorobenzonitrile and 4,4'-difluorobenzophenone were used as shown in Table 2 below.

Table 2 below shows a ratio of the recurring unit as represented by the formula (IX):

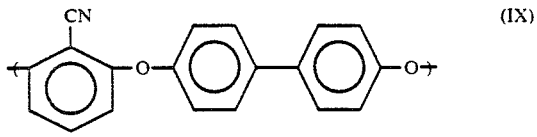

in the resulting polyetheric copolymer as well as its melt viscosity, thermal characteristics and crystallinity.

COMPARATIVE EXAMPLE 1

The procedures of Example 1 were followd in substantially the same manner with the exception that a ratio of 2,6-dichlorobenzonitrile to 4,4'-difluorobenzophenone was changed from 25:75 to 10:90, yielding a polyetheric copolymer.

The resulting copolymer was found to have a melt viscosity at 400° C. of 800 poise so that its molecular weight was low. It was then press-molded to a film and the resulting film was found very brittle.

TABLE 1

| Test Items | Test Methods | Measuring Temp etc. | Example 1 |
|---|---|---|---|
| Tensile strength (kg/cm²) | ASTM D-638 | 23° C. | 1,100 |
| | | 250° C. | 90 |
| Modulus in tension (kg/cm²) | ASTM D-638 | 23° C. | 35,000 |
| | | 250° C. | 3,100 |
| Elongation (%) | ASTM D-638 | 23° C. | 55 |
| Bending strength (kg/cm²) | ASTM D-790 | 23° C. | 2,050 |
| | | 250° C. | 300 |
| Bending modulus (kg/cm²) | ASTM D-790 | 23° C. | 38,000 |
| | | 250° C. | 9,000 |
| Izod impact strength (kg · cm/cm) | ASTM D-256 | Notched | 13.0 |
| | | Unnotched | 86 |
| Heat distortion temp (°C.) load of 18.6 kg | ASTM D-648 | — | 205 |

TABLE 2

| Ex. | Molar ratio of unit (IX) | Melt viscosity (poise) | Glass transition temp, °C. | Crystalline melting point, °C. | Heat decomp. temp. °C. | Crystallinity, % |
|---|---|---|---|---|---|---|
| 1 | 0.25 | 13,000 | 182 | 379 | 562 | 44 |
| 2 | 0.15 | 5,300 | 163 | 404 | 538 | 53 |
| 3 | 0.20 | 9,800 | 172 | 384 | 551 | 47 |
| 4 | 0.30 | 16,000 | 185 | 348 | 560 | 36 |
| 5 | 0.35 | 19,500 | 193 | 333 | 558 | 31 |

EXAMPLE 6

A reactor similar to that used in Example 1 was charged with 30.962 grams (0.18 mole) of 2,6-dichlorobenzonitrile, 75.333 grams (0.30 mole) of 4,4'-dichlorobenzophenone, 110.609 grams (0.59 mole) of 4,4'-biphenol, 120.36 grams (0.72 mole) of potassium carbonate and 3 liters of N,N'-dimethylimidazolidinone, and the mixture was heated to 220° C. over the period of one hour while argon was blown into the reactor.

After the temperature was raised, a small amount of toluene was added and water produced was azeotropically distilled off.

Then the mixture was reacted at 220° C. to 224° C. for 2 hours and a solution of 26.184 grams (0.12 mole) of 4,4'-difluorobenzophenone in 50 ml of N,N'-dimethylimidazolidinone was added to the mixture followed by reaction for another one hour.

After completion of the reaction, the reaction mixture was treated in the same manner as in Example 1, yielding a polyetheric copolymer in the amount of 198.27 grams (yield: 97%) in a white powdery form.

The resulting copolymer was measured for its various properties. The results are shown in Table 3 below.

EXAMPLE 7

The procedures of Example 6 were followed in substantially the same manner with the exception that 38.702 grams (0.225 mole) of 2,6-dichlorobenzonitrile, 94.166 grams (0.375 mole) of 4,4'-dichlorobenzophenone, 138.354 grams (0.743 mole) of 4,4'-biphenol, 124.389 grams (0.9 mole) of potassium carbonate and 32.73 grams (0.15 mole) of 4,4'-difluorobenzophenone were used, yielding a copolymer in the amount of 250.35 grams (yield: 98%) in a white powdery form.

The results of its characteristics are shown in Table 3 below.

EXAMPLE 8

The procedures of Example 6 were followed in substantially the same manner with the exception that 23.221 grams (0.135 mole) of 2,6-dichlorobenzonitrile, 56.5 grams (0.225 mole) of 4,4'-dichlorobenzophenone, 80.05 grams (0.446 mole) of 4,4'-biphenol, 74.633 grams (0.54 mole) of potassium carbonate and 19.638 grams (0.09 mole) of 4,4'-difluorobenzophenone were used, yielding a copolymer in the amount of 148 grams (yield: 99%) in a white powdery form.

The results of its characteristics are shown in Table 3 below.

EXAMPLE 9

A reactor similar to that used in Example 1 was charged with 78.18 grams (0.45 mole) of 2,6-dichlorobenzonitrile, 266.18 grams (1.06 mole) of 4,4'-dichlorobenpheneone, 279.32 grams (1.50 mole) of 4,4'-biphenol, 288.05 grams (1.65 mole) of potassium carbonate and 3000 grams of diphenylsulfone, the mixture was heated to 190° C. over the period of one hour while argon was blown into the reactor, and a reaction was continued for 1 hour.

Then the mixture was heated to 270° C. over the period of 30 minutes and the reaction was continued for 30 minutes. After that the mixture was heated 320° C. over the period of 30 minutes and the reaction was continued for 40 minutes.

After completion of the reaction, the reaction mixture was cooled in a stainless vat.

The obtained reaction product was treated in the same manner as in Example 1, yielding a polyetheric copolymer in the amouont of 495.68 grams (yield: 97%) in a white powdery form.

The resulting copolymer was measured for its various properties. The results are shown in Table 3 below.

EXAMPLE 10

The procedures of Example 9 were followed in substantially the same manner with the exception that 65.15 grams (0.38 mole) of 2,6-dichlorobenzonitrile and 285.32 grams (1.14 mole) of 4,4'-dichlorobenzophenone were used, yielding a copolymer in the amount of 337.73 grams (yield: 98%) in a white powdery form.

The results of its characteristics are shown in Table 3 below.

TABLE 3

| Ex. | Melt viscosity (poise) | Glass transition temp. °C. | Crystalline melting point. °C. | Heat decomp. temp. °C. |
|---|---|---|---|---|
| 6 | 16.000 | 185 | 378 | 558 |
| 7 | 12.000 | 182 | 380 | 556 |
| 8 | 21,000 | 187 | 375 | 558 |
| 9 | 24,000 | 186 | 360 | 562 |
| 10 | 18.000 | 183 | 365 | 560 |

EXAMPLE 11

This example is directed to an example for preparing a powdery polyetheric copolymer having a high bulk density as described hereinabove in the feature (7) of the present invention.

A 300-ml separable flask equipped with an argon blowing tube, a distiller, and a stirrer was charged with 6.303 grams (0.025 mole) of 4,4'-dichlorobenzophenone, 2.580 grams (0.015 mole) of 2,6-dichlorobenzonitrile, 9.207 grams (0.05 mole) of 4,4'-biphenol, 8.293 grams (0.06 mole) of potassium carbonate, and 250 ml of N,N'-dimethylimidazolidinone and the temperature of the mixture was elevated from room temperature to 220° C. and the mixture was retained at this temperature over two hours. Then a solution of 2.182 grams (0.01 mole) in 2 ml of N,N'-dimethylimidazolidinone was added and the reaction was carried out at 220° to 223° C. Immediately after completion of the polymerization, the solvent was distilled off at 200° C. and 600 mmHg over the period of 30 minutes while the stirring was continued. The pressure was reduced to 100 mmHg at the final stage of distillation of the solvent.

The amount of the solvent recovered was 246 ml (98.5%).

A polymer in a powdery form was left in the flask, which was then washed three times with 1 liter of water and once with 1 liter of acetone followed by drying.

The yield of the polymer was 16.8 grams (98.5%). The polymer was found to have a glass transition temperature of 185.2° C., a melting point of 376° C., a thermal decomposition temperature of 560° C., a melt viscosity of 26,000 poise at 400° C., and a bulk density of 0.51 grams cm$^3$.

As compared with a bulk density of the polyetheric copolymer as prepared in Example 1 above, the bulk density of the polyetheric copolymer prepared in this example was found to be a powdery polymer having a higher bulk density The following is directed to examples representing the features (3) and (4) of the present invention.

EXAMPLE 12

First Step

A 5-liter reactor equipped with a Dean & Stark trap filled with toluene, a stirrer, and a tube for blowing argon gas was charged with 43.1 grams (0.2318 mole) of 4,4'-biphenol, 38.7 grams (0.255 moles) of 2,6-dichlorobenzonitrile, 37.32 grams (0.27 mole) of potassium carbonate, and 1 liter of N-methyl-2-pyrrolidone and the temperature of the mixture was elevated from room temperature to 195° C. over the period of 1 hour while argon gas was blown thereinto.

After the temperature was raised, then a small amount of toluene was added to the mixture and water produced was azeotropically distilled off.

The resulting polymer was measured for its molecular weight by means of vapor pressure osmometry (VPO method) and its molecular weight was found to be 7,200.

Second Step

To a solution containing the product prepared in the above step was added a solution of 75.001 grams (0.511 mole) of 4,4'-biphenol in 1 liter of N-methyl-2-pyrrolidone, and the mixture was reacted at 195° C. for 30 minutes. To the reaction mixture was further added a solution of 114.56 grams (0.525 mole) of 4,4'-difluorobenzophenone in 1 liter of N-methyl-2-pyrrolidone, and the reaction was further continued at 195° C. for another 1 hour. The water produced was distilled off azeotropically by adding toluene.

After completion of the reaction, the product was crushed with a blender (Warning, Inc.), then washed in order with methanol, water, and methanol, and dried yielding 259.4 grams (98%) of a polymer.

Identification of product

The resulting polymer was measured for its infrared absorption spectra and found to have absorption peaks at 2,220 cm$^{-1}$ on the basis of nitrile group, at 1,650 cm$^{-1}$ on the basis of the carbonyl group, and at 1,240 cm$^{-1}$ on the basis of the ether linkage.

This IR result and results of elemental analysis as well as measurement for the molecular weight by means of the VPO method reveal that the polymer is a polyetheric block copolymer having the chemical structures which follows. A yield of this polyetheric block copolymer was found to be 98% based on the yield of the above polymer product.

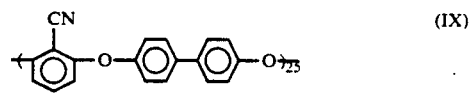

(IX)

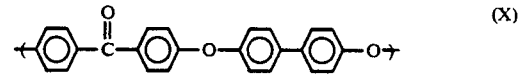

(X)

Molar ratio of unit (IX)=0.30

Measurement for Properties

The polyetheric block copolymer was measured for a melt viscosity at 420° C. and found to be 35,000 poise as shown in Table 4 below. For its thermal characteristics, it was found to have a glass transition temperature of 187° C., a crystalline melting point of 395° C., and a thermal decomposition temperature of 561° C.

A scattering intensity of the resulting polyetheric block polymer measured by wide angle X-rays revealed that the copolymer has a crystallinity of 47%.

For a resistance to solvents, the copolymer was insoluble in acetone, chloroform, carbon tetrachloride, methylene chloride, ethanol, toluene, and xylene. It was also found to have a resistance to acids such as hydrochloric acid and nitric acid.

The polyetheric block copolymer was injection-molded to test pieces and they were tested for tensile strength, modulus in tension, and elongation according to the test procedures as those used in Example 1.

The test results are shown in Table 4 below.

EXAMPLE 13

The procedures of Example 12 were followed in substantially the same manner with the exception that a molar ratio of 4,4'-biphenol to 2,6-dichlorobenzonitrile was 1.03 to 1 in the first step and a molar ratio of the 2,6-dichlorobenzonitrile used in the first step to 4,4'-difluorobenzophenone used in the second step was 0.2 to 1, thereby yielding a polyetheric block copolymer having the following chemical structures:

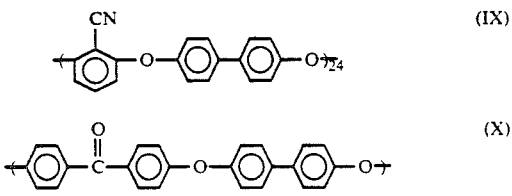

Molar ratio of unit (IX)=0.2

The measurement results for properties of the resulting polyetheric block copolymer are shown in Tables 4 and 5 below.

EXAMPLE 14.

The procedures of Example 12 were followed in substantially the same manner with the exception that a molar ratio of 4,4'-biphenol to 2,6-dichlorobenzonitrile was 1.03 to 1 in the first step and a molar ratio of the 2,6-dichlorobenzonitrile used in the first step to 4,4'-difluorobenzophenone used in the second step was 0.4 to 1, thereby yielding a polyetheric block copolymer having the following chemical structures:

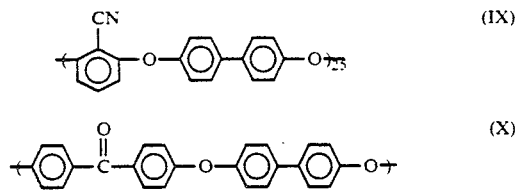

Molar ratio of unit (IX)=0.4

The measurement results for properties of the resulting polyetheric block copolymer are shown in Tables 4 and 5 below.

EXAMPLE 15

First Step

A reactor similar to that used in Example 12 was charged with 28.74 grams (0.155 mole) of 4,4'-biphenol, 26.8 grams (0.15 moles) of 2,6-dichlorobenzonitrile, 82.93 grams (0.6 mole) of potassium carbonate, and 0.6 liter of N-methyl-2-pyrrolidone and the temperature of the mixture was elevated from room temperature to 195° C. over the period of 1 hour while argon gas was blown thereinto.

After the temperature was raised, then a small amount of toluene was added to the mixture and water produced was azeotropically distilled off. Thereafter, the mixture was further reacted at 195° C. for 1 hour.

The resulting polymer was measured for its molecular weight by means of the VPO method and its molecular weight was found to be 7,200.

Second Step

To a solution containing the product prepared in the above step was added a solution of 63.34 grams (0.34 mole) of 4,4'-biphenol and 76.38 grams (0.35 mole) of 4,4'-difluorobenzophenone in 1.4 liters of N-methyl-2-pyrrolidone, and the mixture was heated to 195° C. Thereafter, toluene was added and the water produced was distilled off azeotropically. Then the mixture was further reacted at 195° C. for another 1 hour.

After completion of the reaction, the product was allowed to cool and water was added. Then the product was crushed with a blender.

The resulting powder was washed in order with water and methanol and dried yielding 167 grams of a polymer.

Identification of product

The resulting polymer was measured for its infrared absorption spectra and found to have absorption peaks similar to those obtained in Example 12. This IR result and results of elemental analysis as well as measurement for the molecular weight by means of the VPO method reveal that the polymer is a polyetheric block copolymer having the chemical structures which follows. A yield of this polyetheric block copolymer was found to be 99% based on the yield of the above polymer product.

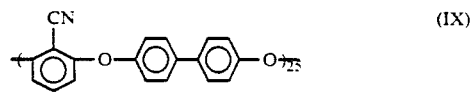

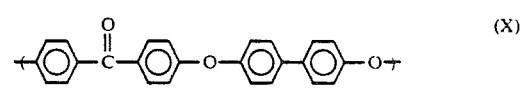

Molar ratio of unit (IX)=0.3

Measurement for properties

The polyetheric block copolymer was measured for a melt viscosity at 420° C. and found to be 9,000 poise as shown in Table 4 below. For its thermal characteristics, it was found to have a glass transition temperature of 181° C., a crystalline melting point of 401° C., and a thermal decomposition temperature of 560° C.

It has also been found to have a resistance to solvents and acids as that prepared in Example 12. Its mechanical strength is shown in Table 5 below.

TABLE 4

| Ex. | Molar ratio of unit (IX) | Glass transition temp, °C. | Crystalline melting point, °C. | Heat decomp. temp, °C. | Melt viscosity (poise) |
|---|---|---|---|---|---|
| 12 | 0.3 | 187 | 395 | 561 | 35,000 |
| 13 | 0.2 | 181 | 405 | 560 | 29,000 |
| 14 | 0.4 | 184 | 400 | 560 | 26,000 |
| 15 | 0.3 | 181 | 401 | 560 | 9,000 |

TABLE 5

| Ex. | Tensile strength. (kg/cm$^{-2}$) | Modulus in tension (kg/cm$^{-2}$) | Elongation % |
| --- | --- | --- | --- |
| 12 | 1.150 | 35.000 | 60 |
| 13 | 1.000 | 35.000 | 42 |
| 14 | 1.100 | 35.000 | 55 |
| 15 | 950 | 36.000 | 35 |

The following examples are directed to the features (6) and (7) of the present invention.

EXAMPLE 16

A reaction mixture containing a polyetheric copolymer having its unstabilized terminal yet a high molecular weight was prepared in the same manner as in Example 1 above.

To this reaction mixture was added a solution of 1.637 grams (0.0075 mole) of 4,4'-difluorobenzophenone as an active-halogen containing compound in N-methyl-2-pyrrolidone, and the mixture was heated to 195° C. and stirred for 15 minutes. This procedure allowed the 4,4'-difluorobenzophenone to be connected to the hydroxyl group at the terminal of the polymer chain.

After completion of the reaction, the reaction mixture was treated in the same manner as in Example 1 above, yielding 260.4 grams (98%) of the product in a white powdery form having a bulk density of 0.12 grams/cm$^3$.

The product was measured for its physical properties and found to have a melt viscosity at 400° C. of 13,000 poise, a glass transition temperature of 182° C., a crystalline melting point of 379° C., and a heat decomposition temperature of 562° C..

The infrared absorption spectrum of the resulting polymer revealed absorption peaks at 2,220 cm$^{-1}$ on the basis of nitrile group, at 1,650 cm$^{-1}$ on the basis of the carbonyl group, and at 1,240 cm$^{-1}$ on the basis of the ether linkage. No absorption spectrum of the hydroxyl group was confirmed at 3,600 cm$^{-1}$.

This IR result and results of elemental analysis reveal that the polymer is a polyetheric copolymer having the recurring units and the terminal group of the following chemical structures, respectively, which follows.

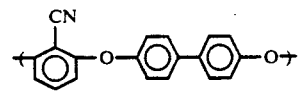

(IX)

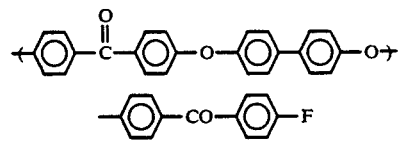

(X)

Molar ratio of unit (IX)=0.25

In order to observe a heat fusion stability, the resulting polyetheric copolymer was placed into a melt indexer and measured for its viscosity at 400° C. in one minute and in 10 minutes. The measured viscosities were compared as follows:

$$Mrel = \frac{\eta \text{ (10 minutes)}}{\eta \text{ (1 minute)}} = \frac{14,500}{13,000} = 1.11$$

As a result, there is no big variation in its viscosity so that it is confirmed that no cross-linking reaction is caused to occur.

EXAMPLE 17

A reactor similar to that used in Example 1 was charged with 30.962 grams (0.18 mole) of 4,4'-dichlorobenzonitrile, 75.333 grams (0.30 mole) of 4,4'-dichlorobenzophenone, 112.72 grams (0.606 mole) of 4,4'-biphenol that is somewhat larger than a total mole of the above two halides, 120.36 grams (0.72 mole) of potassium carbonate, and 3 liters of N-dimethylimidazolidinone, and the mixture was heated to 220° C. over the period of 1 hour while argon is blown into the mixture.

After the temperature was raised, a small amount of toluene was added to azeotropically distill off the water produced.

Then the temperature was raised to 220° C. and the reaction was further continued for another two hours. Thereafter, a solution of 26.184 grams (0.12 mole) of 4,4'-difluorobenzophenone in 50 ml of N,N-dimethylimidazolidinone was added and the reaction was continued for another 1 hour.

To the resulting reaction mixture containing a polyetheric copolymer having a high molecular weight yet having an unstabilized terminal was added a solution of 1.0 gram of 2-fluorobenzonitrile as an active-halogen containing compound in 5 ml of N-methyl-2-pyrrolidone, and the mixture was stirred at 220° C. for 15 minutes, thereby allowing 2-fluorobenzonitrile to be connected to the hydroxyl group at the terminal of the copolymer chain.

After completion of the reaction, the reaction mixture was crushed, washed, and dried in the same manner as in Example, thereby yielding a product in a white powdery form in the amount of 199.2 grams (yield: 97%).

The product was measured for its physical properties and found to have a melt viscosity at 400° C. of 16,000 poise, a glass transition temperature of 185° C. a crystalline melting point of 378° C., and a heat decomposition temperature of 558° C.

The IR spectrum analysis of this product and results of elemental analysis thereof reveal that the polymer is a polyetheric copolymer having the recurring units and the terminal group of the following chemical structures, respectively, which follows. It is further noted that no absorption of the hydroxyl group at 3,600 cm$^{-1}$ was recognized.

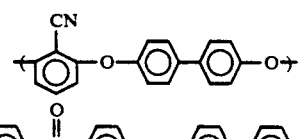

(IX)

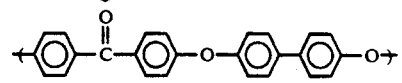

(X)

Molar ratio of unit (IX)=0.3

In order to observe a heat fusion stability, the resulting polyetheric copolymer was placed into a melt indexer and measured for its viscosity at 400° C. in one minute and in 10 minutes. The measured viscosities were compared as follows:

$$Mrel = \frac{\eta \text{ (10 minutes)}}{\eta \text{ (1 minute)}} = \frac{16.800}{16.000} = 1.05$$

As a result, little variation in its viscosity was recognized.

EXAMPLE 18

A 3-liter reactor equipped with a stirrer and a tube for introducing argon was charged with 133.09 grams (0.530 mole) of 4,4'-dichlorobenzophenone, 38.7 grams (0.225 mole) of 2,6-dichlorobenzonitrile, 140.59 grams (0.755 mole) of 4,4'-biphenol, 108.84 grams (0.79 mole) of potassium carbonate and 1,000 grams of diphenylsulfone as a solvent, and the reactor was heated from room temperature to 180° C. over the period of 1 hour and the reaction was continued at that temperature for 1 hour. Then the mixture was raised to 270° C. over the period of 30 minutes and then continued to react at that temperature for 1 hour. The mixture was further raised to 320° C. over the period of 30 minutes and it was reacted at 320° C. for another 1 hour.

To the resulting reaction mixture containing a polyetheric copolymer having a high molecular weight yet having an unstabilized terminal was then added 5 grams of 4,4'-difluorobenzophenone as an active-halogen containing compound, and the mixture was reacted for 15 minutes.

After completion of the reaction, the reaction mixture was poured into a stainless vat and allowed to cool and solidify, thereby producing a film. The film was crushed with a blender (product of Warning) into pieces which in turn were treated with 1 liter of acetone to thereby extract and remove the diphenylsulfone used as a solvent. Then they were washed with a large amount of water to remove inorganic salts and dried, yielding 250.4 grams (yield: 98%) of the product in a white powdery form.

The product was measured for its physical properties and found to have a melt viscosity at 400° C. of 18,000 poise, a glass transition temperature of 185° C., a crystalline melting point of 350° C., and a heat decomposition temperature of 560° C..

The IR spectrum analysis of this product and results of elemental analysis thereof reveal that the polymer is a polyetheric copolymer having the recurring units and the terminal group of the following chemical structures, respectively, which follows. It is further noted that no absorption of the hydroxyl group at 3,600 cm$^{-1}$ was recognized.

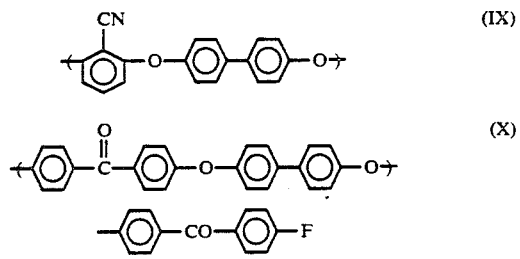

Molar ratio of unit (IX)=0.3

In order to observe a heat fusion stability, the resulting polyetheric copolymer was placed into a melt indexer and measured for its viscosity at 400° C. in one minute and in 10 minutes. The measured viscosities were compared as follows:

$$Mrel = \frac{\eta \text{ (10 minutes)}}{\eta \text{ (1 minute)}} = \frac{20.500}{18.000} = 1.14$$

As a result, little variation in its viscosity was recognized.

The following is a description on uses of the polyetheric copolymers according to the present invention.

(8) Polyetheric copolymer fibers

The polyetheric copolymer fibers as the feature (8) of the present invention is characterized that the fibers consists of the polyetheric copolymer which in turn is drawn at a draw ratio of 1.5 times or more and, more specifically, which is spun and then drawn at the draw ratio of 1.5 times or more at a temperature which is higher by 10° C. to 30° C. than its glass transition temperature.

(a) Polyetheric Copolymer

As a polyetheric resin required for the preparation of the polyetheric copolymer fibers may be conveniently used the polyetheric copolymers as have been described hereinabove in the features (1), (3) and (5) of the present invention. Furthermore, the polyetheric copolymer is particularly appropriate, which has a molar ratio of the recurring unit as represented by the general formula (I) above to a sum of the recurring units (I) and (II) ranging from 0.15:1 to 0.40:1 and a melt viscosity at 400 in the range from 500~100,000 poise, preferably from 3,000 to 50,000 poise. If the molar ratio of the recurring unit (I) is below the lower limit, on the one hand, a glass transition temperature of the resulting polyetheric copolymer may become so low that its resistance to heat may be caused to decrease or may raise its melting point thereby causing a difficulty of spinning performance. If the molar ratio of the recurring unit (I) is beyond the upper limit, on the other hand, crystallizability of the resulting polyetheric copolymer may be lost leading to a reduction in its resistance to heat and solvents. It is further desired that the polyetheric copolymer has a melt viscosity at 400° C. ranging from 500 to 100,000 poise. Such a polyetheric copolymer as having a melt viscosity as low as below the lower limit may not be provided with sufficient resistance to heat and mechanical strength while a copolymer having a melt viscosity larger than the upper limit may cause a decrease in spinning performance.

As have been described hereinabove, the polyetheric copolymer fibers are prepared by drawing the polyetheric copolymer at the draw ratio of 1.5 times or larger. If the copolymer is drawn by lower than the lower limit, a sufficient tensile strength cannot be achieved so that the effect of drawing is rendered insufficient.

The polyetheric copolymer fibers prepared in the way as have been described hereinabove can exhibit a sufficient degree of a heat resistance and a favorable mechanical strength so that they may be appropriately used in various fields which require a high resistance to heat. They are further advantageous because of readiness of the preparation. The polyetheric copolymer fibers having such excellent characteristics as have been described hereinabove may be efficiently prepared by the processes as will be described in more detail hereinafter.

(b) Spinning

The polyetheric copolymer may be appropriately spun by per se known melt extrusion.

A temperature at which the copolymer is spun is higher than its melting point usually by 10° C. to 70° C., preferably by 20° C. to 50° C. If the spinning temperature would be so close to its melting point as low as less than 10° C., an amount of the copolymer to be discharged from a spinneret becomes so small that a size of filaments cannot be adjusted to a sufficient extent. If the copolymer would be spun at a temperature that is higher by more than 70° C. than its melting point, a quality of the resulting spun filaments may be impaired.

In the case of spun filaments having 1,000 denier or larger, on the one hand, it is preferred that a cooling solution bath is disposed immediately under the spinneret where the resulting filaments are allowed to cool rapidly and solidify and then the filaments are wound by a torque winder or the like. In the case of spun filaments having smaller than 1,000 denier, on the other, it is not necessarily required to provide a cooling solution bath and the spun filaments may be conveniently allowed to cool in air.

In this process, a spinning device, a winding device and so on to be used for this spinning are not restricted to particular one and those which are conventionally used for this purpose may be conveniently applicable.

The polyetheric copolymer thus spun in the way as have been described hereinabove is then drawn in such a way as will be described in more detail hereinafter.

(c) Drawing

The undrawn filaments spun in the way as have been described hereinabove are then drawn appropriately by means of any conventional drawing devices. Specifically, the drawing devices may include, for example, a non-contact drawing device using a heated steam, a heating medium, an electric heater or the like, a heating, multistage drawing device with contact-type heaters mounted at multiple stages, and so on.

In this process, whatever drawing device is used, it is significant that a temperature for drawing is higher by 10° C. to 30° C. than the glass transition temperature of the polyetheric copolymer to be used as a material. If the drawing temperature would be lower merely by less than 10° C. than the glass transition temperature thereof, on the one hand, the drawing performance may be impaired and no sufficient effect to be anticipated by drawing may be attained. If the drawing temperature is higher by more than 30° C. than the glass transition temperature thereof, fuzz or wrap may be caused to occur during drawing leading to an unstable drawing.

In this process, it is also significant to draw at the draw ratio of 1.5 times or more, preferably from 2 times to 10 times. If the draw ratio is less than the lower limit, fibers having a sufficient degree of strength may not be provided.

In this process, the polyetheric copolymer is spun and drawn in the way as have been described hereinabove and then heat-treated, as desired, as will be described hereinafter.

(d) Heat treatment

The heat treatment to be carried out as desired may be conducted at a temperature in a range of temperatures which are higher than a crystallization temperature of the polyetheric copolymer and which are lower than its melting point. The heat treatment may further improve a strength of the resulting polyetheric copolymer fibers.

The heat treatment of the drawn filaments may be carried out under tension or without tension.

As have been described hereinabove, this process can easily and efficiently provide the polyetheric copolymer fibers which can be appropriately used in various fields which require an excellent resistance to heat and mechanical stress, particularly high heat resistance.

The following is directed to examples for the feature (8) of the present invention and comparative examples.

EXAMPLE 19

The polyetheric copolymer prepared in substantially the same manner as in Example 1 was molten at 400° C. and spun through a nozzle having an inner diameter of 1.0 mm, a length of 1.0 mm, and a nozzle temperature of 390° C. Immediately after having been spun, the filaments were passed through a 30 cm long tube heated at 300° C. and then allowed to cool in air, thereafter winding undrawn filaments of 35 denier at a velocity of 120 meters per minute.

The resulting undrawn filaments were then drawn at the draw ratio of two times by means of drawing rolls at the temperature of 200° C. and then heat-treated at 240° C. with a heater plate, yielding polyetheric copolymer fibers.

The polyetheric copolymer fibers thus prepared were measured for their tensile strength, elongation, knot strength and Young's modulus. The results are shown in Table 6 below.

The measurement of each item was conducted in accordance with JIS-L-1013-81.

EXAMPLE 20

The procedures of Example 19 were followed in substantially the same manner with the exception that the draw ratio is changed from two times to three times.

The resulting polyetheric copolymer fibers were measured for their physical properties. The results are shown in Table 6 below.

EXAMPLE 21

The procedures of Example 19 were followed in substantially the same manner with the exception that the draw ratio is changed from two times to four times.

The resulting polyetheric copolymer fibers were measured for their physical properties. The results are shown in Table 6 below.

EXAMPLE 22

The polyetheric copolymer fibers as used in Example 19 was molten at 400° C. and then spun through a spinneret pierced with 60 holes, each having an inner diameter of 0.45 mm and a length of 1.35 mm. The temperature of the spinneret was set at 390° C. At an exit of the spinneret was disposed a 300 mm long heating tube heated at the temperature of 300° C.

The spun filaments were passed through the heating tube, allowed to cool in air, and wound at the velocity of 150 meters per minute, thereby yielding undrawn filaments of 800 denier per 60 filaments.

The undrawn filaments were drawn at the draw ratio of two times and heat-treated in substantially the same manner as in Example 19, resulting in the polyetheric copolymer fibers.

The properties of the resulting drawn fibers are shown in Table 6 below.

EXAMPLE 23

The procedures of Example 22 were followed in substantially the same manner with the exception that the draw ratio is changed from two times to three times.

The properties of the resulting drawn fibers are shown in Table 6 below.

EXAMPLE 24

The procedures of Example 22 were followed in substantially the same manner with the exception that the draw ratio is changed from two times to four times.

The properties of the resulting drawn fibers are shown in Table 6 below.

EXAMPLE 25

(a) Preparation of polyetheric copolymer

The procedures of Example 1 were followed in substantially the same manner with the exception that a molar ratio of 2,6-dichlorobenzonitrile to 4,4'-difluorobenzophenone was changed to 3 to 7 from 2.5 to 7.5, yielding a polyetheric copolymer having a molar ratio of the recurring unit (I) to a sum of the recurring units (I) and (II) of 0.30 to 1.

This copolymer was measured for its physical properties resulting in a melt viscosity at 400° C. of 16,000 poise, a glass transition temperature of 185° C., a crystalline melting point of 348° C., and a heat decomposition temperature of 560° C.

(b) Preparation of fibers

The polyetheric copolymer thus prepared in item (a) above was then spun and drawn at the draw ratio of two times in substantially the same manner as in Example 19, thus yielding drawn fibers.

The properties of the drawn fibers are shown in Table 6 below.

EXAMPLE 26

The procedures of Example 25 were followed in substantially the same manner with the exception that the draw ratio is changed from two times to three times.

The properties of the resulting drawn fibers are shown in Table 6 below.

EXAMPLE 27

The procedures of Example 25 were followed in substantially the same manner with the exception that the draw ratio is changed from two times to four times.

The properties of the resulting drawn fibers are shown in Table 6 below.

EXAMPLES 28-30

The polyetheric copolymer as prepared in Example 25 was treated in substantially the same manner as in Examples 22 to 24, respectively, resulting to polyetheric copolymer fibers.

The properties of the respective fibers are shown in Table 6 below.

COMPARATIVE EXAMPLES 2-4

Using polyether ether ketone ("Victrex PEEK 450G"; ICI, Ltd.) as a starting resin, the procedures of Examples 19 to 21, respectively, were followed except using conditions as illustrated in Table 6 below, thereby yielding drawn filaments.

The properties of the respective drawn filaments are shown in Table 6 below.

COMPARATIVE EXAMPLES 5-7

Using polyether ether ketone ("Victrex PEEK 450G"; ICI, Ltd.) as a starting resin, the procedures of Examples 22 to 24, respectively, were followed except using conditions as illustrated in Table 6 below, thereby yielding drawn filaments.

The properties of the respective drawn filaments are shown in Table 6 below.

As will be apparent from Table 6 below, the polyetheric copolymer fibers prepared in this process has been confirmed that they are superior in mechanical strength compared with the fibers prepared in the comparative examples as have been described hereinabove.

TABLE 6

| Examples and Comparative Examples | Draw ratio, times | Drawing Temp., °C. | Heat treating Temp., °C. | Tensile Strength, g/denier | Elongation, % | Knot Strength, g/denier | Young's modulus, kg/mm$^2$ |
| --- | --- | --- | --- | --- | --- | --- | --- |
| Example 19 | 2.0 | 200 | 240 | 5.4 | 32 | 3.5 | 910 |
| Example 20 | 3.0 | 200 | 240 | 5.9 | 29 | 3.9 | 1,000 |
| Example 21 | 4.0 | 210 | 240 | 6.3 | 21 | 4.2 | 1,100 |
| Example 22 | 2.0 | 200 | 240 | 6.0 | 30 | 3.9 | 1,070 |
| Example 23 | 3.0 | 200 | 240 | 6.4 | 25 | 4.1 | 1,150 |
| Example 24 | 4.0 | 210 | 240 | 6.9 | 14 | 4.6 | 1,200 |
| Example 25 | 2.0 | 210 | 250 | 6.8 | 42 | 4.5 | 1,020 |
| Example 26 | 3.0 | 210 | 250 | 7.5 | 36 | 4.8 | 1,100 |
| Example 27 | 4.0 | 220 | 250 | 7.9 | 29 | 5.1 | 1,230 |
| Example 28 | 2.0 | 210 | 250 | 7.2 | 33 | 4.8 | 1,090 |
| Example 29 | 3.0 | 220 | 250 | 8.1 | 28 | 5.4 | 1,250 |
| Example 30 | 4.0 | 220 | 250 | 8.6 | 20 | 5.6 | 1,270 |
| Comp Ex 2 | 2.0 | 160 | 200 | 3.8 | 24 | 2.5 | 800 |
| Comp Ex 3 | 3.0 | 160 | 200 | 4.3 | 18 | 2.8 | 840 |
| Comp Ex 4 | 4.0 | 160 | 200 | 4.7 | 11 | 3.1 | 880 |
| Comp Ex 5 | 2.0 | 160 | 200 | 4.0 | 22 | 2.6 | 910 |
| Comp Ex 6 | 3.0 | 160 | 200 | 4.6 | 19 | 3.1 | 950 |
| Comp Ex 7 | 4.0 | 160 | 200 | 5.2 | 7 | 3.3 | 1,000 |

The polyetheric copolymer fibers prepared in the manner hereinabove in the feature (8) of the present invention characterized by drawing the polyetheric copolymer having the particular recurring unit in the particular range of the molar ratio and by the particular range of the melt viscosity at the draw ratio of 1.5 times or greater are excellent in a heat resistance and mechanical strength. Furthermore, no gellation occurs in the copolymer so that the polyetheric copolymer fibers may be prepared in a ready manner. The polyetheric copolymer fibers may be appropriately used in various fields which require a particularly high resistance to heat.

The following is a description of the heat-resistant and fire-retardant paper as the feature (9) of the present invention.

(9) Heat-resistant and fire-retardant paper

The heat-resistant and fire-retardant paper is characterized by papermaking the polyetheric copolymer fibers.

The polyetheric copolymer fibers may be prepared into heat-resistant and fire-retardant paper by means of the following papermaking operation.

Papermaking into paper

The polyetheric copolymer fibers may be papermade by a wet method or by a dry method as they are as long fibers or after cut into short fibers.

The wet method is a method equivalent of papermaking a pulp as a raw material into paper while the dry method is of an adhesive type, of a fiber bonding type, of a physical bonding type, or the like, and may be appropriately chosen depending upon usage. For example, the dry method is one of preferred modes, in which the papermade paper is pressed with a press machine and contact-bonded at a temperature which is somewhat higher than a glass transition temperature of the polyetheric copolymer used as a raw material.

The following is a description of examples in connection with the feature (9) of the present invention.

EXAMPLES 31

The polyetheric copolymer prepared in substantially the same manner as in Example 1 was molten at 380° C. and spun into filaments using a spinneret pierced with 60 holes having an inner diameter of 0.45 mm. The filaments are wound at the velocity of 150 meters per minute.

The resulting undrawn filaments were then drawn at the draw ratio of five times using a drawing machine of a hot plate type.

Physical properties of the drawn filaments are as follows:
Denier: 160 d/60f
Tensile strength: 6.9 g/d
Elongation: 14%
Young's modulus: 1,200 kg/mm, The drawn filaments were then made into paper so as to be used by 50 grams of the drawn filaments in a 1 m$^2$ of paper. A fiber concentration at this time was 1% by weight. A surfactant ("T260"; Matsushita Yushi K.K.) was used. The papermade paper was dried and then pressed at 200 The resulting fire-retardant paper was measured for its physical properties and they were found to be as follows:
Tensile strength: 4.3 kg/cm$^2$
Tensile elongation: 2%
Critical oxygen index: 40
Moisture absorption percentage: 1.2% [measured at 20° C. and 65% Room Humidity (RH)].

EXAMPLE 32

The polyetheric copolymer was prepared in substantially the same manner as in Example 4 and drawn in substantially the same manner as in Example 31, thereby leading to undrawn filaments of the polyetheric copolymer.

Physical properties of the filaments are as follows:
Denier: 160 d/60f
Tensile strength: 7.9 g/d
Elongation: 29%
Young's modulus: 1,230 kg/mm, The drawn filaments were then made into paper in substantially the same manner as in Example 31.

The resulting fire-retardant paper was measured for its properties and they were found to be as follows:
Tensile strength: 4.5 kg/cm$^2$
Tensile elongation: 2%
Critical oxygen index: 42
Moisture absorption percentage: 1.1% [measured at 20° C. and 65% RH].

The paper prepared from the polyetheric copolymer is a heat-resistant, fire-retardant paper prepared from fibers of the novel polyetheric copolymer which is provided with the particular recurring unit in the particular range of the molar ratio and the particular melt viscosity, which possesses a sufficiently high degree of molecular weight, crystallizability and resistance to heat, and which is useful as a material to be utilized, for example, in electrical, electronic equipment, and mechanical fields. Furthermore, this heat-resistant, fire-retardant paper is extremely low in moisture absorption, compared with conventional heat-resistant, fire-retardant paper, so that it can be appropriately used in electrical and electronic fields as well as in aeroplane material field, etc.

A description which follows turns to the feature (10) of the present invention, which is directed to the polyetheric copolymer films.

(10) Polyetheric copolymer films

The polyetheric copolymer films are characterized in that the polyetheric copolymer is molded into films at a temperature which is higher by 10° C. to 100° C. than its crystalline melting point.

As the polyetheric resins necessary for the preparation of the polyetheric copolymer films, there may be appropriately used those polyetheric copolymers prepared in the features (1), (3) and (5) of the present invention. Particularly preferred are those polyetheric copolymers which further possess a melt viscosity at 400° C. ranging from 3,000 to 100,000 poise.

Process for the preparation of polyetheric copolymer films:

The polyetheric copolymer films may be prepared by forming the polyetheric copolymer into films.

Formation into films may be carried out by extruding the polyetheric copolymer by means of conventional method such as press molding method, extrusion molding method or the like at a temperature higher by from 10° C. to 100° C., preferably from 20° C. to 70° C., than a crystalline melting point of the polyetheric copolymer and by cooling the extruded films rapidly, thereby leading to highly-transparent, amorphous films.

Formation of drawn films may be conducted by drawing, stretching or orienting uniaxially or biaxially at a temperature ranging from a glass transition temperature of the polyetheric copolymer to its crystalline melting point.

Furthermore, the drawn films can be heat-treated, as needed, under tension or without tension, at a temperature which is higher than its crystalization temperature (a temperature at which the copolymer in an amorphous state is crystallized during heat treatment (while the temperature is being elevated) while the film is being forming) yet lower than its crystalline melting point.

In accordance with the present invention, the polyetheric copolymer films may be drawn, stretched or oriented preferably at the draw ratio in the range from 1.5 times to 10 times, more preferably by from 2 times to 5 times, by means of the methods as have been described hereinabove.

It is to be noted that, if the films are drawn, stretched or oriented by less than 1.5 times, a sufficient degree of drawing effects such as improvements in a tensile strength, tensile modulus and so on may not be achieved and, if they are drawn, stretched or oriented by greater than 10 times, a further improved effects cannot be attained. The polyetheric copolymer films as prepared in the manner as have been described hereinabove may be used for extensively broad industrial usage in an approximately whole area of electronics and electrical insulation fields.

The following examples and comparative examples relate to the polyetheric copolymer films as the feature (10) of the present invention.

EXAMPLE 33

The polyetheric copolymer prepared in Example 1 was pressed at 400° C. into a film which, in turn, was placed into water and allowed to cool rapidly, thereby yielding a transparent, amorphous film having a thickness of 200 μm.

The film was then measured for its properties and found to have a tensile strength of 9 kg/mm$^2$, a tensile modulus of 210 kg/mm$^2$, a breaking extension of 210% (as measured in each of the above cases in accordance with ASTM D882), and an critical oxygen index of 31.5 (as measured in accordance with ASTM D2863).

EXAMPLE 34

The polyetheric copolymer prepared in Example 1 was pressed at 400° C. into a film which, in turn, was placed into water with ice cubes, thereby producing a transparent, amorphous film having a thickness of 200μm. The film was then heat-treated at 250° C. for 1 minute yielding a crystallized film.

As a result of measurement of its physical properties, the resulting crystallized film was found to have a tensile strength of 11 kg/mm$^2$, a tensile modulus of 250 kg/mm$^2$, and a breaking extension of 130%. It was also measured for its critical oxygen index which was found to be excellent in fire-retardancy as high as 31.5.

The crystallized film was further measured for its resistance to solvents. Although it has swelled to some extent in concentrated sulfuric acid when immersed for a long period of time, it has been found to be stable against a strong acid such as hydrochloric acid, nitric acid and trifluoroacetic acid, a strong alkali such as sodium hydroxide or potassium hydroxide, an organic solvent such as acetone, dimethylether, methylethyl ketone, benzene, toluene, ethyl acetate, dimethylformamide, N-methylpyrrolidone and methylene chloride, and hot water.

COMPARATIVE EXAMPLE 8

A film was prepared in substantially the same manner as in Example 33 using polyether ether ketone ("Victrex PEEK 450G"; ICI, Ltd.) and measured for its physical properties in the same manner as hereinabove.

Its tensile strength was 9 kg/cm$^2$, its tensile modulus was 210 kg/mm$^2$, its braking extension was 170%, and its critical oxygen index was 23.5.

The resulting film was dissolved in p-chlorophenol, dichloroacetic acid and so on as well as in concentrated sulfuric acid. It has caused crazing to some extent when immersed in acetone.

EXAMPLE 35

The polyetheric copolymer prepared in Example 1 was pressed at 400° C. into a film which, in turn, was placed into water with ice cubes, thereby producing a transparent, amorphous film having a thickness of 200 μm.

The film was then withdrawn at the drawing velocity of 1,000% per minute under conditions as will be described in Table 7 below using a uniaxial drawing machine (Shibata Kikai K.K.) or a biaxial drawing machine (Toyo Seiki Seisakusho K.K.).

The physical properties of the resulting drawn film are shown in Table 7 below. They were measured in accordance with ASTM D882.

EXAMPLES 36–38

An amorphous film was prepared in substantially the same manner as in Example 33, in which the polyetheric copolymer prepared in Example 4 was used in Example 36, the polyetheric copolymer prepared in Example 5 was used in Example 37, and the polyetheric copolymer prepared in Example 1 except changing its molar ratio of the recurring unit (I) to a sum of the recurring units (I) and (II) to 0.40:1 was used in Example 38. The drawn film was then prepared from the undrawn film under drawing and heat fixing conditions as shown in Table 7 below.

The polyetheric copolymer prepared in the same manner as in Example 1 except that a molar ratio of the recurring units (I) to a sum of the recurring units (I) and (II) was changed to 0.40:1 was measured for its physical properties as follows:

Melt viscosity (at 400° C.): 21,000 poises
Glass transition temperature: 190° C.
Crystalline melting point: 320° C.
Heat decomposition temperature: 557° C.
Crystallization temperature: 261° C.

The physical properties of the resulting film are shown in Table 7 below.

EXAMPLES 39 and 40

Using the polyetheric copolymer prepared in Example 4, the procedures of Example 35 were followed in substantially the same manner except using different draw ratio and heat fixing conditions, as shown in Table 7 below, thereby forming a drawn film.

The physical properties of the drawn film are also shown in Table 7 below.

COMPARATIVE EXAMPLE 9

Using polyether ether ketone ("Victrex PEEK 450G"; ICI, Ltd.), a drawn film was prepared in substantilly the same manner as in Example 35, under drawing and heat fixing conditions as shown in Table 7 below.

The physical properties of the resulting film are shown in Table 7 below.

TABLE 7

| Film | Drawing Temperature: Draw Ratio (vertical/transverse: times/times) | Heat fixing Temp & Time | Direction | Tensile Strength kg/mm² | Tensile Modulus kg/mm² | Breaking Extension, % |
| --- | --- | --- | --- | --- | --- | --- |
| Ex. 35 | 220° C. 2 times/0 times | 250° C. 1 min | MD | 25 | 350 | 72 |
|  |  |  | TD | 11 | 260 | 110 |
|  | 220° C. 2 times/2 times | 250° C. 1 min | MD | 28 | 380 | 81 |
|  |  |  | TD | 28 | 370 | 80 |
| Ex. 36 | 220° C. 2 times/0 times | 260° C. 1 min | MD | 27 | 360 | 70 |
|  |  |  | TD | 12 | 280 | 120 |
|  | 220° C. 2 times/2 times | 260° C. 1 min | MD | 27 | 380 | 85 |
|  |  |  | TD | 25 | 360 | 87 |
| Ex. 37 | 230° C. 2 times/0 times | 260° C. 1 min | MD | 30 | 400 | 100 |
|  |  |  | TD | 18 | 240 | 150 |
|  | 230° C. 2 times/2 times | 260° C. 1 min | MD | 32 | 410 | 110 |
|  |  |  | TD | 31 | 400 | 120 |
| Ex. 38 | 240° C. 2 times/0 times | 270° C. 2 min | MD | 35 | 400 | 130 |
|  |  |  | TD | 19 | 230 | 200 |
|  | 240° C. 2 times/2 times | 270° C. 2 min | MD | 36 | 400 | 130 |
|  |  |  | TD | 36 | 410 | 130 |
| Comp Ex. 9 | 170° C. 2 times/0 times | 260° C. 5 min | MD | 13 | 300 | 80 |
|  |  |  | TD | 9 | 210 | 150 |
|  | 170° C. 2 times/2 times | 260° C. 5 min | MD | 12 | 310 | 80 |
|  |  |  | TD | 12 | 310 | 85 |
| Ex. 39 | 220° C. 3 times/0 times | 260° C. 1 min | MD | 30 | 390 | 60 |
|  |  |  | TD | 11 | 270 | 110 |
|  | 230° C. 2.5 times/2.5 times | 260° C. 1 min | MD | 29 | 410 | 65 |
|  |  |  | TD | 29 | 400 | 65 |
| Ex. 40 | 230° C. 4 times/0 times | 260° C. 1 min | MD | 32 | 420 | 40 |
|  |  |  | TD | 10 | 280 | 100 |
|  | 240° C. 3 times/3 times | 260° C. 1 min | MD | 35 | 430 | 40 |
|  |  |  | TD | 35 | 420 | 45 |

It is noted that the draw ratio of 0 (zero) times in the transverse direction means a uniaxially stretched film.

It is to be understood from the examples and the results of the Table 7 as have been described hereinabove that the polyetheric copolymer films according to the present invention possess favorable moldability as well as excellent mechanical strength, heat resistance, fire-retardancy and resistance to solvents because they use the polyetheric copolymers having a high glass transition temperature and containing no gelled ingredient as a raw material.

The following is a description on the polyetheric copolymer pipes as the feature (11) of the present invention.

(11) Polyetheric copolymer pipes

Polyetheric copolymer pipes according to the feature (11) of the present invention is characterized in that they are molded from the polyetheric copolymers according to the present invention.

As the polyetheric copolymers for the preparation of these pipes, there may be appropriately used those as prepared in the features (1), (3) and (5) of the present invention. For this purpose, there may be preferably used those having a melt viscosity at 400° C., in the range from 3,000 to 100,000 poise, more preferably from 5,000 to 100,000 poise.

Process for molding into pipes

The polyetheric copolymer pipes may be prepared in per se known molding method using the polyetheric copolymers as have been described hereinabove.

The molding method to be applied to the process for the preparation of the pipes according to the present invention may include, for example, extrusion molding method, injection molding method, transfer molding method and so on.

An example appropriate for the process according to the present invention will be described.

The polyetheric copolymer may be molten and extruded from a die by a usual extrusion molding machine, sized and then allowed to cool. The die may be of a straight head type, of a cross head type or of an offset type. Sizing may be implemented by any method including, for example, a sizing plate method, an outside mandrel method, an inside mandrel method, and a sizing box method.

Fitting of pipes may be appropriately implemented by means of injection molding.

A composition in admixture of the polyetheric copolymer with an additive such as a filler, glass fibers, carbon fibers, fiber reinforcing material or the like may be used as a raw material for pipes as long as the additive is added in an amount which does not impair the object of the present invention.

Advantage of polyetheric copolymer

The resin pipes prepared by molding the polyetheric copolymer predominantly have characteristics as will be described hereinafter.

The resin pipes according to the present invention have mechanical properties such as high tensile strength and bending strength, sufficiently large impact strength, as well as excellent surface hardness and resistance to wear so that they may be applied under severe conditions in a stable manner.

Also the resin pipes have thermal properties such as high glass transition temperature, heat distortion temperature, and heat decomposition temperature so that they can maintain their properties to a sufficient extent under circumstances where the temperature is as high as above 200° C. They are further provided with a sufficient degree of fire-retardancy.

Furthermore, the resin pipes have chemical properties such that they are extremely stable chemically against a strong acid except concentrated sulfuric acid, a strong alkali, and an organic solvent without being corrosive.

It is further noted that organic substances are little eluted from the resin pipes so that they may be appropriately used for a flushing pipe and for piping in the chemical field.

The following examples are directed to the resin pipes as the feature (11) of the present invention.

EXAMPLE 41

The polyetheric copolymer was prepared in substantially the same manner in Example 1 with the exeption that a scale was increased to ten times.

The resulting polyetheric copolymer was found to have the same tensile strength, tensile modulus, tensile elongation, bending strength, bending modulus, Izod impact strength (notched), and heat distortion temperature as shown in Table 1 above. It was further found to have a Rockwell hardness (M scale) of 96 and a coefficient of dynamic friction ($\mu$) of 0.19. It is to be noted herein that the Rockwell hardness was measured in accordance with ASTM D-785 and that the coefficient of dynamic friction was measured with a velocity of 0.6 meter per second and a load of 20 kg per $cm^2$ using S45C as a partner material.

The polyetheric copolymer was molded by extrusion molding at the cylinder temperature of 380° C. into a pipe having an outer diameter of 32 mm and a thickness of 3 mm.

The pipe was cut to 5 cm and washed in order with trichloroethylene, methanol and purified water and then immersed in purified water at 23° C. or in purified water at 60° C. The pipes were then allowed to stand for 7 days and an amount of total organic carbons eluted in the purified water in which the pipes had been immersed was measured with a total organic carbon tester (Model: TOC-720; Toray Engineering Co., Ltd.).

The amounts of the total organic carbons were 1.4 ppm in the purified water at 23° C. and 2.6 ppm in the purified water heated at 60° C.

Another pipe cut to 5 cm was immersed for seven days in purified water held at 180° C. and taken out of the water. As a result of observation on its appearance, the pipe was found to cause no distortion, no discoloration, and no cracks.

Test pieces cut from the pipe prepared hereinabove were measured for their solubility in solvents and found to be insoluble in acetone, chloroform, carbon tetrachloride, methylene chloride, ethanol, toluene and xylene.

Similarly, the test pipe pieces were measured for their resistance to chemicals and found that they are swelled to some extent in concentrated sulfuric acid yet they are thoroughly safe against hydrochloric acid, nitric acid and sodium hydroxide.

For fire-retardancy, test pipe pieces were measured for a critical oxygen index and found to be as high as 41.

EXAMPLE 42

The polyetheric copolymer was prepared in substantially the same manner as in Example 4 above on an increased scale.

The resulting polyetheric copolymer was found to have the same physical properties as that used in Example 4.

The physical properties of the polyetheric copolymer are as follows:

Tensile strength: 1,050 $kg/cm^2$
Tensile modulus: 32,000 $kg/cm^2$
Tensile elongation: 67%
Bending strength: 1,960 $kg/cm^2$
Bending modulus: 36,300 $kg/cm^2$
Izod impact strength (notched): 13.6 kg·cm/cm
Rockwell hardness (M scale): 95
Coefficient of dynamic friction: 0.21 $\mu$
Heat distortion temperature: 207° C.

The resulting polyetheric copolymer was molded into a pipe having an outer diameter of 32 mm and a thickness of 3 mm in the same manner as in Example 41.

The pipe was also measured for its amount of organic substances eluted, resistance to hot water, solvents and chemicals, and fire-retardancy in the same manner as in Example 41.

The results of evaluation were found to be the same as those obtained in Example 41.

COMPARATIVE EXAMPLE 10

A pipe was molded using polyether ether ketone ("Victrex PEEK 450G"; ICI, Ltd.) as a starting resin.

The pipe was measured in the same manner as in Example 41 for an amount of organic carbons eluted in purified water. The amount of the organic carbons eluted was 3.0 ppm in the purified water at 23° C. and 5.5 ppm in the water at 60° C.

The pipe was also immersed in purified water at 180° C. for seven days and found that no distortion on its appearance was caused to occur.

COMPARATIVE EXAMPLE 11

A hard vinyl chloride resin pipe having an outer diameter of 32 mm and a thickness of 3 mm was measured for its amount of organic carbons eluted in purified water. The amount of the organic carbons eluted was 3.2 ppm in the purified water at 23° C. and 15.2 ppm in the purified water at 60° C.

The pipe was further measured for a distortion of its appearance by immersing it in purified water at 180° C.

for seven days. As a result, no distortion on its appearance was found.

These examples have revealed that, as the polyetheric copolymers according to the present invention are a favorable material having excellent mechanical strength, heat resistance, and chemical resistance, the pipes resulting from the copolymers are suitable for a wide variety of usage because of a pressure-resistant strength, a wear resistance, and durability as well as an elution of a small amount of organic substances.

The following is a description on the electrical insulating materials as the feature (12) of the present invention.

(12) Electrical insulating materials

Electrical insulating materials as the feature (12) of the present invention is characterized in that they are molded from the polyetheric copolymers according to the present invention.

As the polyetheric copolymers for the preparation of the electrical insulating materials, the above mentioned polyetheric copolymers of (1), (3) and (5) are usually used.

The polyetheric copolymers to be used in accordance with the present invention have, for example, a crystalline melting point of 330° C. to 400° C., crystallizability, a sufficiently high molecular weight, a sufficient heat resistance, an excellent resistance to solvents and mechanical stress. It is also found to have a volume specific resistance as high as polyether sulfones yet larger than polyether ether ketones. A dielectric constant of the polyetheric polymer was found to be as approximately high as polyether ether ketones yet lower than polyether sulfones. Furthermore, the polyetheric copolymer according to the present invention was found to have a dielectric dissipation factor as high as the polyether ether ketones and polyether sulfones as well as to be superior in high-frequency characteristics to them.

These electrical properties of the polyetheric copolymers according to the present invention are suitable for electrical insulating materials which can be sufficiently utilized to a practical level.

As have been described hereinabove, the polyetheric copolymers according to the present invention have superior physical properties, such as heat resistance, fire-retardancy, chemical resistance, and mechanical strength, so that they can be used under severe conditions and utilized as electrical insulating materials to be applicable to a wide variety of fields.

As electrical insulating materials, the polyetheric copolymers can be appropriately used, for example, for telecommunication instrument, electronic instrument, industrial instrumentation and other usual instrument.

They may be used, for example, by providing wires with coatings by means of extrusion molding, by coating the copolymer in a molten state or by bonding the copolymer in a film form. There may also be used other usual techniques for forming an electrical insulating member, such as potting, filling or sealing.

The following examples are directed to the electrical insulating materials pipes as the feature (12) of the present invention.

EXAMPLE 43

The polyetheric copolymer was prepared in substantially the same manner as in Example 1 and injection-molded to test pieces which were then measured for their electrical properties. The test results are shown in Table 8 below.

They were also measured for their mechanical strength and fire-retardancy and the results are shown in Table 9 below.

It is further to be noted that the polyetheric copolymer was found to have the same tensile strength, tensile modulus, elongation, bending strength and bending modulus as those shown in Table 1 above.

COMPARATIVE EXAMPLES 12 AND 13

In order to compare the electrical properties of the polyetheric copolymer prepared in Example 43, polyether ether ketone ("Victrex PEEK 450G"; ICI, Ltd.) and polyether sulfone ("Victrex PES 4100G"; ICI, Ltd.) were likewise measured for their electrical properties, respectively. The results are shown in Table 8 below.

EXAMPLES 44-46

In Example 44, the polyetheric copolymer prepared in Example 6 was measured for its mechanical strength and fire-retardancy; in Example 45, the polyetheric copolymer prepared in Example 5 was measured therefor; and in Example 46, the polyetheric copolymer prepared in Example 38 was measured therefor.

The results are shown in Table 9 below. It is provided, however, that the mechanical strength of their copolymers were the same as shown in Table 1 above so that the data are omitted therefrom.

COMPARATIVE EXAMPLE 14

For a comparative purpose, a commercially available polyether ether ketone ("Victrex PEEK 450G"; ICI, Ltd.) was measured for its mechanical strength and fire-retardancy.

The results are shown in Table 9 below.

It is further found that this polyether ether ketone is corroded by concentrated sulfuric acid and dichloroacetic acid as well as by p-chlorophenol.

TABLE 8

| Test Procedures (ASTM) | Example 43 | Comparative Example 12 | Comparative Example 13 |
|---|---|---|---|
| Volume specific resistance ($\Omega$-cm) | D275 | $10^{17}$ | $10^{16}$ | $10^{17}$ |
| Dielectric constant (1 KH$_2$) | D156 | 3.2 | 3.2 | 3.5 |
| Dielectric dissipation factor | D150 | | | |
| 1 KH$_2$ | | 0.0014 | 0.0016 | 0.001 |
| 1 MH$_2$ | | 0.0035 | 0.0035 | 0.0035 |
| 1 GH$_2$ | | 0.0039 | 0.0033 | 0.004 |

TABLE 9

| | Heat Distortion Temp., °C. (18.6 kg/cm$^2$) | Critical Oxygen Index | | Rockwell Hardness (M scale) | Coeff. of Dynamic Frictn, ($\mu$) |
|---|---|---|---|---|---|
| | | 0.4 mm | 3.2 mm | | |
| Ex. 43 | 205 | 35 | 42 | 96 | 0.19 |
| Ex. 44 | 207 | 35 | 42 | 95 | 0.20 |
| Ex. 45 | 213 | 35 | 42 | 96 | 0.20 |
| Ex. 46 | 218 | 36 | 42 | 97 | 0.21 |

TABLE 9-continued

| | Heat Distortion Temp., °C. (18.6 kg/cm$^2$) | Critical Oxygen Index | | Rockwell Hardness (M scale) | Coeff. of Dynamic Frictn. ($\mu$) |
|---|---|---|---|---|---|
| | | 0.4 mm | 3.2 mm | | |
| Cmp Ex 14 | 152 | 24 | 35 | 98 | 0.58 |

As is apparent from the above examples, the polyetheric copolymers according to the present invention are high in heat distortion temperature and resitance to heat as well as excellent in fire-retardancy, resistance to chemicals and mechanical strength so that they are suitable for electrical insulating materials.

The following is directed to an example and comparative examples relating to flexible printed circuit boards as feature (13) according to the present invention.

(13) Flexible printed circuit boards

The flexible printed circuit boards according to the present invention are characterized by electrical insulating substrate composed of the polyetheric copolymer in the flexible printed circuit boards having an electrical conductive layer on a surface of the insulating substrate.

(a) Insulating substrate

As the polyetheric copolymer to be used for the insulating substrate, there may be used those described hereinabove in the features (1), (3) and (5) of the present invention. Particularly preferred are the polyetheric copolymers having a molar ratio of the recurring unit as represented by the general formula (I) above in the range from 0.15:1 to 0.40:1, preferably from 0.20:1 to 0.30:1, and a melt viscosity at 400° C. in the range of 500 to 100,000 poise.

(b) Formation of insulating substrate

As the insulating substrate can be used the polyetheric copolymer film as have been described hereinabove in the feature (9) of the present invention.

The polyetheric copolymer film is excellent in mechanical strength and electrical properties and has a coefficient of linear expansion as small as copper, that is an important property for the preparation of flexible printed circuit boards. It also is so small in a water absorption ratio, a moisture absorption ratio and a coefficient of humidity expansion that it has a small dimensional change and a good adhesion to the conductive layer laminated on the substrate.

(c) Conductive layer

The conductive layer disposed on a surface of the insulating substrate may be formed by a metal foil obtained by electrolyzing or rolling of a metal selected from copper, aluminium, nickel and silver.

A film thickness of the conductive layer may range usually from 5 to 500 $\mu$m, preferably from 10 to 100$\mu$m. In the case of a copper foil obtained by rolling, its film thickness may range preferably from 15 to 50$\mu$m, and in the case of a copper foil obtained by electrodeposition, its film thickness may preferably from 10 to 50$\mu$m.

In forming the conductive layer of the metal foil on the insulating substrate, an adhesive may be coated on a surface of the insulating substrate or an adhesive film is sandwiched and then compressed at a temperature ranging usually from 50° C. to 200° C. preferably from 100° C. to 150° C., under a pressure ranging usually from 0.1 to 10 kg/cm$^2$, preferably from 1 to 5 kg/cm$^2$.

The conductive layer may be formed on the surface of the insulating substrate by means of non-electrolytic deposition method, metallizing method, vaporization method, sputtering method or the like.

It is further to be noted that the conductive layer may be formed on one surface or two surfaces of the insulating substrate.

(d) Flexible printed circuit boards

The flexible printed circuit boards as have been prepared hereinabove may be formed with a conductive pattern by means of substractive (photo-etching) method or additive method and thereafter holes are bored with drills, through which electronic devices are soldered. The flexible printed circuit boards thus prepared may be used for industrial electronic equipment such as electronic computers, electronic switching system, office automation equipment, wire communication devices, wireless communication devices, electronic application instruments, electrical instrumentation devices and so on, and public electronic equipment such as radios, television sets, tape recorders, audio instruments, video tape recorders, and so on.

The folowing is directed to an example and a comparative example relating to the flexible printed circuit boards as the feature (13) of the present invention.

EXAMPLE 47

The polyetheric copolymer was prepared in the same manner as in Example 1 and press-molded at 400° C. into a film which in turn was subjected to heat treatment at 250° C. for 1 minute, thereby resulting in a crystalline film having a thickness of 25 $\mu$m.

On a surface of the resulting film as an insulating substrate was bonded an electrolyzed copper foil with an epoxy resin type adhesive, thereby leading to a printed circuit board which was heat-treated at 120° C. and 5 kg/cm$^2$.

The resulting printed circuit board was measured for its properties as follows:
Coefficient of linear expansion (ASTM D-969-44):
  $2.1 \times 10^{-5}$ cm/cm/°C.
Moisture absorption ratio (ASTM D-570-63):
  50% RH: 0.04%
  Immersion for 24 hours: 0.12%
Coefficient of humidity expansion (22.2° C.; 20–80%RH):
  $1.8 \times 10^{-7}$ cm/cm/%RH
Dielectric constant (ASTM D-156): 1 KH$_z$: 3.2
Dielectric dissipation factor (ASTM D-150):
  1MH$_z$: 0.0035

COMPARATIVE EXAMPLE 15

A printed circuit board was prepared in the same manner as in Example 47 with the excepttion that an aromatic polyimide ("KAPTON"; DuPont) in a film form having a thickness of 25 $\mu$m.

The resulting printed circuit board was measured for its properties as follows:
Coefficient of linear expansion (ASTM D-969-44):
  $2.0 \times 10^{-5}$ cm/cm/°C.
Moisture absorption ratio (ASTM D-570-63):
  50% RH: 1.3%
  Immersion for 24 hours: 2.9%
Coefficient of humidity expansion (22.2° C.; 20–80%RH):

$2.2 \times 10^{-5}$ cm/cm/%RH

The followng is a description on radiation-resistant materials as the feature (14) of the present invention.

(14) Radiation-resistant materials

The radiation-resistant material is characterized in using the polyetheric copolymer of the present invention as a material.

The polyetheric copolymer is so favorable in radiation resistance that it can be used as a material for sheet materials, sealing materials, frame materials, hoses, packing materials and so on to be used for instrument, devices, and apparatuses, such as, for example, nuclear reactors, breeders, ionized radioactivity generators or the like.

The following is directed to an example and comparative examples relating to radiation-resistant materials.

EXAMPLE 48

The polyetheric copolymer was prepared in substantially the same manner as in Example 1.

The resulting polyetheric copolymer was extruded at 400° C. with a twin-screw extruder and pelletized. The pellets were extruded from a T-die into a film having a width of 25 cm and a thickness of 100 µm.

The film was then irradiated with electron rays of 21 Mega Gray (Mgy) per hour in an irradiation amount as shown in Table 10 below and then measured for its tensile strength in accordance with ASTM D882.

The results are shown in Table 10 below.

COMPARATIVE EXAMPLE 16

For a comparative purpose, polyether ether ketone film ("Victrex PEEK 450G"; ICI, Ltd.; thickness, 100 µm) was measured for its tensile strength after irradiation with electron rays in the same manner as in Example 48. The results are shown in Table 10 below.

COMPARATIVE EXAMPLE 17

For a comparative purpose, an aromatic polyimide film ("Kapton"; DuPont; thickness, 100 µm) was measured for its tensile strength after irradiation with electron rays in the same manner as in Example 48. The results are shown in Table 10 below.

As have been described in the example above, the polyetheric copolymer according to the present invention is so excellent in a resistance to radiation that it is useful as a radiation-resistant molding material to be used for instrument which is exposed to radiation.

(15) Powder paints

The powder paints according to the present invention are characterized in using the polyetheric copolymers of the present invention as a material.

Although the polyetheric copolymers prepared by the processes as in the features (2-1), (2—2), (2-3), (4) and (6) above may be used for the preparation of the powder paints according to the present invention, the polyetheric copolymers prepared by the process as have been described hereinabove in the feature (7) of the present invention are provided in a form of powders having particle sizes in the range from 1 µm to 200µm so that they are appropriately used for the powder paints of the present invention. Thus they may be conveniently used as they are or in admixture with an appropriate pigment.

In other words, although the polyetheric copolymers according to the present invention may be used as powder paints as they are, the powder paints may contain pigments, other resins, fillers or the like, as needed.

As the pigments, there may be preferably used ceramic-type heat-resistant color pigments. Such pigments may include, for example, alumina, silica, beryllia, zirconia, magnesia, titanium oxide, iron oxide, barium titanate, calcium titanate, lead titanate, zircon, barium zirconate, steatite, talc, clay, montmorillonite, bentonite, kaolin, mica, boron nitride, silicon nitride or the like. These pigments may function as colorants of the paints and improve a smoothness on coatings as well. They may be used singly or in combination of two or more pigments. In either case, it is desired that these pigments have an average particle size of 200 mesh or smaller.

The other resins to be used with the polyetheric copolymer may include, for example, a silicone resin, an epoxy resin, an alkyd resin, a phenol resin, a melamine resin and so on. They may be used singly or in combination with two or more.

The fillers to be used with the polyetheric copolymer may include, for example, fine powders of a high melting-point inorganic filler, low melting-point glass, and so on.

When these additives may be added, the amount of the polyetheric copolymer may be preferably in the range of 50% by weight or larger.

The paints containing powders of the polyetheric copolymer may be coated by fluidization dip coating, spraying, electrostatic powder spraying, electrostatic fluidization dip coating, flame spray coating or the like.

TABLE 10

| | Polymer Used | Physical Properties | Irradiation Amount of Electron Rays (MGy) | | | |
|---|---|---|---|---|---|---|
| | | | 0 | 7.5 | 10 | 17.5 |
| Ex. 48 | Polyetheric copolymer | Strength, kg/cm² | 900 | 860 | 900 | 910 |
| | | Elongation, % | 180 | 190 | 180 | 160 |
| Comparative Ex. 16 | Victrex PEEK 450G1 | Strength, kg/cm² | 750 | 520 | 500 | 410 |
| | | Elongation, % | 130 | 70 | 55 | 5 |
| Comparative Ex. 17 | Kapton | Strength, kg/cm² | 1700 | 1800 | 1850 | 1400 |
| | | Elongation, % | 70 | 70 | 65 | 20 |

The following is a description of the powder paints as the feature (15) of the present invention.

In either case, the coat may be baked at temperatures ranging from 400° C. to 520° C., preferably from 420° C. to 480° C.

The following examples are directed to the powder paints as in the feature (15) of the present invention.

EXAMPLE 49

The polyetheric copolymer was prepared in substantially the same manner as in Example 1 and coated by means of fluidization dip coating in a manner as will be described hereinafter.

Into a powder paint bath in which the above polyetheric copolymer was molten and fluidized at 440° C. was dipped an iron plate pre-heated at 400° C., thereby forming an undercoat on the iron plate.

The undercoated plate was then overcoated at 420° C. with the polyetheric copolymer, thus forming an overcoat having a film thickness of 100μm on the plate.

The overcoated plate was measured for its solubility in solvents. As a result, it was found to be insoluble in trichloroethane, acetone, carbon tetrachloride, chloroform, benzene, toluene, xylene and ethanol.

It was also found that the overcoat was not corroded by hydrochloric acid, nitric acid, acetic acid and sodium hydroxide.

The coat was further measured for its surface hardness according to the pencil hardness test according to JIS K5400. As a consequence, the pencil hardness of the overcoat was found to be HB.

A heat resistance of the overcoat was measured by placing the overcoated plate in an oven at 340° C. for one week. As a result, neither discoloration nor cracks were recognized.

The overcoat was further measured for its weathering properties using a sunshine weather meter by exposure for 800 hours. It was found as a result that neither discoloration nor cracks were observed.

EXAMPLE 50

Using powders of the polyetheric copolymer prepared in substantially the same manner as in Example 4, a coat was formed in a film thickness of 120 μm in substantially the same manner as in Example 49.

The resulting coat was measured for its resistance to solvents and chemicals, surface hardness, heat resistance and weathering properties in a manner similar to those measured in Example 49 and it was found to have the same physical properties as the coat prepared in Example 49.

The powder paints prepared from the polyetheric copolymers according to the present invention can provide a coat which is excellent in resitance to heat and chemicals as well as weathering properties.

Also the powder paints according to the present invention can give the effect of causing no risk of explosion because of the excellent fire-retardancy of the polyetheric copolymers as have been described hereinabove.

It is further advantageous that, since the polymers prepared by the paticular polymerization process can be isolated in a form of powders from the reaction mixture, they can be used in a coating system as the powder paints as they are.

A description is now turned to the inorganic compounds coated with the polyetheric copolymer as the feature (16) of the present invention.

(16) Inorganic compounds coated with polyetheric copolymer

The inorganic compounds coated with the polyetheric copolymer according to the present invention is characterized in that the inorganic compounds are coated with the polyetheric copolymer.

The inorganic compounds to be used for the present invention may include, for example, an inorganic filler, an inorganic reinforcing agent, an inorganic fire-retardant agent, an inorganic colorant and so on. As a material of such inorganic compounds may be enumerated a metal such as iron, copper, zinc, lead, bismuth, nickel, chromium, tungsten, molybdenum, cobalt, aluminium, magnesium, titanium, beryllium, silicon, lithium, potassium, gold, silver, platinum, gallium, indium, tellurium, lanthanum and cerium; an alloy such as nickel steel, chromium steel, tungsten steel, molybdenum steel and titanium alloy; a metal oxide such as antimony trioxide, iron oxide, titanium oxide, alumina, silica and zirconia; a metal hydroxide such as aluminium hydroxide, zirconium hydroxide, magnesium hydroxide and calcium aluminate hexahydrate; a metal halide; a borate such as zinc borate, barium metaborate; a carbonate such as calcium carbonate; a silicate such as magnesium silicate, hydrated aluminium silicate; and inorganic fibers such as carbon fibers (including whiskers of $SiC$, $B_4C$, $Si_2N_4$ and so on). Furthermore, there may be used other inorganic materials such as talc, clay, mica, silica, asbestos, glass beads and ceramics and other inorganic compounds as well.

The inorganic compounds to be used may be in any form and they may be in a form of granules, plates, needles, and fibers. Among them, the inorganic compounds in the granular form are preferred and the carbonates such as calcium carbonate and the metal oxides such as titanium dioxide, each in the granular form, are particularly preferred.

The inorganic compounds may be used singly or in combination of two or more.

In accordance with the present invention, the inorganic compounds coated with the polyetheric copolymer may be prepared, for example, by reacting the dihalogeno benzonitrile with the 4,4'-biphenol in the presence of the alkali metal compound and the inorganic compound in the aprotic polar solvent and then adding the 4,4'-dihalogeno benzophenone. This series of reactions may be carried out at a temperature which ranges usually from 150° C. to 380° C. preferably from 180° C. to 330° C.

The inorganic compounds coated with the polyetheric copolymer according to the present invention may also be prepared, in addition to the above process, by simultaneously reacting the dihalogeno benzonitrile and 4,4'-dichlorobenzophenone with the 4,4'-biphenol in the presence of the alkali metal compound and the inorganic compound in the aprotic polar solvent and then by copolymerizing the resulting product with the 4,4'-difluorobenzophenone.

After completion of the reaction, the inorganic compound coated with the polyetheric copolymer may be separated and purified by a per se known process from the aprotic polar solvent containing the resulting inorganic compound coated with the copolymer.

The inorganic compound coated with the polyetheric copolymer according to the present invention is in such a state that the polyetheric copolymer having the excellent properties such as resistance to heat, solvents and chemicals is coated on a surface of the inorganic compound.

A film thickness of the coating may be adjusted by changing a concentration of the polyetheric copolymers in the aprotic polar solvent.

The resulting inorganic compound coated with the polyetheric copolymer is provided with resistance to heat and to organic solvents, acids and other chemicals. Furthermore, it has an improved wetting on its surface so that dispersibility into a matrix is improved.

The following example is directed to the inorganic compound coated with the polyetheric copolymer as the feature (16) of the present invention.

EXAMPLE 51

The procedures of Example 1 was followed except adding 11.98 grams (0.15 mole) of rutile titanium dioxide in the first step of reaction, thereby yielding titanium dioxide coated with the polyetheric copolymer.

The resulting granular polyetheric copolymer coating was found to have the same properties as the polyetheric copolymer prepared in Example 1.

The granular the polyetheric copolymer coating was tested for solubility in solvents and found to be insoluble in acetone, chloroform, carbon tetrachloride, methylene chloride, ethanol, toluene and xylene. It was also found that it was not corroded with acids other than concentrated sulfuric acid.

The powders were then molten and kneaded in the amount of 20 parts by weight with respect to 100 parts by weight of polyethylene, thereby yielding a titanium dioxide-polyethylene composition. A sheet of the composition was observed electron-microscopically for its surface layer portion and an inner section (multiplied by 1,000 times and 3,000 times) and confirmed that the titanium dioxide particles coated with the polyetheric copolymer were dispersed homogeneously in the polyethylene and that the both were bonded tightly to each other.

The inorganic compounds coated with the polyetheric copolymers are such that the inorganic compounds are coated with the polyetheric copolymers according to the present invention so that the resulting coatings are not corroded by organic solvents and are superior in resistance to acids and heat. Thus the inorganic compounds coated with the polyetheric copolymers can provide industrially useful paints, fibers, paper and other products. And a variation in molar ratios of the polyetheric copolymers can adjust a film thickness of coatings of the inorganic compound coated with the polyetheric copolymer, thus providing products which can be applied in various usage.

The following is a description of the polyetheric copolymer compositions as the feature (17) of the present invention, which includes three compositions as will be described hereinafter as polyetheric copolymer compositions (A), (B) and (C) for brevity of explanation.

(17) Polyetheric copolymer compositions (A)

The polyetheric copolymer compositions (A) according to the present invention are characterized in blending the polyetheric copolymers of the present invention in an amount of 97% to 30% by weight with an inorganic filler in an amount of 3% to 70% by weight.

The polyetheric copolymers to be used for the preparation of the polyetheric copolymer compositions according to the present invention may be those described hereinabove as in the features (1), (3), and (5) of the present invention.

In addition to those enumerated in the feature (16) of the present invention, the inorganic fillers to be used for the present invention may further include, for example, an inorganic compound such as various oxides, hydroxides, carbides, nitrides, borides, sulfides, halides, carbonates, sulfates, phosphates, silicates, aluminates, titanates, plumbates and other various compound oxides, carbon such as graphite, and a simple substance of other stable non-metals, stable metals or semi-metals or granular particles of a mixture or a compound substance thereof. These inorganic compounds and simple substances can provide different effects depending upon their kinds and properties.

The inorganic particles or the inorganic compounds or the simple substances to be used as a component thereof may include, for example, alumina, indium oxide, silica, germanium oxide, lead oxide, tin oxide, beryllia magnesia, zinc oxide, yttria, lanthanum oxide, zirconia, tita-nium oxide, tantalum oxide, molybdenum oxide, tungsten oxide, manganese oxide, iron oxide, barium titanate, calcium titanate, lead titanate, zircon, barium zirconate, steatite, talc, clay, montmorillonite, bentonite, kaolin, mica, boron nitride, diato-maceous earth, zeolite, silica alumina, silica magnesia, silica titania, silicon carbide, silicon nitride, titanium nitride, sodium chloride, iron chloride, calcium carbo-nate, magnesium carbonate, magnesium sulfate, calcium sulfate, aluminium sulfate, aluminium phosphate, calcium phosphate, sodium borate, active carbon, graphite, silicon, iron and the like.

The inorganic fillers may be in any form, such as granules, plates or fibers. Particularly, the inorganic fillers in a form of fibers can improve a modulus of elasticity of the resulting polyetheric copolymer composition to a remarkably large extent.

The fibrous inorganic fillers may include, for example, carbon fibers, glass fibers, alumina fibers, SiC fibers, boron fibers, aramide fibers, metal fibers, aromatic polyamide fibers, and various whisker fibers. Among those fibers, carbon fibers and glass fibers are preferred.

The carbon fibers are not restricted to a particular one and may include, for example, polyacrylonitrile (PAN) type carbon fibers, cellulose type carbon fibers, pitch type carbon fibers, vapor phase growth carbon fibers, dehydrated polyvinyl alcohol (PVA) type carbon fibers and so on.

The glass fibers are also not restricted to a particular one and may be those prepared by the direct melting method or by the Marble method.

Particle sizes of the inorganic fillers may be in the range generally from 20 $\mu$m or smaller. When the inorganic filler is selected from the fibrous inorganic fillers, sizes of the fibers are not restricted to particular ones and may be in the range usually from 5 to 20$\mu$m, preferably from 7 to 15 $\mu$m.

An aspect ratio of the fibrous inorganic filler may be in the range usually from 100 to 3,000, preferably from 500 to 2,000.

In blending the inorganic filler with the polyetheric copolymer, it is preferred that the inorganic filler is surface-treated prior to blending. Surface-treatment of the inorganic filler can improve its wetting performance with a thermoplastic resin composition as a matrix and, as a result, the polyetheric copolymer composition can also improve its mechanical strength and other properties.

The inorganic fillers may be blended in an amount ranging usually from 3% to 70% by weight, preferably from 5% to 30% by weight, based on a total weight of the inorganic filler and the polyetheric copolymer. If the amount of the inorganic filler is too small, the resulting composition may not be provided with improved resistance to heat and mechanical strength. Even if the inorganic filler would be used in an amount larger than the upper limit, there cannot be achieved any further improvement in effects to be anticipated by an increase in the inorganic filler and, rather, a moldability of the resulting polyetheric copolymer composition can be impaired. The polyetheric copolymer compositions according to the present invention can be said to have excellent heat resistance and mechanical stress that are further improved from those possessed by the polyetheric copolymer itself.

The polyetheric copolymer compositions according to the present invention may be prepared by blending the specified amount of the polyetheric copolymer with the specified amount of the inorganic filler and kneading them to a sufficient extent so as to disperse the inorganic filler homogeneously into the mix. Kneading is effected at a temperature which melts the polyetheric copolymer. The temperature cannot be determined in a single condition because it may vary with conditions of the polyetheric copolymer composition to be used. The temperature, however, may range usually from 300° C. to 500° C., preferably from 340° C. to 420° C. A period of time to be required for melting and kneading the polyetheric copolymer may be in the range usually from 1 to 10 minutes, preferably from 2 to 5 minutes.

Processes of blending and kneading are not restricted to particular ones and may be a one in which the polyetheric copolymer is blended in a molten state, for example, with a kneader mixer or an extruder containing two or more screws which are rotating in the directions equal to or opposite to each other, or with a single-shaft extruder containing one screw which is moving forward and backward while being rotated, thereby resulting in a homogeneous dispersion of the inorganic filler.

The resulting molten resin composition is then allowed to cool by appropriate means yielding the desired polyetheric copolymer composition.

The polyetheric copolymer composition thus prepared is then formed, as needed, into pellets and other shapes which, in turn, may be molded by means of molding method such as injection molding into desired molded products.

Examples 52 and 53 below are directed to the polyetheric copolymer compositions (A) according to the present invention.

EXAMPLE 52

The polyetheric copolymer prepared in the same manner as in Example 1 and glass fibers having an average fiber diameter of 10μm and an average fiber length of 3 mm were kneaded at 360° C. with an extruder and extruded thereform into pellets. The content of the glass fibers is 30 wt % in the pellets.

The pellets were then injection-molded to test pieces which were then measured for mechanical strength. The results are shown in Table 11 below.

EXAMPLE 53

The polyetheric copolymer prepared in the same manner as in Example 1 and carbon fibers having an average fiber diameter of 9 μm ("TORAYCA"; Toray, Ltd.) were kneaded at 360° C. with an extruder and extruded thereform into pellets. The content of the glass fibers in 30 wt % in the pellets.

The pellets were then injection-molded to test pieces which were then measured for mechanical strength. The results are shown in Table 11 below. In Table 11 below, the results for the copolymer of Example 1 as shown in Table 1 above are shown for comparative purposes.

TABLE 11

| Test Items | Test Method | Measuring Temp etc. | Example 1 | Example 52 | Example 53 |
|---|---|---|---|---|---|
| Tensile strength ($kg/cm^2$) | ASTM D-638 | 23° C. | 1,100 | 1,520 | 1,600 |
| | | 250° C. | 90 | 380 | 360 |
| Modulus in tension ($kg/cm^2$) | ASTM D-638 | 23° C. | 35,000 | 110,000 | 106,000 |
| | | 250° C. | 3,100 | 31,000 | 35,000 |
| Elongation, % | ASTM D-638 | 23° C. | 55 | 1.8 | 2.2 |
| Bending strength ($kg/cm^2$) | ASTM D-790 | 23° C. | 2,050 | 2,430 | 2,500 |
| | | 250° C. | 300 | 550 | 580 |
| Bending modulus ($kg/cm^2$) | ASTM D-790 | 23° C. | 38,000 | 91,000 | 151,400 |
| | | 250° C. | 9,000 | 29,000 | 26,300 |
| Izod impact strength (kg.cm/cm) | ASTM D-256 | Notched | 13.0 | 13.5 | 13.8 |
| | | Unnotchd | 86 | 46 | ND |
| Heat distortion temp (°C.) (load of 18.6 kg) | ASTM D-648 | — | 205 | 350 | 345 |

Note: ND = Not Destroyed

The following is a description on the polyetheric copolymer compositions B as the feature (18) of the present invention.

(18) Polyetheric copolymer compositions (B)

The polyetheric copolymer compositions (B) according to the present invention are characterized in containing 100 parts by weight of the polyetheric copolymers of the present invention and an inorganic nucleating agent in an amount equal to or larger than 0.001 parts by weight yet less than 3 parts by weight.

As the inorganic nucleating agent, there may be used those enumerated for the polyetheric copolymer compositions (A) as the feature (17) of the present invention. Among them, graphite, titanium dioxide, talc, silicon carbide, mica, titanium nitride, silicon nitride and so on are preferred. The inorganic fillers may be used as particles consisting of a single ingredient or particles consisting of compositions containing two or more ingredients. These inorganic particles may be used, as needed, in admixture with other particles.

Sizes of the inorganic particles to be blended as the nucleating agent may range usually from 20 nm to 10 μm. If the particle sizes are too small, a sufficient improvement in a velocity of crystallization may not be achieved. If they becomes too large, a homogeneous dispersibility may be impaired so that crystallization may occur in an irregular way and a velocity of crystallization may not be improved to a sufficient extent.

The inorganic nucleating agent may be blended with 100 parts by weight of the polyetheric copolymer in an amount equal to or larger than 0.001 part but less than 3 parts by weight.

If the amount of the inorganic nucleating agent is below the lower limit, the effect of improving the velocity of crystallization becomes insufficient, on the one hand. If the amount thereof exceeds the upper limit, no further effect can be achieved for improvements in the velocity of crystallization, on the other hand.

The polyetheric copolymer compositions (B) as the feature (18) according to the present invention may be prepared in substantially the same manner as the polyetheric copolymer compositions (A) as described in the feature (17) of the present invention.

The following examples are relating to the polyetheric copolymer compositions (B).

EXAMPLE 54

The polyetheric copolymer prepared in substantially the same manner as in Example 1 was blended with graphite (average particles size: 7 μm) as a nucleating agent in an amount of 1.0 part by weight with respect to 100 parts by weight of the polyetheric copolymer, molten at 380° C. and kneaded for three minutes usisng a twin-screw extruder, thereby yielding a resin composition for molding.

The composition was molded into pellets as test sample, which were then measured for its crystallization temperature (Tc) with a differential scanning calorimeter (DSC). It is to be noted herein that the crystallization temperature (Tc) is the temperature of an exothermic peak accompanied with crystallization when the test sample is cooled at the rate of 10° C. per minute after it was molten at 395° C. for 1 minute.

The results are shown in Table 12 below.

EXAMPLES 55-60

The procedure of Example 54 was followed in the same manner with the exception that, in place of graphile, titanium dioxide (average particles size: 0.2 μm) was used in Example 55; talc (average particles size: 0.5 μm) in Example 56; silicon carbide (average particles size: 8 μm) in Example 57; mica (average particles size: 5 μm) in Example 58; titanium nitride (average particles size: 1.5 μm) in Example 59; and silicon nitride (average particles size: 2 μm) in Example 60; and each of the inorganic nucleating agents was blended in an amount of 1.0 parts by weight based on 100 parts by weight of the polyetheric copolymer prepared in substantially the same manner as in Example 1.

The crystallization temperature (Tc) in each of the Examples above is shown in Table 12 below.

COMPARATIVE EXAMPLE 18

The polyetheric copolymer prepared in substantially the same manner as in Example 1 was treated in the same manner as in Example 54, except adding no nucleating agent, thereby yielding a polyetheric copolymer composition.

This composition was likewise measured for its crystallization temperature (Tc), and the result is shown in Table 12 below.

TABLE 12

| | Nucleating Agent | Crystallization Temperature. Tc |
| --- | --- | --- |
| Example 54 | Graphite | 328° C. |
| Example 55 | Titanium dioixde | 326° C. |
| Example 56 | Talc | 326° C. |
| Example 57 | Silicon carbide | 324° C. |
| Example 58 | Mica | 319° C. |
| Example 59 | Titanium nitride | 318° C. |
| Example 60 | Silicon nitride | 316° C. |
| Comparative Example 18 | None | 310° C. |

It is found that the polyetheric copolymer compositions for molding are a blend of the particular polyetheric copolymer with the nucleating agent consisting of the specified inorganic particles in the particular ratio so that it is advantageous that the velocity of crystallization is so fast that a molding cycle can be shortened during the preparation of molded products therefrom.

A description will now turn to the polyetheric copolymer composition (C) as the feature (19) of the present invention.

(19) Polyetheric copolymer compositions (C)

The polyetheric copolymer compositions (C) according to the feature (19) of the present invention is characterized in that 10% to 90% by weight of the polyetheric copolymer is blended with 90% to 10% by weight of a heat-resistant thermoplastic resin and, as desired, with a filler in an amount ranging from 1 to 50% by weight with respect to 100% by weight of a total weight of the polyetheric copolymer and the thermoplastic resin.

The thermoplastic resins to be used therefor may include, for example, engineering plastics such as polyamide resins, polyether ether ketones, polyacetals, polycarbonate resins, thermoplastic polyester resins, polyphenylene oxides, polyether sulfones, polyimides, polyamide imides, polyether imides, polysulfones and polyphenylene sulfides.

The polyamide resins may include, for example, nylon 6, nylon 8, nylon 11, nylon 66, nylon 610 and so on.

The polyacetals may be a homopolymer or a copolymer.

The polycarbonates may include, for example, a polycarbonate obtainable from bisphenol A and phosgene, a polycarbonate obtainable from bisphenol A and diphenyl carbonate, and so on.

The thermoplastic polyester resins may include, for example, polyethylene terephthalate, polypropylene terephthalate, polybutylene terephthalate, polyarylate, aromatic polyester, crystalline polyester and so on.

The polyetheric copolymer compositions may be used for molding into products in various forms and shapes so that the thermoplastic resins to be blended therewith may be appropriately chosen from various thermoplastic resins as long as they possess molecular weights in which they can be molded.

The thermoplastic resins may be used singly or in combination with two or more as a polymer blend.

Preferred thermoplastic resins among those enumerated are polyamides, polyimides, polyether imides, polycarbonates, polyethylene terephthalate, aromatic polyesters, polyether ether ketones, polyether sulfones, polyphenylene sulfides and so on.

The fillers to be used as desired for the preparation of the polyetheric copolymer compositions (C) according to the present invention may be those enumerated for the compositions (A) and (B) in the features (16) and (17) of the present invention, respectively. On top of that, a colorant, a lubricant, an antioxidant or the like may be used.

The polyetheric copolymer compositions according to the present invention consist basically of 10% to 90% by weight of the polyetheric copolymer and 90% to 10% by weight of the thermoplastic resin.

If the polyetheric copolymer is contained in the amount exceeding the upper limit, the composition cannot exhibit its excellent moldability to be expected to be achieved by the polyetheric copolymer according to the present invention. If the amount of the polyetheric copolymer is less than the lower limit, the resulting composition may not possess sufficient heat resistance, moldability, mechanical strength, electrical properties, and fire retardarncy.

In order to improve strength and fire retardancy of the polyetheric copolymer compositions according to the present invention, the fillers may be blended in an amount ranging usually from 1% to 50% by weight, preferably from 15% to 40% by weight, with respect to 50% to 99% by weight of a total weight of the polyetheric copolymer and the thermoplastic resin.

If the amount of the filler is less than 1% by weight, no improvements in strength and so on can be recognized. If the amount of the filler is above 50% by weight, a homogeneous dispersion is rendered difficult during kneading.

The process for blending or kneading the polyetheric copolymer with the thermoplastic resin and the filler may be the same as have been described hereinabove in the feature (17) of the present invention.

The following examples are directed to the polyetheric copolymer compositions (C) according to the feature (19) of the present invention.

EXAMPLE 61

A 200-liter reactor equipped with a stirrer, a Dean . & Stark trap filled with toluene, and a tube for blowing argon gas was charged with 1,548 grams (9 mole) of 2,6-dichlorobenzonitrile, 5,580 grams (30 moles) of 4,4'-biphenol, 4,975 grams (36 moles) of potassium carbonate and 50 liters of N-methylpyrrolidone, and the mixture was heated to 195° C. over the period of one hour while argon gas was blown into the reactor. After completion of elevating the temperature, a small amount of toluene was added and water produced was distilled off azeotropically toward the outside.

The mixture was then reacted at the temperature of 195° C. for 30 minutes, and a solution of 4,582.2 grams (21 moles) of 4,4'-difluorobenzophenone in 70 liters of N-methyl-2-pyrrolidone was added. The mixture was further reacted for one hour. After completion of the reaction, the reaction product was crushed with a blender (manufactured by Warning) and crushed products were then washed with water to a sufficient extent and dried leaving the desired polyetheric copolymer in a white powdery form in the amount of 10,200 grams (100%).

The copolymer was measured for its thermal properties and found to have a glass transition temperature (Tg) of 182° C., a melting point of 379° C., and a heat decomposition temperature (Td) of 562° C.

Pellets of the resulting polyetheric copolymer were blended with a polycarbonate ("Idemitsu Polycarbonate A2500"; Idemitsu Petrochemical Co., Ltd.) in a ratio in weight to the former to the latter of 50 to 50 and the mixture was molten and kneaded at 360° C. for 3 minutes, thereafter extruding through an extruder with a nozzle having an inner diameter of 30 mm and pelletizing the polyether copolymer composition.

The pelletized composition was then injection-molded to test pieces which in turn were measured for its heat distortion temperature (in accordance with ASTM D648) and for its critical oxygen index (in accordance with ASTM D286). The results are shown in Table 13 below.

EXAMPLES 62-65

The polyetheric copolymer composition was prepared in substantially the same manner as in Example 61 with the exception that the polyetheric copolymer prepared in Example 61 was blended with a thermoplastic resin in an amount as shown in Table 13 below.

The composition was likewise measured for its heat distortion temperature and critical oxygen index. The results are shown in Table 13 below.

In Table 13 below, abbreviations for the thermoplastic resins and the polyetheric copolymers represent as follows:
PC: Polycarbonate
PEEK: Polyether ether ketone ("Victrex PEEK 450G"; ICI, Ltd.)
PES: Polyether sulfone ("Victrex 200P"; ICI, Ltd.)
PEI: Polyether imide ("Ultem 1000"; General Electric, Inc.)
Polyester: Aromatic polyester ("Sumiploy E-2000"; Sumitomo Chemical Co., Ltd.)

COMPARATIVE EXAMPLES 19-23

Only the thermoplastic resins used in Examples 61 to 65, respectively, without blend of the polyetheric copolymer, were measured for their properties. The results are shown in Table 13 below.

TABLE 13

|  | Thermoplastic Resins | | Polyetheric Copolymer | | Heat Distortion, °C. | Critical Oxygen Index |
|---|---|---|---|---|---|---|
|  | Kind | wt % | Mole Ratio of Unit* (I):(II) | wt % |  |  |
| Ex. 61 | PC | 50 | 30:70 | 50 | 155 | 39 |
| Comp. Ex. 19 | PC | 100 | — | — | 131 | 30 |
| Ex. 62 | PEEK | 50 | 30:70 | 50 | 153 | 45 |
| Comp. Ex. 20 | PEEK | 100 | — | — | 145 | 35 |
| Ex. 63 | PES | 50 | 30:70 | 50 | 180 | 42 |
| Comp. Ex. 21 | PES | 100 | — | — | 205 | 38 |
| Ex. 64 | PEI | 50 | 30:70 | 50 | 214 | 47 |
| Comp. Ex. 22 | PEI | 100 | — | — | 200 | 47 |
| Ex. 65 | Polyester | 20 | 30:70 | 80 | 274 | 45 |

TABLE 13-continued

| | Thermoplastic Resins | | Polyetheric Copolymer | | Heat Distortion. °C. | Critical Oxygen Index |
|---|---|---|---|---|---|---|
| | Kind | wt % | Mole Ratio of Unit (I):(II) | wt % | | |
| Comp. Ex. 23 | Polyester | 100 | — | — | 293 | 39 |

EXAMPLES 66-68

A polyetheric copolymer composition was prepared in the same manner as in Example 61 with the exception that the polyetheric copolymer, the thermoplastic resin, and the filler were used in amounts as shown in Table 14 below. The composition was measured for its physical properties as shown in Table 14 below.

In Table 14 below, abbreviations for the thermoplastic resins and the fillers represent as follows:
PFS: Polyphenylene sulfide ("Leyton R-4"; Philipps)
PET: Polyethylene terephthalate ("Linite 530"; Dupont Far East)
GF: Glass fibers ("PX-1"; Asahi Fiber Glass K.K.)
CF: Carbon fibers ("TORAYCA T-300"; Toray, Ltd.)
$TiO_2$: Titania ("P-25"; Aerogil)

COMPARATIVE EXAMPLES 24-26

A composition was prepared in substantially the same manner as in Example 61 with the exception that the polyetheric copolymer, the thermoplastic resin, and the filler are used in amounts as shown in Table 14 below.

The composition was measured for its physical properties and the results are shown in Table 14 below.

The polyetheric copolymer compositions according to the present invention are excellent in moldability, possess a sufficient high mechanical strength even at high temperatures, and superior in fire retardancy, heat resistance and mechanical characteristics. Thus they are extremely useful industrially in a wide variety of fields including mechanical, electronic and electrical fields.

TABLE 14

| | Thermoplastic Resins | | Polyetheric Copolymer | | Filler wt % | Heat Distortion, °C. | Critical Oxygen Index |
|---|---|---|---|---|---|---|---|
| | Kind | wt % | Mole Ratio of Unit (I):(II) | wt % | | | |
| Ex. 66 | PPS | 35 | 30:70 | 35 | GF 28 $TiO_2$ 2 | 315 | 58 |
| Comp. Ex. 24 | PPS | 60 | — | — | GF 40 | 260 | 50 |
| Ex. 67 | PET | 35 | 30:70 | 35 | GF 28 $TiO_2$ 2 | 295 | 59 |
| Comp. Ex. 25 | PET | 70 | — | — | GF 30 | 224 | 41 |
| Ex. 68 | PEEK | 35 | 30:70 | 35 | CF 30 | 320 | 62 |
| Comp. Ex. 26 | — | — | 30:70 | 100 | — | 203 | 42 |

The following is directed to an example and comparative examples relating to printed circuit boards as the feature (20) according to the present invention, which the polyetheric copolymer compositions as have been described hereinabove are used as a base material.

(20) Printed circuit boards

The flexible printed circuit boards according to the present invention are characterized in that the electrical insulating substrate is a composite consisting of 15% to 85% by weight of the polyetheric copolymer and 15% to 85% by weight of glass fibers.

(a) Insulating substrate

As the polyetheric copolymer to be used for the insulating substrate, there may be used those described hereinabove in the features (1), (3) and (5) of the present invention.

As the glass fibers, there may be used various glass fibers which may be prepared from quartz glass, soda glass or the like. The kinds of the glass fibers and processes for the preparation thereof are not restricted to particular ones and they may include, for example, those prepared by the direct melt method or by the marble method.

More specifically, the glass fibers are basically to be prepared by stretching the glass in a molten state and may be classified into long fibers and short fibers. The long fibers may be those prepared continuously from a nozzle made mainly of platinum, and the short fibers may be those called a so-called glass wool which is prepared by bursting molten glass out from small holes by means of centrifugal force or spraying burst gases or water vapor, thereby forming an aggregate body of fibers in a mat form. The long fibers may include, for example, E glass ($SiO_2 \cdot Al_2O_3 \cdot CaO \cdot MgO \cdot B_2O_3$ type glass), as a representative example, and alkali-resistant glass containing $ZrO_3$ on top of that. The short fibers may include, for example, acid-resistant C glass ($SiO_2 \cdot Al_2O_3 \cdot CaO \cdot MgO \cdot ZnO \cdot B_2O_3 \cdot Na_2O \cdot K_2O$ type glass), $SiO_2 \cdot Al_2O_3 \cdot Na_2O \cdot CaO \cdot MgO \cdot B_2O_3$ type glass, or the like.

The glass fibers may have a diameter ranging usually from 5 μm to 20 μm, preferably from 7 μm to 15 μm, and a length from 0.1 mm to 30 mm.

The glass fibers may be used in a form of woven or unwoven fabric or in a form of short fibers.

A previous surface-treatment of the glass fibers may introduce a functional group on a surface of the glass fibers, thereby improving wetting performance of the aromatic polyetheric copolymer as a matrix and, as a consequence, improving mechanical strength of the resulting insulating substrate. The surface-treatment may be carried out in the same manner as in the feature (16) of the present invention.

In order to maintain the polyetheric copolymer and the glass fibers in a stable state for a long period of time and improve their properties in forming the insulating substrate, there may be used additives such as antioxidants, heat stabilizers, nucleating agents together with the polyetheric copolymer.

The heat stabilizers may include, for example, lead salt type stabilizers, metal soap, metal salt liquid stabilizers, organic tin stabilizers, antimony type stabilizers, non-metal stabilizers, or the like.

As the nucleating agents may be used those used in the feature (19) of the present invention.

In the composite for forming the insulating substrate, the polyetheric copolymer and the thermoplatic resins may be used in place of the polyetheric copolymer.

As the thermoplastic resins to be used, there may be used those as used in the feature (19) of the present invention. Preferred thermoplastic resins are the same as those in the feature (19) of the present invention.

The amount of the thermoplastic resin may be such that 1% to 90% by weight thereof and 10% to 99% by weight of the polyetheric copolymer are substituted for 15% to 85% by weight of the former and 15% to 85% by weight of the latter, respectively.

(b) Formation of insulating substrate

The insulating substrate may be prepared (a) by admixing the polyetheric copolymer with the glass fibers in the form of short fibers and then subjecting the mixture to compression molding; (b) by spraying the polyetheric copolymer in a form of pellets or powders on the glass fibers in a form of long fibers formed into a mat-like form or in a fabric form and then subjecting the resulting composite composition to compression molding with heating; and (c) by forming the polyetheric copolymer in a sheet form, laminating the sheet on the long glass fibers formed in a mat-like form or in a fabric form, and subjecting the resulting the mat-like or fabric composition to compression molding under heating, thereby resulting in a composite in which the Polyetheric copolymer and the glass fibers are integrally disposed.

The insulating substrate thus formed can maintain its shape due to the presence of the glass fibers even at high temperatures so that they have improved mechanical properties such as bending strength and tensile strength and their heat distortion temperature has been raised to a remarkably high extent.

(c) Conductive layer

The conductive layer disposed on a surface of the insulating substrate may be formed by a metal foil obtained by electrolyzing or rolling of a metal selected from copper, aluminium, nickel and silver, as have been described hereinabove in the feature (13) of the present invention.

The following is directed to examples and comparative examples relating to the printed circuit boards as the feature (20) of the present invention.

EXAMPLE 69

The polyetheric copolymer was prepared in the same manner as in Example 1 and extrusion molded at 400° C. into pellets which, in turn, were formed into a sheet having a thickness of 0.5 mm and each side of 50 mm, so as to allow the aromatic polyetheric copolymer in the insulating substrate to amount to the amount as shown in Table 15 below.

Between two sheets of the polyetheric copolymer was sandwiched a mat of long continuous glass fibers ("GSM, M9600"; Asahi Fiber Glass K.K.) so as to allow the amount of the glass fibers in the insulating substrate to amount to that as shown in Table 15 below, thereby leading to a three-layer laminate.

The three-layer laminate was then heated at 400° C. and transferred to a 50 mm × 50 mm plate mold where the laminate was compressed at 6 kg/cm² for 5 minutes under heating. Thereafter, the laminate was transferred to a cooling press set at 250° C. and caused to cool at 30 kg/cm² for 5 minutes, thus leading to a composite sheet having a film thickness of 1.1 mm as an insulating base.

On a surface of the composite sheet was bonded an electrolyzed copper foil with an epoxy type adhesive, and the sheet was heated at 120° C. under the pressure of 5 kg/cm², thereby yielding a printed circuit board.

The resulting printed circuit board was then measured for various physical properties and the results are shown in Table 15 below.

EXAMPLE 70

A printed circuit board was prepared in substantially the same manner as in Example 69 with the exception that the polyetheric copolymer and the glass fibers were used in the amounts as shown in Table 15 below.

EXAMPLE 71

A printed circuit board was prepared in substantially the same manner as in Example 69 with the exception that the composition was used which was prepared by blending 80 parts by weight of the polyetheric copolymer prepared in the same manner as in Example 1 with 20 parts by weight of polyether ether ketone and kneading the mixture in a molten state. The printed circuit board was likewise measured for its various properties and the results are shown in Table 15 below.

COMPARATIVE EXAMPLE 27

A printed circuit board was prepared in substantially the same manner as in Example 69 except using polyether ether ketone ("Victrex PEEK"; ICI, Ltd.) as a thermoplastic resin.

The resulting circuit board was measured in the same manner as in Example 69, and the results are shown in Table 15 below.

TBLE 15

| | Exmpl 69 | Exmpl 70 | Exmpl 71 | Compara. Exmpl 27 |
|---|---|---|---|---|
| Kinds of Polymer in insulatg Substr. | Polyetheric Copolymer | Polyetheric Copolymer | Polyetheric Copolymer Composition | PEEK |
| Amount of Polymer % by weight | 79 | 70 | 70 | 79 |
| Amount of Glass Fibers, % by wt | 21 | 30 | 30 | 21 |
| Heat distortn temp. | 335° C. | 345° C. | 310° C. | 295° C. |
| Bending strength, kg.cm$^{-2}$ | 2,300 | 2,350 | 2,200 | 2,000 |
| Peeling strength, kg.cm$^{-2}$ | 2.0 | 2.0 | 2.0 | 1.7 |
| Dielectric constant | | | | |
| 23° C. | 3.4 | 3.4 | 3.4 | 2.8 |
| 150° C. | 3.4 | 3.4 | 3.4 | 2.8 |
| Dielectric dissipatn factor | | | | |
| 23° C. | 0.001 | 0.001 | 0.001 | 0.001 |
| 150° C. | 0.004 | 0.004 | 0.004 | 0.004 |

It is found that the printed circuit boards according to the present invention are high in heat distortion temperature so that they can retain their sufficiently high mechanical strength even at high temperatures. Thus they are not caused to cause distortion upon soldering electronic device on the printed circuit boards with soldering paste. More specifically, the printed circuit boards according to the present invention has been found to have a heat distortion temperature of about 335° C. while the soldering paste has a melt temperature of about 260° C. Accordingly, the printed circuit boards do not cause distortion upon soldering so that they are extremely useful for practical application.

The following is a description on the polyetheric copolymer compositions having positive-temperature coefficient as the feature (21) of the present invention.

(21) Compositions with positive-temperature coefficient

This composition is characterized, in a first aspect, in that the composition comprises the polyetheric copolymer and an electrically conductive substance and that the polyetheric copolymer is blended at a rate of 20% to 90% with respect to 100% by weight of a total weight of the polyetheric copolymer and the electrically conductive substance; and, in a second aspect, in that the composition comprises the polyetheric copolymer, the electrically conductive substance and a semi-conductive substance and that the polyetheric copolymer is blended at a rate of 20% to 90% by weight with respect to 100% by weight of a total weight of the polyetheric copolymer and the electrically conductive substance and that the semi-conductive substance is blended at a rate of 10 parts to 300 parts with respect to 100 parts by weight of a total weight of the polyetheric copolymer and the electrically conductive substance.

As the electrically conductive substances, there may be appropriately used such inorganic fillers as having an electrical conductivity among those have been enumerated hereinabove in the feature (5) of the present invention. The fillers may include, for example, finely divided particles of carbon black, graphite, carbon fibers, or the like, powders of a metal such as iron, zinc, copper, aluminium, nickel or the like. Among those, carbon black and graphite are preferred and carbon black is more preferred. The electrically conductive substances may be used singly or in combination with other substances. There is no particular limit to be placed upon shapes of the conductive substance, and it may be in a form of granules, plates, fibers or the like. For the electrically conductive substances, particle sizes of carbon black may range usually from 10 to 200 m$\mu$, preferably from 10 to 100 m$\mu$ while particle sizes of powders of the substances other than carbon black may range preferably from 10 to 100 m$\mu$. When the electrically conductive substance is carbon fibers, its aspect ratio may range usually from 1 to 1,000, preferably from 1 to 100.

The semi-conductive substance may have a specific resistance ranging preferably from $10^{-2}$ to $10^{-8}$ Q&10 cm. Specific examples of the semi-conductive substance may include SiC, B$_4$C, Si, Ge, SnO, GaSb, GaP, GaAs, InSb, InSe, GaSe, InTe, Li$_3$N, $\beta$-Al$_2$O$_3$ or the like. This substance may be used singly or in combination of two or more.

The semi-conductive substance may have particle sizes ranging usually 300 $\mu$m or smaller, preferably 100$\mu$m or smaller.

In the first aspect of the compositions having positive-temperature coefficient, the amount of the polyetheric copolymer to be blended may range usually from 20% to 90% by weight, preferably from 50% to 70% by weight, with respect to 100% by weight of a total weight of the polyetheric copolymer and the electrically conductive substance. Thus the amount of the electrically conductive substance may range usually from 10% to 80% by weight, preferably from 30% to 50% by weight. If the amount of the polyetheric copolymer is less than the lower limit, the composition functioning as an exothermic body cannot generate a sufficient degree of heat. If the amount of the copolymer exceeds its upper limit, then the composition cannot achieve sufficient positive-temperature coefficient.

In the second aspect of the compositions having positive-temperature coefficient, the amount of the polyetheric copolymer to be blended may range usually from 20% to 90% by weight, preferably from 50% to 70% by weight, with respect to 100% by weight of a total weight of the polyetheric copolymer and the conductive substance. If the amount of the polyetheric copolymer would be outside the above range, the disadvantages as have been described hereinabove may be caused.

The amount of the semi-conductive substance may range usually from 10 to 300 parts by weight, preferably from 50 to 200 parts by weight, with respect to 100 parts by weight of a total weight of the polyetheric copolymer and the conductive substance. If the amount of the semi-conductive substance is less than the lower limit, an improvement in a withstand voltage of the composition becomes insufficient. The semi-conductive substance in amounts larger than the upper limit may impair moldability.

Blending of the polyetheric copolymer with the conductive substance improves predominantly a withstand voltage as well as stability against resistance and temperature, as compared with the case of blending thereof with no semi-conductive substance.

It is possible to add an additive such as a modifier or the like to the composition as long as the object of the present invention may not be impaired.

The polyetheric copolymer ma be blended with the conductive substance by means of per se known mixing or kneading means. They may include, for example, screw extruders, Banbury mixers, ball mills, two-roll mills, three-roll mills, pebble mills, side grinders, atomizer mills, high-speed impeller dispersers, high-speed stone mills, high-speed impact mills, disperser kneaders, high-speed mixers, homogenizers, ultrasonic dispersers and so on. The resulting mixture or kneaded materials may be molded into a desired shape by means of per se known procedures such as press molding, injection molding, extrusion molding or the like.

In order to use the molded products as overcurrent protective elements, temperature protective elements, or exothermic bodies, it is necessary to mount an electrode thereon. Mounting of the electrode may be effected by contact bonding with a metal foil, a metal mesh or the like, by coating or printing a conductive paste, by depositing a metal, or by plating a metal.

After the electrode has been mounted, it is preferably subjected to an exterior coating.

The compositions in the first aspect comprise blending the polyetheric copolymer with the conductive substance in particular amounts so that they can demonstrate positive temperature coefficient even in a temperature range as high as from 250° C. to 350° C. and a high degree of electricity can pass through the compositions.

The compositions in the second aspect comprise blending the polyetheric copolymer with the conductive substance and the semi-conductive substance in particular amounts so that they are provided with an ensuredly improved withstand voltage and they are excellent in an exothermic homogeneity, in addition to excellent positive temperature coefficient and passage of a large degree of electricity.

The following is examples and comparative examples relating to the compositions having positive temperature coefficient.

EXAMPLE 72

Seventy parts by weight of powders of the polyetheric copolymer prepared in the same manner as in Example 1 were blended with 30 parts by weight of carbon black ("DIABLACK E"; Mitsubishi Kasei K.K., average particle size 43 m$\mu$) and 1 part by weight of titanium dioxide (Nihon Aerogil K.K.; titanium dioxide being in a mixture of rutile type with anatase type; average particle size: 20 m$\mu$) and kneaded with a twin-screw extrusion kneader at 390° C.

The kneaded mixture was molded at 380° C. by a hot press into a film which, in turn, was bonded on its both surfaces with a deposited nickel foil and then press-molded into a laminated sheet having a thickness of 1 mm.

Thereafter, the laminated sheet was annealed at 230° C. for 10 minutes and cut to a 3-cm long element sample.

The element sample was then measured for a relationship of its resistance vs. temperatures in a flow thermostat. Its property is shown in FIG. 1 and it is found that a rapid increase in resistance was recognized at temperatures higher than 330° C. Its specific resistance at room temperature was 16.2 Q·cm.

It was further measured for its exothermic property and found to have a calorific value of 19.0 watts in a steady range in which a value of (current)×(voltage) becomes constant. Its surface temperature at this time was 320° C.

Another element sample with 1 cm long sides was measured for its static withstand voltage by applying voltage up to breakage of the sample. And its voltage was found to be 100 V.

EXAMPLE 73

Sixty-two parts by weight of powders of the polyetheric copolymer prepared in the same manner as in Example 1 were blended with 38 parts by weight of carbon black used in Example 72, 1 part by weight of titanium oxide used in Example 72 and silicon carbide powders ("SiC #2000"; Fujimi Kenmazai Kogyo K.K.), and the mixture was kneaded at 400° C. with a twin-screw extruder.

The kneaded mixture was formed at 400 into a laminated film in the same manner as in Example 72. The resulting laminated film was annealed at 230° C. for 10 minutes and formed into an element with 3 cm long sides.

As a result of measurement of the element sample for a relationship of resitances with temperatures, a rapid increase in resitance at temperatures above 320° C. was recognized. It had a specific resistance of 15.05 Q·cm at room temperature.

It was further measured for its exothermic property and found to have a calorific value of 20.0 watts in a steady range in which a value of (current)×(voltage) becomes constant. Its surface temperature at this time was 312° C. and its infrared thermograph has revealed that it had a uniform distribution of surface temperatures higher than the sample prepared in Example 72.

Another element sample with 1 cm long sides had a static withstand voltage of 150 V.

EXAMPLE 74

Powders of the polyetheric copolymer prepared in the same manner as in Example 6 were blended in the same manner as in Example 72 and kneaded with a twin-screw extrusion kneader. The resulting composition was molded at 400° C. into a laminated film in the same manner as in Example 72. The laminated film was then annealed at 270° C. for 2 hours and formed into an element sample with 3 cm long sides.

As a result of measurement of the element sample for a relationship of resitances with temperatures, a rapid increase in resitance at temperatures above 340° C. was recognized. It had a specific resistance of 10.2 Q·cm at room temperature.

The sample was further measured for its exothermic property and found to have a calorific value of 22.0 watts in a steady range. Its surface temperature at this time was 325° C.

COMPARATIVE EXAMPLE 28

A composition was prepared by blending 74 parts by weight of ethylene-ethyl acrylate copolymer ("NUC 6570"; Nippon Unicar K.K.) with 26 parts by weight of carbon black used in Example 72 and kneading the mixture at 120° C. for 20 minutes with blast mill for laboratory use.

The composition was then formed at 170° C. with a hot press machine into a sheet which was further press-molded with an electrolyzed nickel foil interposed on its both surfaces, thereby yielding a laminated sheet having a thickness of about 1 mm. The laminated sheet was cut to an element sheet with 3 cm long sides.

The sample was then measured for its relationship of resitances with temperatures in a flow thermostat and found to have such properties as shown in FIG. 1 and, as a result, an increase in resistances was shown in a low temperature range.

It was further found to have a specific resistance of 19.5 Q·cm at room temperature. Furthermore, it gave a calorific value of 2.6 watts in a steady range and a surface temperature of 84° C.

COMPARATIVE EXAMPLE 29

A composition was prepared by blending 70 parts by weight of high-density polyethylene ("540B"; Idemitsu Petrochemical Co. Ltd.) with 30 parts by weight of carbon black used in Example 72 and kneading the mixture at 170° C. for 20 minutes with blast mill for laboratory use.

The composition was then formed at 190° C. with a hot press machine into a sheet which was further press-molded with an electrolyzed nickel foil interposed on its both surfaces, thereby yielding a laminated sheet having a thickness of about 1 mm. The laminated sheet was cut to an element sheet with 3 cm long sides.

The sample was then measured for its relationship of resitances with temperatures in a flow thermostat and found to have such properties as shown in FIG. 1 and, as a result, an increase in resistances was shown in a low temperature range.

It was further found to have a specific resistance of 15.7 Q·cm at room temperature. Furthermore, it gave a calorific value of 3.4 watts in a steady range and a surface temperature of 120° C.

The compositions in the first aspect comprise blending the polyetheric copolymer with the conductive substance in particular amounts so that they can demonstrate excellent positive-temperature coefficient and that a high degree of electricity can pass through the compositions.

The compositions in the second aspect comprise blending the polyetheric copolymer with the conductive substance and the semi-conductive substance in particular amounts so that they are provided with an excellent withstand voltage and they are excellent in an exothermic homogeneity, in addition to those properties possessed by the compositions in the first aspect.

Thus the compositions according to the present invention can be appropriately used in electrical, electronic and mechanical fields, etc., as overcurrent protective elements, temperature protective elements, exothermic bodies capable of generating a large amount of calorific values.

The following is a description on the polyetheric copolymer compositions to be used for electrically conductive materials.

(22) Polyetheric copolymer compositions for electrically conductive materials This composition is characterized in that it comprises blending 100 parts by weight of the polyetheric copolymer with 20 parts to 300 parts by weight of metal particles and/or metal fibers.

The metal in a form of particles or fibers may be any metal that can be blended with an electrically conductive material of a per se known plastic base. It may specifically include, for example, a free metal such as copper, silver, gold, tin, aluminium, zinc, lead, nickel, cobalt, iron, chromium, molybdenum, tungsten, titanium and so on, and a metal alloy such as brass, stainless steel and so on. Preferred are metals of an iron type metal, an aluminium type metal or a copper type.

The metal may be appropriately chosen from those as have been enumerated hereinabove in accordance with purposes of uses of the polyetheric copolymer composition for conductive materials and it may be used singly or in combination of two or more metals.

The metal in a form of particles, on the one hand, may be understood herein to include, in wide terms, the metal in a form ranging from usual particles to flakes and those similar to fibers.

The metal in a form of fibers, on the other hand, may be understood herein to include, in wide terms, the metal in a form ranging from usual fibers to those similar to a particulate form and whisker.

Particulate shapes of the metal are not restricted to particular ones and there may be appropriately used one having a particle size usually longer than 10 $\mu$m or smaller, preferably from 5 $\mu$m to 10 $\mu$m.

The metal is not restricted to a particular fibrous shape and there may be appropriately have fibrous ones having a fiber length ranging from 0.5 to 200 mm and a fiber diameter ranging from 10$\mu$m to 500$\mu$m. The metal in a fibrous form may be blended as a filler, as needed.

If metallic particles and fibers to be blended would be too large, blending becomes hard to be implemented, thus impairing dispersibility in the composition and leading to an insufficient electrical conductivity or reducing a moldability.

The metallic particles and fibers may be subjected to surface treatment, as desired, in an appropriate manner as have been described hereinabove in order to improve a compatibility with a matrix resin or the like.

The metal in the particulate and fibrous form may be used singly or in combination of two or more and the particulate metal may also be used together with the fibrous metal.

The metallic fibers may be said to be preferred rather than the metal particles.

In the polyetheric copolymer compositions for the conductive materials in accordance with the present invention, the metal in the particulate and/or fibrous forms may be blended at the rate ranging usually from 20 parts to 300 parts by weight, preferably from 50 to 200 parts by weight, with respect to 100 parts by weight of the polyetheric copolymer. If the amount of the metal would be too small, a sufficient degree of electrical conductivity cannot be provided. If the amount of the metal would become too large, it is difficult to blend it with the matrix resin. In either case, the objects of the present invention cannot be achieved.

The polyetheric copolymer composition for the electrically conductive materials according to the present invention may contain other components including an additive to be conventionally used for other polymers or resin compositions, such as fiber reinforcing material, e.g., glass fibers, carbon fibers or the like. inorganic or organic fillers, lubricating agents, lubricants, plasticizers, antioxidants, antistatic agents, heat stabilizers, weathering improving agents, colorants.

The polyetheric copolymer composition for the conductive materials in accordance with the present invention may be prepared by admixing the polyetheric copolymer with the metal in the particulate and/or fibrous forms and, as needed, with such other components as have been enumerated hereinabove and kneading the resulting mixture in a molten state in conventional manner.

The resulting mixture may be molten and kneaded at a temperature which may range usually from 380° C. to 410° C., preferably from 380° C. to 400° C. for a period of time ranging usually for one minute, preferrably for 1-3 minutes.

The melting and kneading may be preferably implemented in an inert atmosphere in which nitrogen gases are usually used.

The kneading of the mixture in a molten state may be appropriately effected by means of various devices. It is preferred to knead the mixture with the twin-screw extruders while extruding it in a desired molded shape.

The polyetheric copolymer compositions for the electrically conductive materials according to the present invention may be cut into pellets, as needed, after extrusion, and pellets are then molded into products in desired shapes. The molding method is not restricted to a particular one and various methods such as injection molding may be appropriately used.

The polyetheric copolymer compositions for the conductive materials according to the present invention, which may be prepared in such a manner as have been described hereinabove, are excellent in electrical conductivity, particularly the effect of shielding electromagnetic waves associated with the electrical conductivity, and high in mechanical strength, including impact resistance, and in heat resistance, as well as excellent in fire-retardancy and in chemical resitance. Furthermore, they are readily moldable so that they may be used in various fields including electromagnetic waves-shielding materials for electrical and electronic instrument and devices.

The following is directed to examples and comparative examples relating to the polyetheric copolymer composition for the conductive materials.

EXAMPLES 75-77

The polyetheric copolymer prepared in the same manner as in Example 61 was blended with brass fibers (fiber diameter, 60 μm; fiber length, 3 mm) at rates as will be shown in Table 16 below and the mixture was then melt-kneaded and extruded at 390° C. with a twin-screw extruder (Model PC-30; Ikegai Tekko K.K.), thereby forming into pellets. The resulting pellets were molded with an injection molding machine (IS45P; Toshiba, Inc.) at a cylinder temperature of 380° C. and a mold temperature of 200° C. into a flat plate with a thickness of 3.2 mm and a length of 80 mm for each side.

The resulting molded product was then formed into test pieces which in turn were measured for its volume intrinsic resistance and electromagnetic waves shielding properties.

The electromagnetic waves shielding properties were measured using a device in accordance with Nason, W.D., Plast. Eng., 42(1980), at 100 MHz. In this measurement, 20 decibel or higher was found to be effective and lower than 20 decibel was found to be ineffective. The results are shown in Table 16 below.

COMPARATIVE EXAMPLES 30 and 31

A composition was prepared into a molded product by blending the same components in amounts as shown in Table 16 below in substantially the same manner as in Example 75.

The resulting composition was then formed into pellets in the same manner as in Example 75, however, it was found that, in Example 31 in which more than 300 parts by weight of metal fibers (in this example, brass fibers) were added, melt-kneading could not be implemented because of its high concentration of the metal fibers, thus resulting in no formation of pellets.

As will be apparent from Table 16 below, it has been found that the amounts of the metal in particulate and/or fibrous forms in the range from 20 parts to 300 parts by weight per 100 parts by weight of the polyetheric copolymer, as in Examples 75 to 77, on the one hand, can provide the excellent polyetheric copolymer compositions for conductive materials with a sufficiently low volume intrinsic resistance and with a satisfactory electromagnetic waves shielding effects. It has been found, on the other hand, that the composition containing a small amount of the metal fibers less than 20 parts by weight (in Comparative Example 30, 10 parts by weight) gave a remarkably high volume intrinsic resistance that it cannot be said to be a composition for conductive material and that no electromagnetic waves shielding effect can be recognized.

EXAMPLES 78-79

The procedure of Example 75 or 76 was followed in the same manner with the exception that, in place of the brass fibers, iron fibers (fiber diameter, 50 μm; fiber length, 3 mm) were used in the amount as shown in Table 16 below, thereby yielding a composition which, in turn, was measured for its properties. The results are shown in Table 16 below.

TABLE 16

|  | Copolymer: Brass Fibers (by weight) | Copolymer: Iron Fibers (by weight) | Volume Intrinsic Resistance (Ω.cm) | Electromagnetic Waves Shielding Effect |
|---|---|---|---|---|
| Ex. 75 | 100:100 | — | $3.2 \times 10^{-2}$ | Effective |
| Ex. 76 | 100:50 | — | $8.0 \times 10^{-2}$ | Effective |
| Ex. 77 | 100:150 | — | $1.2 \times 10^{-3}$ | Effective |
| Cmp. Ex 30 | 100:10 | — | $5.1 \times 10^{-12}$ | Ineffect. |
| Cmp. Ex 31 | 100:350 | — | —* | —* |
| Ex. 78 | — | 100:100 | $2.1 \times 10^{-2}$ | Effective |
| Ex. 79 | — | 100:50 | $6.3 \times 10^{-2}$ | Effective |

Note: —*Composition could not be melted

The present invention provides the polyetheric copolymer composition comprising specified amounts of the polyetheric copolymer having a particular structure and the metal fibers and/or the metal particles with an excellent electrical conductivity, particularly with excellent electromagnetic waves shielding effects, and with high mechanical strength including impact resistance as well as with superior heat and chemical resistance and with high fire-retardancy. The composition according to the present invention is further ready to mold. Thus, the polyetheric copolymer composition is useful as conductive materials which are practically available in various fields as electromagnetic shielding materials for electrical and electronic devices and instrument.

The following is a description on the polyetheric copolymer compositions to be used for sliding members as the feature (23) of the present invention.

(23) Polyetheric copolymer compositions for sliding members

This composition is characterized in that it comprises 20 to 95% by weight of the polyetheric copolymer and 3% to 70% by weight of a fibrous filler having a Mohs hardness of 6 or lower and 2% to 40% by weight of a non-tackifying agent.

The fillers in a form of fibers may be any fibrous filler having a Mohs hardness of 6 or lower. It is to be understood herein that the term "fibers" or related words are intended to be used to include the filler in a form of whiskers. The fibrous filler may include, for example, potassium titanate whiskers (Mohs hardness of about 4), wollastonite fibers (Mohs hardness of about 4.5), and so on.

Shapes of the fibrous fillers are not restricted to any particular ones and the fillers may have an average fiber length ranging usually from about 5 to 100 μm and an average fiber diameter ranging usually from about 0.05 to 2 μm.

The fibrous fillers to be used may be preferably subjected to surface treatment with a treating agent such as a silane coupling agent, a titanate coupling agent or the like.

The fibrous fillers may be used singly or in combination of two or more.

As the non-tackifying agent, there may be used any agent which can improve a friction coefficient of the resulting sliding member and provide the sliding member with a lubricating function.

More particularly, there may be mentioned, for example, a known solid lubricating agent such as polymer of fluorine compound, graphite, molybdenum disulfide, or the like. Preferred are polymer of fluorine compound, graphite and molybdenum disulfide.

The non-tackifying agent may be used singly or in combination of two or more.

In the polyetheric copolymer compositions for the sliding members according to the present invention, the polyetheric copolymer may be blended in an amount ranging usually from 20% to 95% by weight, preferably from 35% to 90% by weight, with the fibrous filler in an amount ranging usually from 3% to 70% by weight, preferably from 5% to 50% by weight, and the non-tackifying agent in an amount ranging usually from 2% to 40% by weight, preferably from 5% to 30% by weight, with respect to 100% by weight of a total weight of the polyetheric copolymer, the fibrous filler and the non-tackifying agent.

If the fibrous filler would be below the lower limit, no sufficient reinforcing effect can be achieved. If the amount of the fibrous filler would be above the upper limit, a smooth surface of a partner member can be damaged or injured. Thus, in either case, the object to be provided by the polyetheric copolymer composition of the present invention cannot be accomplished.

If the amount of the non-tackifying agent is less than 2% by weight, a sufficient lubricating performance cannot be gained. If the non-tackifying agent would be used in amounts exceeding 40% by weight, then a mechanical strength of the resulting composition may be reduced. Thus, no object of the present invention can be achieved in either case.

If the amount of the polyetheric copolymer to be blended would be less than the lower limit, on the one hand, the resulting composition may become so poor in its fluidity that the composition becomes unlikely to be readily molded. If the polyetheric copolymer would be blended in an amount larger than the upper limit, on the other, the effect for modification to be expected to be gained cannot be achieved to a sufficient extent. Accordingly, in each case, the object of the present invention cannot be achieved.

Further, it is to be noted that the polyetheric copolymer compositions according to the present invention, useful for sliding members, may contain a variety of additives which are conventionally used for other ingredients including other polymers or resin compositions, such as fiber reinforcing agents such as glass fibers, carbon fibers or the like, inorganic or organic fillers, lubricating agents, lubricants, plasticizers, antioxidants, antistatic agents, heat stabilizers, weathering improving agents, colorants and so on, as long as such additives do not impair or impede the object of the present invention.

The polyetheric copolymer compositions for a sliding member according to the present invention may be prepared by blending the polyetheric copolymer with the fibrous filler as well as the non-tackifying agent and, as desired, the additive or additives in given amounts and melt-kneading the mixture in conventional manner.

The temperature at which the mixture is melt-kneaded may range usually from 350° C. to 400° C., preferably from 360° C. to 380° C., for a period of time ranging usually from 1 to 10 minutes, preferably from 2 to 5 minutes.

The polyetheric copolymer composition thus prepared may then be molded, as needed, into desired shapes such as pellets by means of conventional means such as extruders.

The composition for the sliding member in accordance with the present invention may be appropriately prepared in a manner as have been described hereinabove.

These polyetheric copolymer compositions for the sliding member are excellent molding materials for preparing molded products which retain excellent basic properties inherent in the aromatic polyetheric copolymer to be used as a major component, such as mechanical strength, heat resistance, fire-retardancy and chemical resistance, and are provided with a high rigidity in a wide temperature range, an excellent dimensional stability, a small coefficient of friction and abrasion, and a superior sliding properties such as unlikeliness to damage a partner member. They can be appropriately used particularly for molding materials of various sliding parts including bearings, gears and so on, and they are also used effectively in the field of sliding devices and instrument.

When the polyetheric copolymer composition for the sliding member according to the present invention is used for molding products including sliding parts such as bearings, gears and so on, the molding can be implemented in conventional manner, for example, by injection molding pellets of the composition, thereby forming molded products in desired shapes.

EXAMPLES 80–84 AND COMPARATIVE EXAMPLES 32–33

The polyetheric copolymer prepared in the same manner as in Example 61 was blended with the fibrous filler and the non-tackifying agent in amounts as will be shown in Table 17 below and melt-kneaded at 375° C. with a twin-screw extruder (Model PC-30; Ikegai Tekko K.K.) and then cut into the composition in a form of pellets.

The pellets were then molded at a cylinder temperature of 370° C. and a mold temperature of 200° C. with an injection molding machine (Model IS45P; K.K. Toshiba) into a flat plate with a thickness of 3.2 mm and sides of 80 mm each.

A test piece of the resulting composition was prepared by injection molding from a film gate having a thickness of 1 mm located at one side, 80 mm long, of a mold having a dimension of 80 mm×80 mm×3.2 mm. The test piece was then measured for its shrinkage percentages as a ratio of its dimension to the dimension of the mold in the direction of a flow of extrusion of the composition (MD) and in the direction perpendicular to the flow of extrusion thereof (TD).

As sliding characteristics of the resulting composition, coefficient of friction and abrasion were mearsured with material S45C used as a partner member, under a pressure of 5 kg/cm$^2$ and a velocity of 10 meters per minute using a thrust type friction tester (Friction Tester Model EFM-III-F; Orientek K.K.). An extent of damage was measured by visually observing a surface of the partner member). The results are shown in Table 18 below.

TABLE 17

| | Components of Composition | | | | | |
|---|---|---|---|---|---|---|
| | Polyether Copolymer | K titanate whiskers | Wollastonite | Polytetrafluoroethylene | Graphite | Glass fibers |
| Example 80 | 70 | 20 | — | 10 | — | — |
| Example 81 | 60 | 30 | — | 10 | — | — |
| Example 82 | 60 | 30 | — | — | 10 | — |
| Example 83 | 40 | 40 | — | 20 | — | — |

TABLE 17-continued

| | Components of Composition | | | | | |
|---|---|---|---|---|---|---|
| | Poly-ether Copo-lymer | K ti-tanate whis-kers | Wolla-sto-nite | Poly-tetra-fluoro ethy-lene | Gra-phite | Glass fibers |
| Example 84 | 40 | — | 40 | 20 | — | — |
| Comp. Ex 32 | 100 | — | — | — | — | — |
| Comp. Ex 33 | 70 | — | — | — | — | 30 |

TABLE 18

| | Molding Shrin-kage. % | | Bending Modulus kg/mm$^2$ | | Sliding Properties | | |
|---|---|---|---|---|---|---|---|
| | | | | | Friction Coeffi-cient. $\mu$ | Abrasion Coeffi-cient, cm$^3$.sec/ kg.m.hr × 10$^4$ | Extent of Damage on Partner Member |
| | MD | TD | 23° C. | 200° C. | | | |
| Ex 80 | 0.8 | 1.0 | 720 | 420 | 0.2 | 6 | None |
| Ex 81 | 0.8 | 0.9 | 800 | 450 | 0.2 | 6 | None |
| Ex 82 | 0.7 | 0.8 | 800 | 450 | 0.1 | 7 | None |
| Ex 83 | 0.5 | 0.7 | 840 | 470 | 0.1 | 4 | None |
| Ex 84 | 0.5 | 0.7 | 840 | 460 | 0.1 | 6 | None |
| Comp. Ex 32 | 1.1 | 2.1 | 300 | 60 | 0.5 | 13 | None |
| Comp. Ex 33 | 0.3 | 0.9 | 930 | 500 | 0.3 | 6 | Large extent |

The following is a description on the radiation-resistant polyetheric copolymer compositions as the feature (24) of the present invention.

(24) Radiation-resistant polyetheric copolymer compositions

The radiation-resistant polyetheric copolymer composition according to the present invention is characterized in that it comprises 20% to 80% by weight of the polyetheric copolymer and 20% to 80% by weight of an inorganic material.

The inorganic materials to be used for the preparation of the radiation-resistant composition may include, for example, carbon fibers such as polyacrylonitrile type carbon fibers (PAN type carbon fibers), pitch type carbon fibers, gas phase growth type carbon fibers, lignin-poval type carbon fibers and phenol type carbon fibers, carbon black such as furnace black, channel black, thermal black and acetylene black, carbonaceous materials such as graphite, amorphous carbon, artificial diamond, and diamond-like carbon, and other inorganic materials such as glass fibers, asbestos, ferrite, titania, zirconia, mica, clay, talc, montmorillonite, bentonite, calcium carbonate, magnesium carbonate, calcium sulfate, calcium sulfite, magnesium sulfate, silicon carbide, silicon nitride, and boron nitride.

Shapes of the inorganic materials to be used for the present invention are not restricted to particular ones and the materials may be in a form of particles, fibers or whiskers or in any other appropriate form. Particularly, when the carbon fibers or glass fibers are used as the inorganic material, it may be used in a form of short fibers or long fibers. Furthermore, their fibers may also be used in a form of a woven or unwoven fabric or knit fabric.

In any case, the inorganic material may be used singly or in combination of two or more.

It is to be noted that the radiation-resistant polyetheric copolymer composition according to the present invention may be a composite material in which the inorganic material as have been enumerated hereinabove is dispersed in a matrix of the polyetheric copolymer or a prepreg in which the polyetheric copolymer is impregnated in the inorganic material in the form of the woven or unwoven fabric or in the knit fabric.

One of significant points in the radiation-resistant polyetheric composition according to the present invention resides in the fact that the inorganic materials is blended at the rate ranging usually from 10% to 80% by weight, preferably from 20% to 50% by weight, with respect to a total weight of the polyetheric copolymer and the inorganic materials. Blending of the inorganic materials in the amount within the range as have been described hereinabove can impart unique properties that its mechanical strength is reduced merely to a small extent upon exposure to radiation. The inorganic material in the amount less than the lower limit cannot give a sufficient extent of the effect to be expected to be blended, while the inorganic material in the amount exceeding the upper limit makes, the mechanical strength of the composition itself smaller so that it is not practically useful.

The radiation-resistant polyetheric copolymer according to the present invention may contain other ingredients as long as they do not impair or impede the object of the present invention. The other ingredients may include, for example, other kinds of thermoplastic resins, thermosetting resins, antioxidants, ultraviolet absorbers, fire-retardants, antistatic agents, lubricants, colorants, surface treating agents and so on.

The mothod of preparing the radiation-resistant polyetheric copolymer composition, particularly a composite material in which the inorganic material is dispersed in the polyetheric copolymer, is not restricted to a particular one and may include, for example, a method of pre-mixing all the ingredients and thereafter kneading the resulting pre-mix with the rest of the ingredients, a method of reacting the dihalogeno benzonitrile and the 4,4'-dihalogeno benzophenone with the 4,4'-biphenol in the presence of the inorganic material or a method of blending the polyetheric copolymer with the inorganic material, adding the other ingredient or ingredients and then mixing or kneading the resulting mixture.

The mixing or kneading may be implemented with a conventional means such as, for example, ribbon blender, tumble mixer, Henschel mixer, open roll, Banbury mixer, single screw extruder, twin-screw extruder, reciprocal screw kneader or the like.

The radiation-resistant polyetheric copolymer composition according to the present invention as a composite material, on the one hand, may be molded into desired shaped products by means of a conventional molding method such as injection molding, press molding, extrusion molding or the like. The radiation-resistant polyetheric copolymer composition according to the present invention as a prepreg, on the other hand, may be prepared, for example, by impregnating the polyetheric copolymer into the inorganic material in the form of woven or unwoven fabric or knit fabric.

EXAMPLE 85

The polyetheric copolymer prepared in the same manner as in Example 61 was blended with carbon fibers having an average fiber diameter of 9 μm ("TORAYCA T-300"; Toray, Ltd.) and kneaded at 360° C. and extruded with an extruder, thereby yielding the desired composition in a form of pellets containing 30% by weight of the carbon fibers.

The pellets were injection molded into a test piece which, in turn, was irradiated with electron rays of 21 MGy per hour and then measured for its tensile strength. The results are shown in Table 19 below.

EXAMPLE 86

The procedure was followed in the same manner as in Example 85 with the exception that, in place of carbon fibers, glass fibers having an average fiber diameter of 10 μm and an average fiber length of 3 mm were used, yielding the composition. The resulting composition was likewise measured for its radiation-resistant properties and the results are shown in Table 19 below.

COMPARATIVE EXAMPLE 34

The procedure was followed in the same manner as in Example 85 with the exception that a composition ("PEEK 4530CA"; 30% carbon fibers; ICI, Ltd.) was used. The resulting composition was measured in the same manner as in Example 85 and the results are shown in Table 19 below.

TABLE 19

| | Inorganic Material, Kind & Weight, % | Items Measured | Amount of Electron Rays Irradiated (MGy) | | | |
|---|---|---|---|---|---|---|
| | | | 0 | 30 | 50 | 70 |
| Example 85 | Carbon Fibers, 30% by wt | Strength, kg/cm² | 2520 | 2500 | 2480 | 1600 |
| | | Elongation, % | 3 | 3 | 2 | 2 |
| Example 86 | Glass Fibers, 30% by wt | Strength, kg/cm² | 2000 | 2100 | 2050 | — |
| | | Elongation, % | 4 | 5 | 4 | — |
| Comparat. Example 34 | PEEK (Carbon Fibers, 30% by wt) | Strength, kg/cm² | 2400 | 1700 | 1250 | — |
| | | Elongation, % | 5 | 2 | 1 | — |

As is apparent from Table 19 above, it has been found that the polyetheric copolymer composition according to the feature (24) of the present invention is a material excellent in a resistance to radiation.

The following is a description on the radiation-shielding polyetheric copolymer compositions as the feature (25) of the present invention.

(25) Radiation-shielding polyetheric copolymer compositions

The radiation-shielding polyetheric copolymer composition according to the present invention is characterized in that it comprises 20% to 95% by weight of the polyetheric copolymer and 5% to 80% by weight of lead and/or a lead compound.

In accordance with the present invention, lead may be used in a form of particles. Sizes of the lead particles are not restricted to particular ones and may be conveniently determined in accordance with use. For example, the lead particles may have particle diameters ranging usually from 5 to 500 μm, preferably from 10 to 100 μm.

The lead or leaden compound may be an inorganic or organic leaden compound. The inorganic leaden compound may include, for example, lead sulfide, lead monoxide, lead carbonate, lead sulfate, lead hydroxide, lead chloride, lead iodide, lead nitrate, white lead, lead chromate, lead dioxide, calcium orthoplumbate, calcium metaplumbate, red lead, lead sesquioxide, and the like. The organic leaden compound may include, for example, lead acetate, lead propionate, lead lactate, lead levulinate, lead isovalerate, tetraphenyllead, or the like.

Shapes of the lead compounds are not restricted to particular ones and the leaden compounds may be in a form of powders or bulks. The lead or lead compounds may be used singly or in combination of two or more. Furthermore, lead may be used in combination with the leaden compound or compounds.

For the radiation-shielding polyetheric copolymer compositions according to the present invention, one of significant points resides in the fact that the lead and/or the lead compound is or are blended in amounts ranging usually from 5% to 80% by weight, preferably from 20% to 80% by weight, with the polyetheric copolymer in amounts ranging usually from 20% to 95% by weight, preferably from 20% to 80% by weight, with respect to a total weight of the polyetheric copolymer and the lead and/or lead compound.

When the lead and/or lead compound are or is blended at the rate within the range as have been defined hereinabove, the resulting polyetheric copolymer compositions according to the present invention can impart the great effect of shielding radiation, particularly electron rays and gamma rays, as well as an extent of deterioration of the resulting composition in mechanical strength and so on is extremely small. On the contrary, when the lead and/or lead compound are or is blended at the rate less than the lower limit, only a poor shielding effect can be gained. And when the lead and/or the lead compound are or is blended at the rate greater than the upper limit, kneading of the mixture becomes hard to be implemented.

As have been described hereinabove, the radiation-shielding polyetheric copolymer compositions, according to the present invention comprises blending the polyetheric copolymer with the lead and/or lead compound in particular amounts so that the resulting compositions can impart excellent degrees of radiation shielding properties and radiation resistance.

The compositions according to the present invention may contain another component as long as it does not impair or impede the object of the present invention. The component to be additionally blended may be additives such as other kinds of thermoplastic resins, thermosetting resins, antioxidants, ultraviolet absorbers, fire-retardants, antistatic agents, lubricants, colorants, surface treating agents or the like. As further other components, for example, graphite, boron oxide, boron carbide, boron-containing mine and so on may be blended for effectively shielding neutrons.

The radiation-shielding polyetheric copolymer compositions may be mixed and kneaded in substantially the same manner as in the method for the preaparation of the radiation-resistant polyetheric copolymer composition as have been described hereinabove as in the feature (24) of the present invention.

The compositions according to the present invention may be molded into desired shapes in a conventional manner as by injection molding, press molding, extrusion molding or the like.

The following is directed to example and a comparative example relating to the radiation-shielding polyetheric copolymer compositions according to the present invention.

EXAMPLE 87

The polyetheric copolymer was prepared in the same manner as in Example 61 and blended with the leaden compound in amounts as will be shown in Table 20 below. The composition was then molded into a sheet having a thickness of 1 mm.

The composition in a form of sheet was measured for its bending properties and radiation-shielding properties. The bending strength and the bending modulus were measured in the same manner as have been described hereinabove. The results are shown in Table 20 below.

TABLE 20

| Lead Compounds | Weight of Lead Compd. % | Bending Strength kg/cm$^2$ | Bending Modulus kg/cm$^2$ | Radiation Shielding |
| --- | --- | --- | --- | --- |
| None | 0 | 1,450 | 33,000 | x |
| Lead Monoxide, PbO | 2 | 1,430 | 34,000 | x |
| Lead Monoxide, PbO | 10 | 1,400 | 42,000 | ○ |
| Lead Monoxide, PbO | 80 | 1,050 | 290,000 | ⊙ |
| Lead Acetate, Pb(CH$_3$COO)$_2$ | 40 | 1,200 | 79,000 | ⊙ |

The following is a description on the heat-resistant laminates of the polyetheric copolymer as a feature (26) of the present invention.

(26) Heat-resistant laminates

The heat-resistant laminates of the polyetheric copolymer according to the present invention is characterized in that a layer of the polyetheric copolymer is laminated with a fibrous enforcing material.

As the polyetheric copolymer to be used for this heat-resistant laminates, there may be appropriately used those as have been described hereinabove in the features (1), (3) and (5) of the present invention.

The fibrous enforcing material to be used for the heat-resistant laminates may preferably include, for example, glass fibers, carbon fibers, aromatic polyamide fibers and so on, from a standpoint of heat resistance, mechanical strength, chemical resitance and so on. The fibrous enforcing material may be used singly or in combination of two or more.

The fibers may be used in a form of chopped strand mat, continuous long fibers mat, woven fabric (filament yarn woven fabric, spun fabric, stretch woven fabric or the like), knit fabric (knit goods, jersey cloth or the like) and so on. These may be used singly or in combination of two or more.

The heat-resitant laminates according to the present invention comprise laminating the layer of the polyetheric copolymer with the layer of the fibrous enforcing material. Although no limit is placed upon the number of layers for the heat-resistant laminate of the present invention, the laminate consists usually of two layers or three layers, a two-layer laminate consisting of the polyetheric copolymer layer with the layer of the fibrous enforcing material laminted on a one surface thereof and a three-layer laminate consisting of the polyetheric copolymer layer with the layer of the fibrous enforcing material laminated on both surfaces thereof.

It is to be noted herein that the layer of the fibrous enforcing material may contain the polyetheric copolymer. As it is preferred to prepare the heat-resistant laminate by means of heat-pressure molding, as will described in more detail, a portion of the polyetheric copolymer in the layer to be laminated, which has been molten and softened, may penetrate into the layer of the fibrous enforcing material and then allowed to solidify as it was. This phenomenon may be seen on frequent occasions when a rough layer of the fibrous enforcing material is used.

As the heat-resistant laminates according to the present invention may be prepared by conventional laminating methods, heat-pressure molding is preferred as have been described hereinabove.

In preparing the heat-resistant laminates by means of the heat-pressure molding, three procedures may be used as follows:

(a) A procedure involves uniformly dispersing powders or pellets of the polyetheric copolymer on a mat or woven fabric of the fibrous enforcing material and molding under heat and pressure.

(b) A procedure comprises preparing a sheet from pellets of the polyetheric copolymer by means of extrusion molding, compression molding or the like and heat-pressurizing the sheet on which a mat of the fibrous enforcing material is laminated.

(c) A procedure consists of a combination of the procedure (a) with the procedure (b).

The heat-resistant laminates according to the present invention prepared so as to consist of the above construction in the manner as have been described hereinabove are excellent in mechanical strength. electrical properties, fire-retardancy, chemical resistance and readiness to mold as well as heat resistance.

The following is directed to examples and a comparative example relating to the heat-resistant laminates according to the present invention.

EXAMPLE 88

The polyetheric copolymer prepared in a form of powders in the same manner as in Example 1 was dispersed uniformly on a flat plate mold of a 50mm×50mm size and a mat of carbon fibers (TORAYCA MAT B0030; Toray, Ltd.) was placed thereon. On a surface of the mate were further dispersed powders of the polyetheric copolymer uniformly so as to allow the polyetheric copolymer to amount to 80% by weight with respect to a total amount of the copolymer and the carbon fibers mat.

Then the mold was closed and pressed at 400° C. under the pressure of 10 kg/cm$^2$ for 5 minutes, and it was transferred to a cooling press where it was retained at 220° C. for 5 minutes, thereby yielding a laminate having a thickness of 1 mm and each side of 50 mm.

The laminate was then measured for its tensile strength, elongation, tensile modulus, bending strength, bending modulus, heat distortion temperature, surface hardness, and sliding properties. The results are shown in Table 21 below.

The laminate was further measured for its resistance to solvents and, as a result, found to be insoluble in acetone, toluene, xylene, chloroform and methylene chloride. Furthermore, although it has been swollen to a somewhat degree in concentrated sulfuric acid, it was not corroded at all by nitric acid, hydrochloric acid, dichloroacetic acid, trifluoroacetic acid, sodium hydroxide, and potassium hydroxide.

The laminate was also found to be favorable in fire-retardancy. As a piece of the laminate was brought into contact with a flame of a lighter for 10 seconds and thereafter taken apart, a flame of the laminate disappeared immediately with no molten drop caused.

EXAMPLE 89

The laminate was prepared in the same manner as in Example 88 with the exception that, in place of the carbon fibers mat, glass long fibers mat (CSM-M9600; Asahi Fiber Glass K.K.), and the resulting laminate was likewise measured. The results are shown in Table 21 below.

It has been found to have the same chemical resitance and fire-retardancy as that prepared in Example 88.

EXAMPLE 90

The laminate was prepared in substantially the same manner as in Example 88 with the exception that, in place of the polyetheric copolymer powders, there was used a mixture of the powders of the polyetheric copolymer prepared in the same manner as in Example 1 with carbon fibers having an average fiber length of 3 mm so as to allow the carbon fibers to amount to 10% by weight. The resulting laminate was measured in the same manner as in Example 88 and the results are shown in Table 21 below.

It was further found that the laminate has demonstrated the same chemical resitance and fire-retardancy as the laminated prepared in Example 88.

COMPARATIVE EXAMPLE 35

The laminate was prepared in the same manner as in Example 88 with the exception that, in place of the polyetheric copolymer prepared in the same manner as in Example 1, pellets of commercially available polyether ether ketone ("Victrex PEEK 450G"; ICI, Ltd.) were used.

The resulting laminate was likewise measured. The results are shown in Table 21 below.

As will be apparent from Table 21 below, too, the heat-resistant laminates according to the present invention comprises a layer of the copolymer with a layer of the fibrous enforcing material laminated thereon, so that the laminate is excellent in mechanical strength, electrical properties, fire-retardancy, chemical resistance and readiness to mold as well as heat resistance. Thus, the laminate is extremely useful as new material in electrical, electronic, mechanical and chemical fields.

TABLE 21

|  | Tensile Strength kg/mm² | Elongatn. % | Tensile Modulus kg/mm² | Bending Strength kg/mm² | Bending Modulus kg/mm² | Heat distortn temp. °C. | Rockwell Hardness, M scale | Dynamic Frictn Coeff., μ |
|---|---|---|---|---|---|---|---|---|
| Ex 88 | 28 | 3 | 600 | 33 | 1,050 | 330 | 96 | 0.19 |
| Ex 89 | 30 | 3 | 580 | 30 | 1,000 | 330 | 96 | 0.19 |
| Ex 90 | 35 | 3 | 630 | 36 | 1,100 | 330 | — | — |
| Comp Ex 35 | 21 | 3 | 530 | 25 | 1,000 | 300 | 98 | 0.58 |

What is claimed is:

1. A polyetheric copolymer comprising:
   benzonitrile recurring units as represented by the following general formula (I):

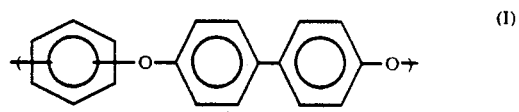

and benzophenone recurring units as represented by the following general formula (II):

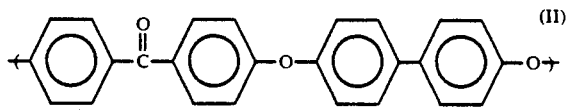

having a molar ratio of the recurring unit (I) to a sum of the recurring units (I) and (II) in the range from 0.15:1 to 0.40:1, and having a melt viscosity (zero shear viscosity) at 400° C. in the range from 500 to 100,000 poise.

2. A method of preparing a polyether copolymer as claimed in claim 1 comprising:
   first reacting a dihalogeno derivative of said benzonitrile of formula (I) with a 4,4'-biphenol in the effective presence of an alkali metal compound in an aprotic polar solvent; and
   then copolymerizing the reaction product so obtained with a 4,4'-dihalogeno derivative of said benzophenone of formula (II);
   wherein the amount of said benzonitrile corresponds to a molar ratio thereof to the sum thereof with said benzophenone of 0.15:1 to 0.40:1; wherein the amount of said benzophenone corresponds to a molar ratio thereof to the amount of said reaction product of 0.60:1 to 0.85:1; and wherein the amount of biphenol is substantially equimolar with respect to said sum.

3. A method for preparing a polyether copolymer as claimed in claim 1 comprising:
   first reacting a dihalogeno derivative of said benzonitrile of formula (I) and a 4,4'-dichloro-derivative of said benzophenone of formula (II) with a 4,4'-biphenol in the effective presence of an alkali metal compound salt in an aprotic polar solvent; and
   then copolymerizing the reaction product so obtained with a 4,4'-difluoro-derivative of said benzophenone of formula (II);

wherein the amount of said benzonitrile corresponds to a molar ratio thereof to the sum thereof with said dichloro- and said difluoro-benzophenones of 0.15:1 to 0.40:1.

4. The method as claimed in claim 2 wherein said solvent is diphenyl sulfone.

5. A polyetheric block copolymer comprising:
a benzonitrile recurring unit block as represented by the following general formula (III):

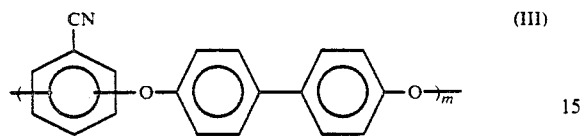

(wherein m is an integer from 10 to 100)
and a benzophenone recurring unit block as represented by the following general formula (IV):

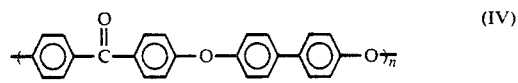

(wherein n is an integer of 80 or smaller) wherein the molar ratio of benzonitrile in said recurring unit (III) to the sum of said benzonitrile in recurring unit (III) and benzophenone in recurring unit (IV), is in the range from 0.15:1 to 0.4:1, and wherein said copolymer has a melt viscosity at 420° C. in the range of 500 to 100,000 poise.

6. A method of preparing a polyether block copolymer as claimed in claim 5 comprising:
first reacting a dihalogeno derivative of said benzonitrile which makes up the recurring unit of formula (III) with an amount of 4,4'-biphenol, which corresponds to a molar ratio thereof with respect to said benzonitrile of 0.90:1 to 0.98:1, or 1.01:1 to 1.10:1, in the effective presence of an alkali metal compound in an aprotic polar solvent; and
then copolymerizing the reaction product so obtained with a 4,4'-dihalogeno derivative of said benzophenone, which makes up the recurring unit of formula (II), and such additional amount of 4,4'-diphenol as corresponds to the difference between an amount of diphenol which is substantially equimolar to the sum of said benzonitrile and said benzophenone derivatives and the amount of said diphenol which was reacted in said first reaction;
provided that the amount of said benzonitrile derivative corresponds to a molar ratio thereof to the sum thereof with said benzophenone derivative of 0.15:1 to 0.40:1.

7. A terminally-stabilized polyetheric copolymer comprising the polymer as claimed in claim 1:
having a group terminating its polymer chain represented by the following general formula (V):

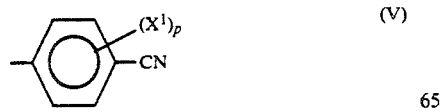

(wherein $X^1$ is a hydrogen atom or halogen atom provided however that $X^1$ may be identical to or different from each other when $X^1$ is present plurally: and p is an integer from 1 to 4);
or as represented by the following general formula (VI):

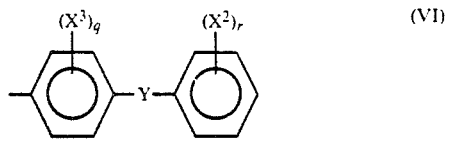

(wherein $X^2$ is a hydrogen atom or a halogen atom; Y is a carbonyl group or sulfone group; $X^3$ is a hydrogen atom or a halogen atom; q is an integer from 1 to 4; and r is an integer from 1 to 5; provided however that $X^2$ and $X^3$ may be identical to or different from each other when each of $X^2$ and $X^3$ is present plurally)
and wherein said terminated polymer has a melt viscosity at 400° C. in the range from 500 to 100,000 poise.

8. A process for the preparation of a terminal-stabilized polyetheric copolymer as claimed in claim 7, comprising the steps of:
reacting a dihalogeno benzonitrile and a 4,4'-dihalogeno benzophenone with 4,4'-biphenol in the presence of an alkali metal compound in an aprotic polar solvent; and
reacting the resulting reaction product with an active halogen-containing compound as represented by the following general formula (VII):

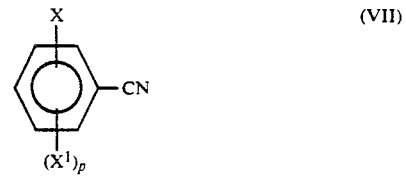

(wherein X is a halogen atom and $X^1$ and p have the same meanings as above) or with an active halogen-containing compound as represented by the following general formula (VIII):

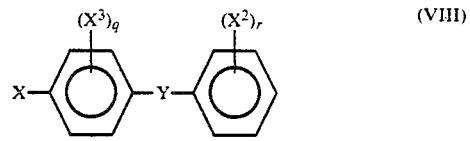

(wherein X, $X^2$, $X^3$, q and r have the same meanings as above).

9. A process for the preparation of powdery polyetheric copolymer having a high bulk density comprising the step of:
removing an aprotic polar solvent from a final reaction mixture of the aprotic polar solvent with the polyetheric copolymer obtained by reacting the dihalogeno benzonitrile and the 4,4'-dihalogeno benzophenone with 4,4'-biphenol in the presence of an alkali metal compound in an aprotic polar solvent.

10. A polyetheric copolymer fiber comprising:
the polyetheric copolymer as claimed in any one of claims 1, 5 or 7; and wherein said fiber is drawn at a draw ratio of 1.5 or higher.

11. A process for preparing a polyetheric copolymer fiber as claimed in claim 10, comprising the step of:
spinning said polyetheric copolymer; and
drawing the spun polyetheric copolymer fiber at a draw ratio of 1.5 or higher at a temperature which is higher, by 10° C. to 30° C., than its glass transition temperature.

12. A heat-resistant, fire-retardant paper comprising said polyetheric copolymer fibers as claimed in claim 10.

13. A polyetheric copolymer film comprising a polyetheric copolymer as claimed in any one of claims 1, 5 or 7 which has been formed at a temperature which is higher, by 10° C. to 100° C., than its crystalline melting point.

14. A stretched polyetheric copolymer film comprising a polyetheric copolymer film as claimed in claim 13 which has been drawn at a draw ratio in the range from 1.5 times to 10 times at a temperature ranging from the glass transition temperature of the polyetheric copolymer to its crystalline melting point.

15. A stretched polyetheric copolymer film comprising a stretched polyetheric copolymer film as claimed in claim 14 which has been heat-treated at a temperature ranging from its crystallization temperature to its crystalline melting point.

16. A polyetheric copolymer pipe comprising a polyetheric copolymer as claimed in any one of claims 1, 5 or 7.

17. An electrically insulating material comprising a polyetheric copolymer as claimed in any one of claim 1, 5 or 7.

18. A radiation-resistant material comprising a polyetheric copolymer comprising as claimed in any one of claims 1, 5 or 7.

19. A printed circuit board comprising a layer of a conductive substance on a surface of an insulating substrate comprising a polyetheric as claimed in any one of claims 1, 5 or 7.

20. A powder paint comprising a polyetheric copolymer as claimed in any one of claims 1, 5 or 7.

21. An inorganic composite material comprising an inorganic filler covered with a polyetheric copolymer as claimed in any one of claims 1, 5 or 7.

22. A polyetheric copolymer composition comprising about 30 to 97% by weight of a polyetheric copolymer as claimed in any one of claims 1, 3 or 7 blended with an inorganic filler in an amount ranging from 3% to 70% by weight.

23. A polyetheric copolymer composition comprising 100 parts by weight of a polyetheric copolymer as claimed in any one of claims 1, 3 or 7 blended with an inorganic nucleating agent in an amount at least equal to 0.001 part by weight up to less than 3 parts by weight.

24. A polyetheric copolymer composition comprising about 10 to 90% by weight of a polyetheric copolymer as claimed in any one of claims 1, 3 or 7 and a thermoplastic resin in an amount of 10% to 90% by weight.

25. A polyetheric copolymer composition comprising about 1 to 50% by weight of an inorganic filler and 50% to 99% by weight of a mixture comprising 10 to 90% by weight of a polyetheric copolymer as claimed in any one of claims 1, 3 or 7 with a thermoplastic resin in an amount of 10% to 90% by weight.

26. A printed circuit board comprising a composite material of 15% to 85% by weight of a polyetheric copolymer as claimed in any one of claims 1, 5 or 7 and 15% to 85% by weight of glass fibers in a plate form.

27. A polymer composition having a positive-temperature coefficient comprising 20% to 80% by weight of a polyetheric copolymer as claimed in any of claims 1, 5 or 7 kneaded with 20% to 80% by weight of an electrically conductive substance.

28. A polymer composition having a positive-temperature coefficient comprising about 10 to 300 parts by weight of a semi-conductive substance and 100 parts by weight of a mixture of 20% to 80% by weight of a polyetheric copolymer as claimed in any one of claims 1, 5 or 7 and 20% to 80% by weight of an electrically conductive substance.

29. A conductive material comprising 100 parts by weight a polyetheric copolymer as claimed in any one of claims 1, 5 or 7 blended with from 20 parts to 300 parts by weight of a particulate metal and/or a fibrous metal.

30. A sliding member comprising 20% to 95% by weight a polyetheric copolymer as claimed in any one of claims 1, 5 or 7 blended with 3% to 70% by weight of a fibrous filler having a Mohs hardness of 6 or lower and 2% to 40% by weight of a non-tackifying agent.

31. A radiation-resistant polyetheric copolymer composition comprising 50% to 90% by weight a polyetheric copolymer as claimed in any one of claims 1, 5 or 7 and 10% to 50% by weight of an inorganic filler.

32. A radiation-shielding polyetheric copolymer composition comprising 20% to 95% by weight a polyetheric copolymer as claimed in any one of claims 1, 5 or 7 and 5% to 80% by weight of lead and/or a lead compound.

33. A heat-resistant laminate comprising laminating a layer of a polyetheric copolymer as claimed in any one of claims 1, 5 or 7 laminated to a layer of a fibrous enforcing material.

* * * * *

UNITED STATES PATENT AND TRADEMARK OFFICE
CERTIFICATE OF CORRECTION

PATENT NO. : 5,115,077
DATED : May 19, 1992
INVENTOR(S) : MATSUO et al

It is certified that error appears in the above-identified patent and that said Letters Patent is hereby corrected as shown below:

Change chemical formula (I), On the Title page, item [57], in the abstract, and at column 2, line 64, and column 9, line 40, and in claim 1, column 80, line 25, to read as shown below:

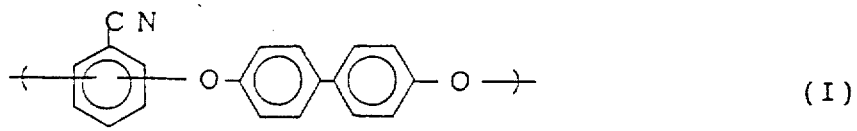   (I)

Signed and Sealed this

Second Day of November, 1993

Attest:

BRUCE LEHMAN

Attesting Officer    Commissioner of Patents and Trademarks